United States Patent [19]

Igaki et al.

[11] Patent Number: 5,323,001
[45] Date of Patent: Jun. 21, 1994

[54] ROTARY ENCODER WITH SCALE MEMBER AND INTERFERENCE OF ZERO AND FIRST ORDER DIFFRACTION BEAM

[75] Inventors: Masahiko Igaki, Tokyo; Yoshifumi Nishimoto, Yokohama, both of Japan

[73] Assignee: Canon Kabushiki Kaisha, Tokyo, Japan

[21] Appl. No.: 22,409

[22] Filed: Feb. 24, 1993

Related U.S. Application Data

[63] Continuation of Ser. No. 987,059, Dec. 7, 1992, abandoned, which is a continuation of Ser. No. 634,045, Dec. 26, 1990, abandoned.

[30] Foreign Application Priority Data

Dec. 26, 1989 [JP] Japan .................. 1-339221
Sep. 21, 1990 [JP] Japan .................. 2-252280
Sep. 21, 1990 [JP] Japan .................. 2-252281
Sep. 26, 1990 [JP] Japan .................. 2-256303
Oct. 19, 1990 [JP] Japan .................. 2-280695

[51] Int. Cl.$^5$ .................. G01D 5/34; G01B 11/02
[52] U.S. Cl. .................. 250/231.16; 250/237 G; 356/356
[58] Field of Search .................. 250/231.13, 231.14, 250/231.16, 237 G; 356/374, 345, 354, 355, 356, 358, 375

[56] References Cited

U.S. PATENT DOCUMENTS

| | | | |
|---|---|---|---|
| 3,756,723 | 9/1973 | Hock | 356/110 |
| 3,770,970 | 11/1973 | Trump | 250/231 |
| 4,172,994 | 10/1979 | Bergkvist | 356/374 |
| 4,433,585 | 2/1984 | Levine | 356/356 |
| 4,792,678 | 12/1988 | Spies | 250/237 G |
| 4,819,051 | 4/1989 | Jacobson | 250/231.13 |
| 4,820,919 | 4/1989 | Igaki et al. | 250/237 G |
| 4,987,299 | 1/1991 | Kabayashi et al. | 250/237 G |
| 4,988,864 | 1/1991 | Michel et al. | 356/356 |
| 5,124,548 | 6/1992 | Igaki | 250/231.16 |

FOREIGN PATENT DOCUMENTS

| | | |
|---|---|---|
| 0262349 | 4/1988 | European Pat. Off. . |
| 0297482 | 1/1989 | European Pat. Off. . |
| 63-81212 | 4/1988 | Japan . |
| 1176914 | 7/1989 | Japan . |
| 1247975 | 9/1971 | United Kingdom . |

Primary Examiner—David C. Nelms
Assistant Examiner—John R. Lee
Attorney, Agent, or Firm—Fitzpatrick, Cella, Harper & Scinto

[57] ABSTRACT

An encoder includes a scale member provided on one of two bodies which are relatively rotated and have gratings arranged in a relative rotating direction and a light irradiator for irradiating a first region with beams. A diffracted image of the first region is projected on a second region of the scale member. The encoder further includes a detector for detecting the beams from the second region. The relative rotation of the other body is detected based on a detected result thereof. A scale whose relative rotation to a rotation detecting device is detected by being irradiated with the beams from the encoder. The scale includes a base member formed with a grating having surfaces inclined to incident beams. In addition, a driving system causes relative rotation between the two bodies. This system includes a device for relatively rotationally driving the two bodies and a controller for controlling a driving condition of the driving device. A motor unit includes a motor module having rotation of its body detected by a result of a light irradiator and rotary shaft provided with a scale member. This unit further includes a supporting device for integrally supporting the body, the light irradiator and the detector.

53 Claims, 45 Drawing Sheets

ROTATION ANGLE

ROTATION ANGLE

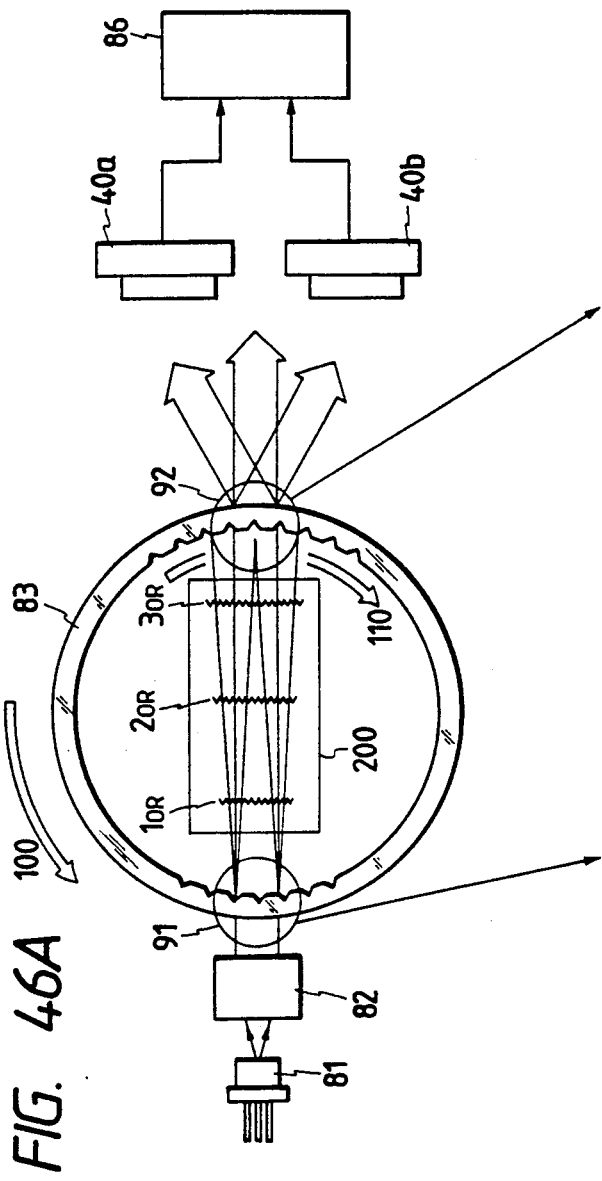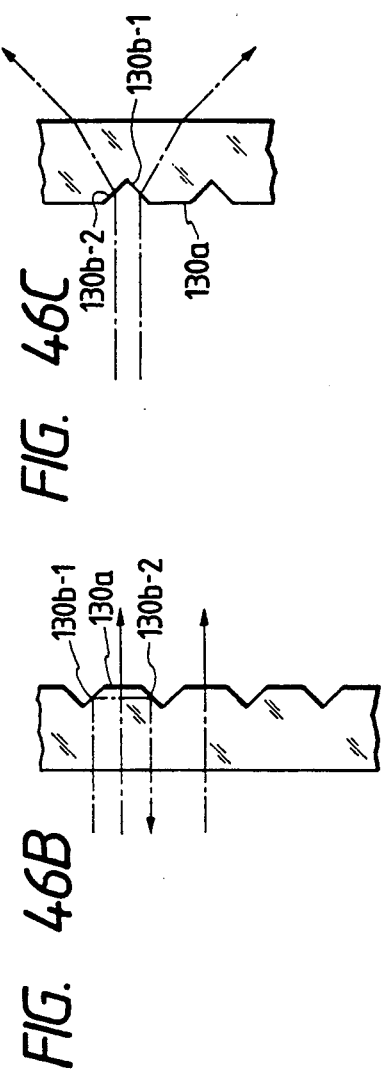
FIG. 46A
FIG. 46B
FIG. 46C

ROTATION ANGLE

ROTATION ANGLE

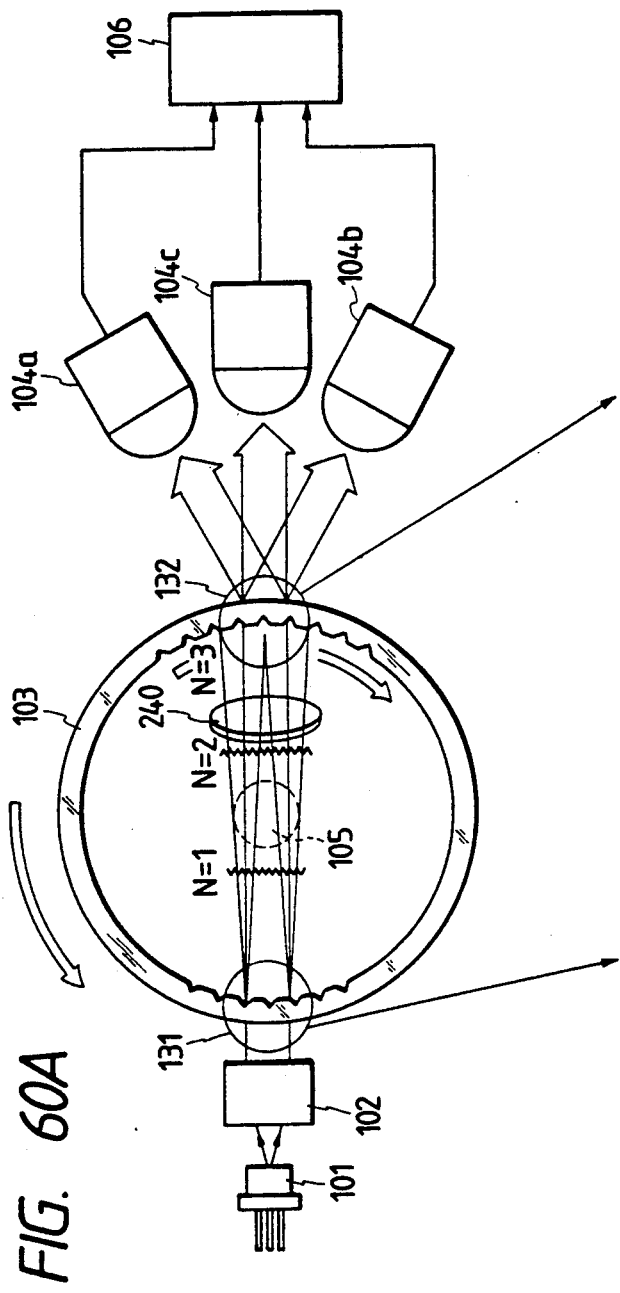
FIG. 60A
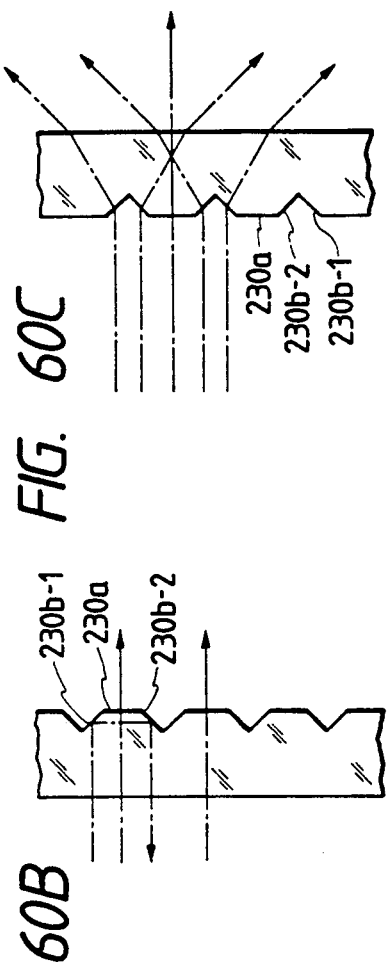
FIG. 60C
FIG. 60B

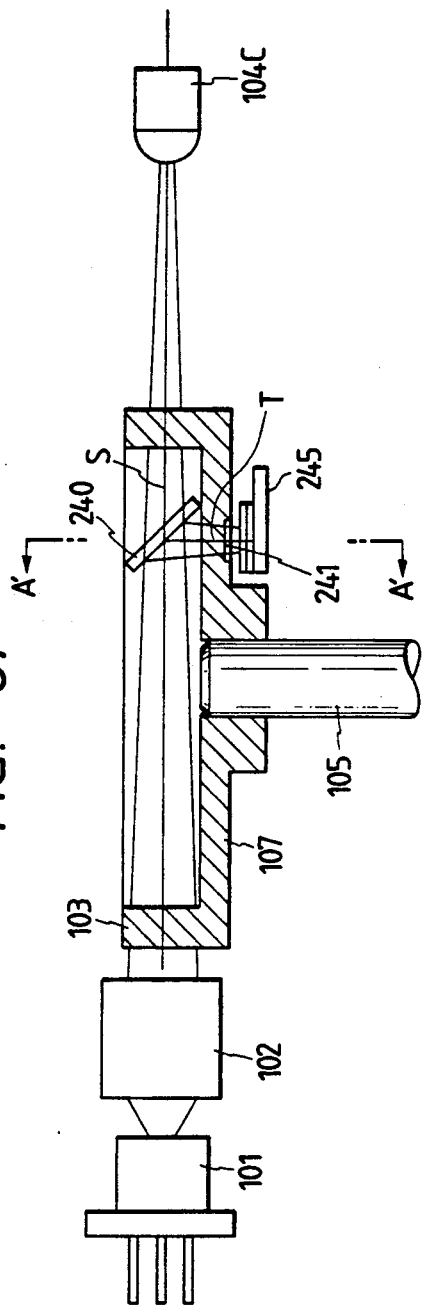
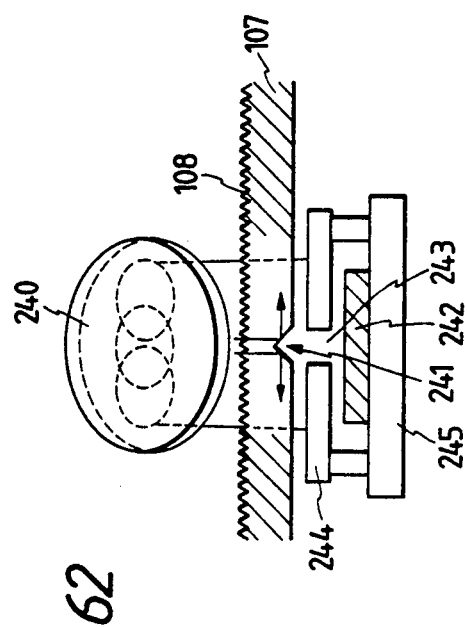
FIG. 61
FIG. 62

5,323,001

ROTARY ENCODER WITH SCALE MEMBER AND INTERFERENCE OF ZERO AND FIRST ORDER DIFFRACTION BEAM

This application is a continuation of application Ser. No. 07/987,059, filed Dec. 7, 1992, which is a continuation of application Ser. No. 07/634,045, filed Dec. 26, 1990, both now abandoned.

BACKGROUND OF THE INVENTION

The present invention relates generally to a rotary encoder, and more particularly, to a rotary encoder for electrically detecting a signal corresponding to a rotation quantity of a cylindrical or hollow rotary body.

A rotary encoder proposed by the present applicant in Japanese Patent Laid-Open Application No. 63-81212 is typical of a measuring device for measuring a rotation quantity of a cylindrical rotary body.

The rotary encoder is a simply constructed excellent measuring device capable of measuring the rotation quantity of the cylindrical rotary body with a relatively high resolving power.

This advantage is attainable by the following arrangement. An interior (hollow portion) of the rotary body incorporates an image forming optical system. A grating image in a first region on a side surface of the rotary body is projected on a grating in a second region on a side surface opposite to the first region with respect to a rotary axis of the rotary body.

SUMMARY OF THE INVENTION

The present invention aims at improving the rotary encoder disclosed in the above-mentioned Japanese Patent Laid-Open Application.

It is an object of this invention to provide a rotary encoder which can be further miniaturized.

It is an object of this invention to provide a rotary encoder capable of reducing adjusting work for an optical system as well as being miniaturized.

Other objects of this invention will become apparent during the following detailed description of the present invention.

BRIEF DESCRIPTION OF THE DRAWINGS

FIGS. 46A, 46B, and 46C are block diagrams showing a twelfth embodiment of the invention;

FIGS. 60A, 60B, and 60C are top views showing a thirteenth embodiment of the invention;

FIG. 61 is a sectional view showing the same embodiment;

FIG. 62 is a view fully illustrating an optical system for detecting a reference position signal;

DESCRIPTION OF THE PREFERRED EMBODIMENTS

Figure 1:
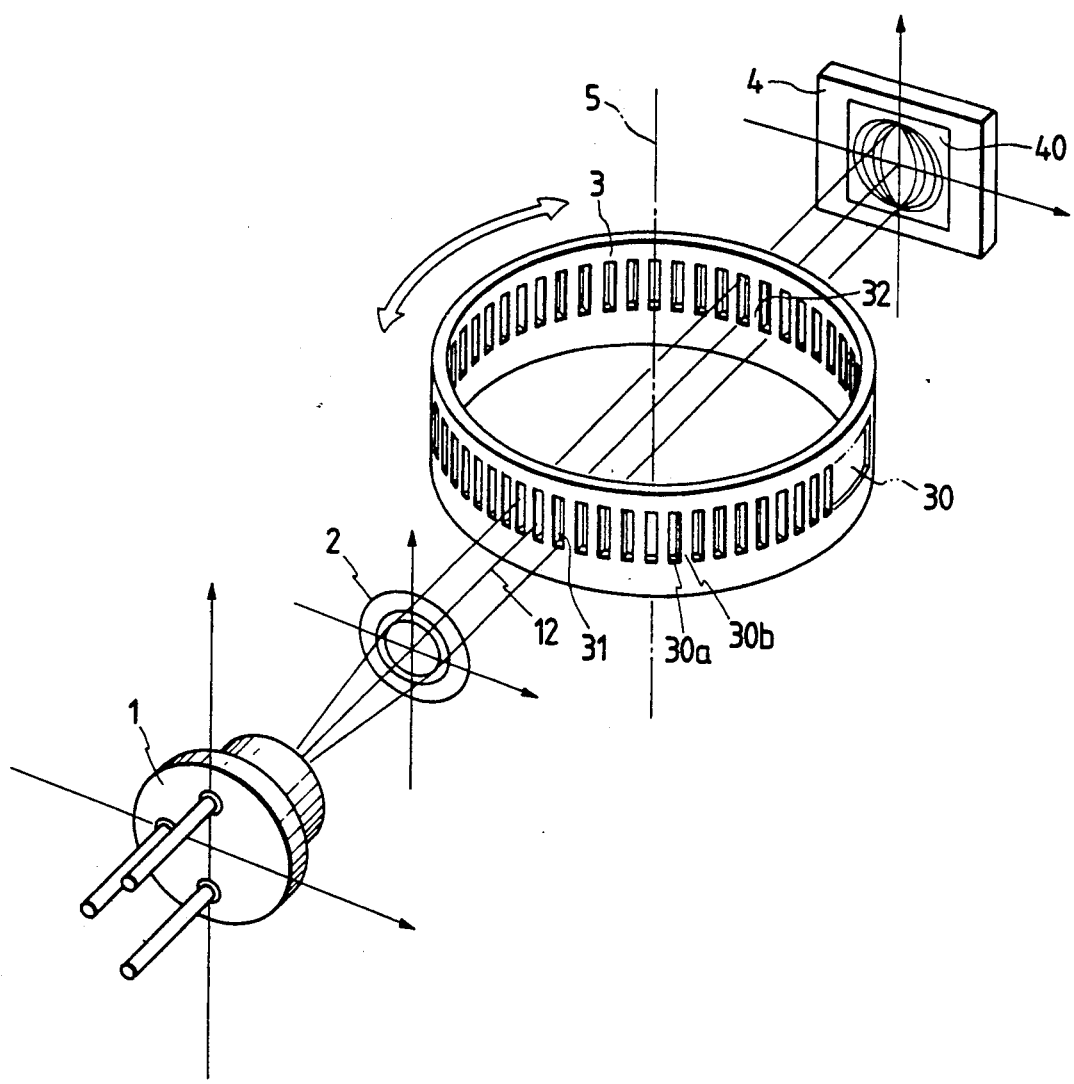
FIG. 1 is a perspective view illustrating a first embodiment of the present invention.

FIG. 1 is a perspective view showing one embodiment of the present invention. Designated at 1 is a semiconductor laser for emitting a coherent light beam having a wavelength λ. A collimator lens system 2 serves to collimate divergent beams emerging from the semiconductor laser 1 into substantially parallel beams. The semiconductor laser 1 and the collimator are combined to constitute a light irradiation means. A cylindrical rotary body 3 rotates in arrowed directions about a rotary axis 5 parallel to the generatrix of the cylinder. The rotary body 3 is connected via an unillustrated connector to a driving shaft of a motor or the like. The rotary body 3 is utilized as an optical scale for detecting a rotation quantity of the driving shaft. The axis 5 coincides with the central axis of the driving shaft. The axis 5 substantially coincides with the central axis of the rotary body. The rotary body 3 is made of an opaque member like a metal. A multiplicity of slits 30a are disposed at equal spacings at pitches P on a side surface 30 in the rotational direction of the rotary body 3. Beams incident on the side surface 30 pass through the slits 30a and are blocked by portions 30b between the slits 30a. More specifically, the transmitting portions marked with the symbols 30a and the shading portions marked with the symbols 30b are alternately regularly arranged in the rotational directions, thus forming gratings. The optical scale is constructed in this manner. A photoelectric converting element 4 is composed of a photodetector. The photoelectric converting element 4 outputs an electric signal corresponding to an intensity of beam incident on its light receiving surface 40.

An optical axis 12 of the light irradiation means (1, 2) is orthogonal to the axis 5. The optical axis 12 intersects both a first region 31 and a second region 32 of the side surface 30 of the rotary body 3. The first and second regions 31 and 32 are formed on side surfaces confronting each other with respect to the axis 5 of the rotary body 3. The beams coming from the light irradiation means (1, 2) are directed to the light receiving surface 40 of the photoelectric converting element 4 through the gratings of the first and second regions 31 and 32. The first and second regions 31 and 32 are formed on side surfaces opposite to each other with respect to the axis 5. The reason for providing a symmetric placement is to reduce measuring error due to eccentricity between the central axis of the rotary body 3 and the axis 5.

A spacing d (hereinafter referred to as a diameter d of the rotary body) along the optical axis 12 between the gratings of the first and second regions 31 and 32 is set to satisfy the following relation:

$$d = N\frac{P^2}{\lambda} \quad (N = 3)$$

$$P = \frac{\pi d}{n} \quad (n \text{ is the total number of slits})$$

where P is the grating pitch, and λ is the wavelength. The diameter d of the rotary body 3 is thus set. As a result, an image of the grating in the first region 31 of the side surface 30 of the rotary body 3 can be projected directly on the grating of the second region 32. In this case, there is no necessity for incorporating an image forming optical system into the hollow portion of the rotary body 3. The image projected on the grating is known as a Fourier image. This grating image is, i.e., a diffraction image formed by self-image-forming action of the grating concomitantly with a light diffractive phenomenon. The rotary body 3 in this embodiment assumes a cylindrical shape, and hence the Fourier image is bent somewhat, with the result that the contrast tends to decline. However, if the light irradiation means (1, 2) and the rotary body 3 are constructed to fulfill the following conditions, there is no problems in practical use.

$$\left(N - \frac{1}{4}\right)\frac{P^2}{\lambda} < d < \left(N + \frac{1}{4}\right)\frac{P^2}{\lambda}$$

(N is the natural number)

$$P = \frac{\pi d}{n} \quad (n \text{ is the total number of slits})$$

Figure 2:
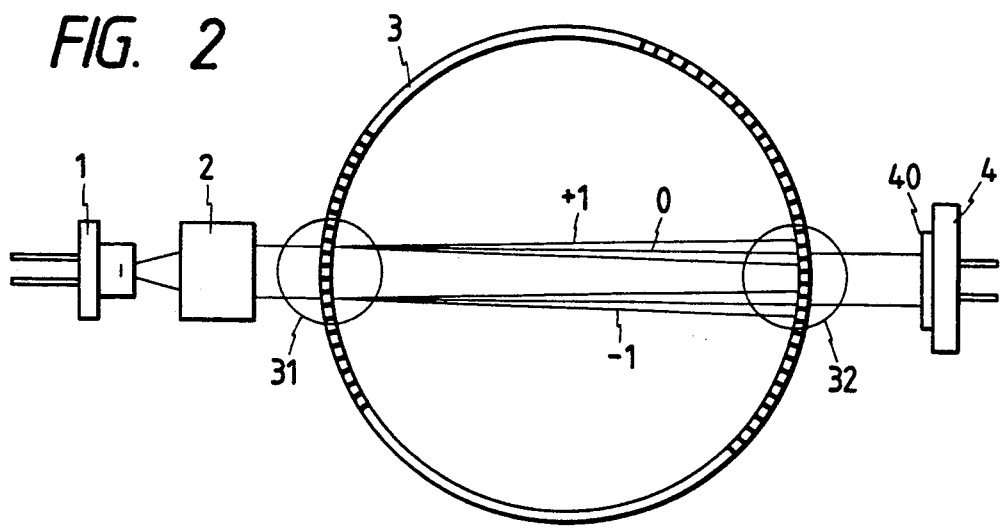
FIGS. 2 and 3 are plan views of assistance in explaining a measuring principle of an encoder of FIG. 1.
Figure 3:
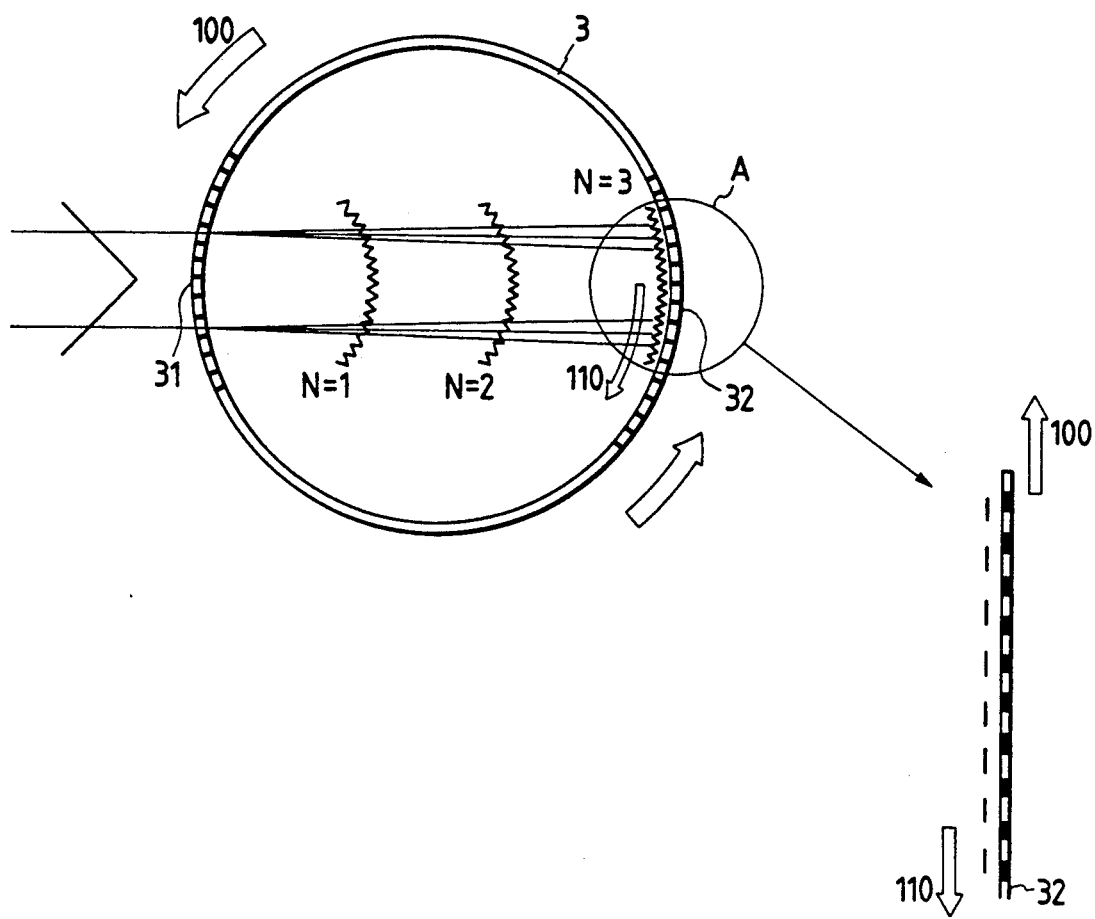

The following is a detailed description of the principle for measuring a rotation angle of the rotary body 3 of the encoder depicted in FIG. 1 with reference to FIGS. 2 and 3.

The beams emitted from the semiconductor laser 1 are collimated into parallel beams by means of a collimator lens system 2. The first region 31 of the rotary body 3 is illuminated with the parallel beams. The parallel beams are diffracted by the grating of the first region 31. 0th-order, ±first-order and ±second-order diffracted beams are produced from the grating of the first region 31. Two or three beams of the 0th-order and ±first-order diffracted beams interfere with each other. Due to this interference, the Fourier image of the grating of the region 31 is projected on the grating of the region 32. A shading pitch of the Fourier image is equal to the pitch P of the grating of the region 31. As described above, the Fourier image is bent along a curved surface of the region 32. This does not influence an accuracy of measurement so much. Note that the diameter d of the rotary body 3 is reduced to decrease the bend of the Fourier image.

Supposing that the rotary body 3 rotates, as illustrated in FIG. 3, in a direction indicated by an arrowed direction 100 (CCW direction), the Fourier image moves in an arrowed direction 110 (CW direction). At this time, the grating of the region 32 on which the Fourier image is projected is moving in the arrowed direction 100. Hence, a relative angular change between the Fourier image and the grating of the region 32 is 2θ when the rotary body rotates through an angle θ. A rotation angle can be measured with a resolving power that is twice the grating pitch.

The grating of the region 32 is illuminated with the Fourier image of the grating of the region 31. The beam traveling through the grating of the region 32 is incident on the light receiving surface 40 of the photoelectric converting element 4. The photoelectric converting element 4 converts the received beam into an electric signal. Based on this signal, the rotation angle of the rotary body 3 is measured. In the rotary encoder in this embodiment. As explained earlier, when the rotary body 3 rotates through the angle θ, the Fourier image of the grating of the region 31 and the grating of the region 32 relatively rotate through an angle 2θ. For this reason, if the total number of the slits 30a of the rotary body 3 is n, (2n)-pieces of sine wave pulses are outputted from the photoelectric converting element 4 per rotation of the rotary body 3. The rotation angle is measured by sequentially counting the sine wave pulses. A rotating speed of the rotary body 3 can be detected based on the sine wave pulses from the photoelectric converting element 4.

Figure 4A:
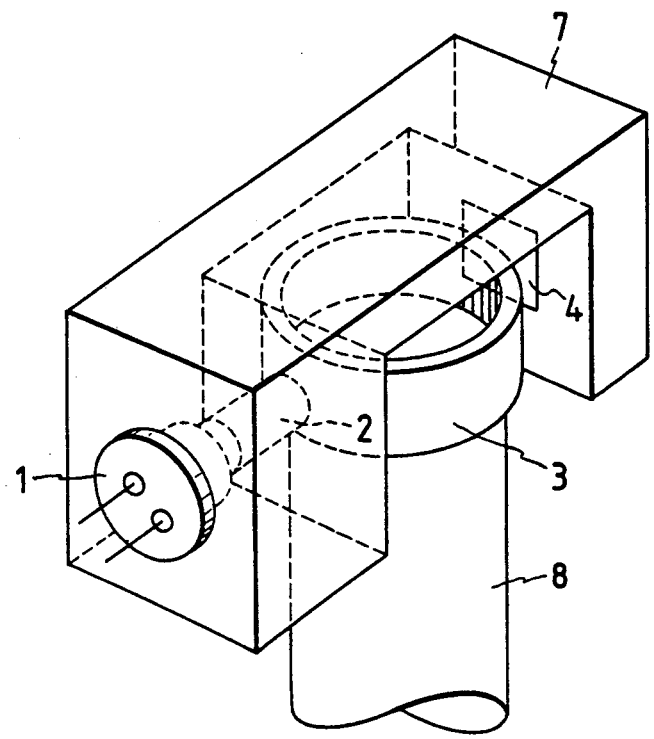
FIGS. 4A and 4B are perspective and sectional views showing a situation where the encoder depicted in FIG. 1 is unitized.
Figure 4B:
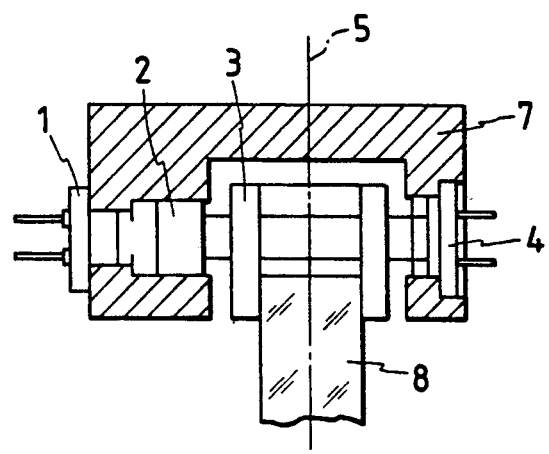

FIGS. 4A and 4B are views each showing a state where the encoder of FIG. 1 is unitized and fitted to the rotary driving shaft 8 (of a motor or the like) defined as a body to be measured. FIG. 4A is a perspective view thereof, while FIG. 4B is a sectional view thereof.

As illustrated in FIGS. 4A and 4B, the rotary body 3 incorporating a function of the optical scale is fitted directly to the rotary driving shaft 8. On the other hand, the semiconductor laser 1, the collimator lens system 2 and the photoelectric converting element 4 are fixedly attached to a substantially U-shaped holder 7. A refractive index type distributive lens assuming a rod-like configuration is herein employed as the collimator lens system 2. This intends to facilitate the unitization and miniaturize the system as a whole.

In the embodiment of FIG. 1, the region 31 on the side surface 30 of the rotary body is irradiated with the parallel beams. For correcting the bend of the Fourier image of the grating of the region 31, the beams falling on the region 31 are in some cases not parallel. In this case, the region 31 is irradiated with divergent or convergent beams in alignment with the direction in which the bend is to be corrected.

The following is an elucidation of the reason why the semiconductor laser is used as a light source in the embodiment of FIG. 1. The semiconductor laser is small in size and emits good coherent monochromatic light. Other light sources are, however, usable on the condition that the light sources are capable of emitting the beams by which the Fourier image of the grating of the region 31 can be projected on the grating of the region 32 in a desired contrast. This is the same with the following embodiments. On the other hand, the photoelectric converting element 4 used herein is small in size. If it is desired that a degradation in measurement sensitivity be prevented, a condensing lens may be interposed between the rotary body and the photoelectric converting element.

In the embodiment of FIG. 1, the rotary body is formed of a metallic material with a multiplicity of slits. The rotary body may be made of a transparent material such as an acrylic material and the like. If composed of the transparent material, a multiplicity of shading portions may be arranged at equal spacings on an internal or external side surface of a hollow or solid rotary body. As demonstrated in, e.g., Japanese Patent Laid-Open Patent Application No. 62-3616 (corresponding to U.S. version; U.S. Pat. No. 4,820,918) made by the present applicant, a configuration of the shading portion is exemplified by a V-shaped groove. This groove is furrowed in an inner peripheral surface of the rotary body. The groove acts to fully reflect the beams incident thereon, thus shading the beams.

As discussed above, the rotary encoder in this embodiment includes the light irradiation means, the cylindrical rotary body and the photoelectric converting means. The cylindrical rotary body rotates about the rotary axis parallel to the generatrix of the cylinder. The transmitting portions and the light-blocking portions are alternately disposed on the side surface of the cylindrical rotary body in the rotational directions thereof, thus forming the gratings. The first region of the side surface of the rotary body is irradiated with the beam emitted from the light irradiation means. The beams passing through the grating of the first region are directed to the second region of the side surface, the second region being opposite to the first region with respect to the rotary axis of the rotary body. The photoelectric converting means receives and converts the beams penetrating the grating of the second region into the electric signals. The light irradiation means and the rotary body are constructed to project the Fourier image of the grating of the first region onto the grating of the second region.

In a preferable mode of this embodiment, as described above, the diameter d of the cylindrical rotary body is set to fulfill the following relation:

$$\left(N - \frac{1}{4}\right)\frac{P^2}{\lambda} < d < \left(N + \frac{1}{4}\right)\frac{P^2}{\lambda}$$

($N$ is the natural number)

where P is the grating pitch, and λ is the wavelength of the light emerging from the light irradiation means. The transmitting portions and the shading portions are alternately regularly arranged over the entire side surface of the cylindrical rotary body. In this case, the grating pitch P is expressed such as:

$$P = \frac{\pi d}{n}$$

where n is the total number of the transmitting portions.

As discussed above, in this embodiment the light irradiation means and the rotary body are so constructed that the Fourier image of the grating of the first region of the cylindrical body is projected on the grating of the second region. With this arrangement, a rotation quantity of the rotary body can be measured with a high resolving power without incorporating an image forming optical system into the interior (hollow portion) of the rotary body. It is therefore possible to provide the small-sized rotary encoder having the high resolving power.

In this embodiment, the measuring accuracy does not degrade even when causing a thrust displacement or deflection of the mounting surface of the cylindrical rotary body with respect to the rotary axis.

The cylindrical rotary body can be miniaturized, and hence an inertial force is decreased. Vibrations of the rotary body which is on the measurement are thereby reduced. Consequently, the measuring accuracy is stabilized.

Even if the cylindrical rotary body stretches and contracts in the radial directions due to a thermal influence, it is feasible to keep constant the positional relation between the Fourier image of the grating of the first region and the light irradiation means of the grating of the second region in the direction of the optical axis. For this reason, the thermal influence does not degrade the measuring accuracy.

Because of unnecessity for the image forming optical system, it is easy to position the respective components such as the light irradiation means, the cylindrical rotary body and the photoelectric converting means. Besides, the device is readily unitized.

An embodiment which will be next described is arranged in the following manner. A cylindrical grating unit employed for the encoder involves the use of a new type of diffraction gratings exhibiting complex functions unlike conventional amplitude type or phase type diffraction gratings. The complex functions herein connote the following two functions: (1) a function as the amplitude type diffraction gratings and (2) a wavefront splitting function (a function to generate a phase-difference signal).

More specifically, a grating unit of a cylindrical scale has a transmission property. This grating unit attains the two functions explained above by use of an optical scale. This optical scale includes this grating unit constructed by arranging rugged portions each having a surface inclined to an incident beam at equal spacings in the peripheral direction of an internal side surface of the scale.

Figure 5A:
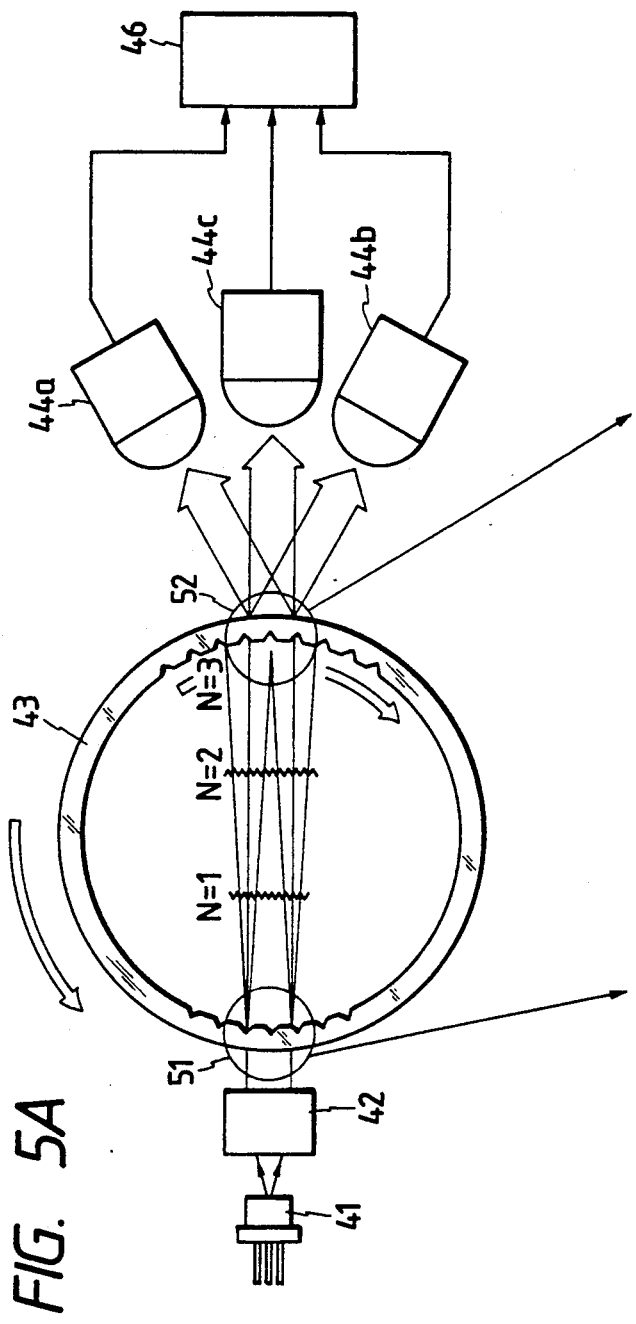
FIGS. 5A, and 5B, and 5C are block diagrams showing a second embodiment of the invention.
Figure 6:
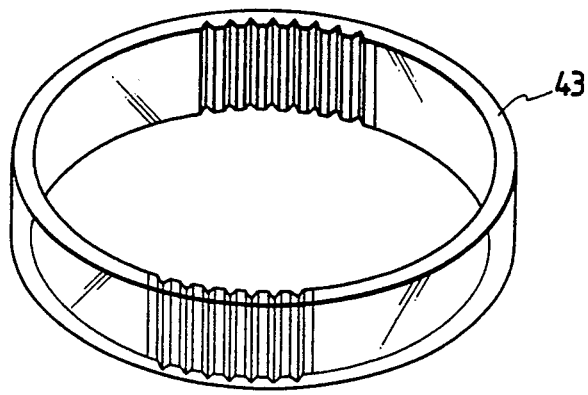
FIG. 6 is a view illustrating an optical scale in this embodiment.

FIG. 5A is a view illustrating a construction of a second embodiment of this invention. Referring to FIG. 5A, the numeral 41 designates a semiconductor laser for generating a coherent beam having a wavelength $\lambda$ (=780 nm). A collimator lens system generally indicated at 42 serves to collimate divergent beams emerging from the semiconductor laser 41 into substantially parallel beams. The semiconductor laser 41 and the collimator lens system 42 are combined to constitute a light irradiation means. A rotary optical scale 43 including a grating unit rotates in any one of arrowed directions. FIG. 6 is a perspective view depicting the scale 43. The scale 43 is composed of an optical material exhibiting a transmission property; and at least the grating unit thereof has the transmission property. Furrowed in the internal side surface of the cylindrical scale 43 are a multiplicity of V-shaped grooves arranged at equal space over the entire periphery in the peripheral direction. The grating unit is thus formed. Referring back to FIG. 5A, photodetectors 44a, 44b and 44c serving as a light receiving means are disposed in positions confronting the light irradiation means, with the scale 43 interposed therebetween. Outputs of the respective photodetectors are connected to a signal processing circuit 46. The signal processing circuit 46 includes a pulse count circuit, a circuit for discerning the rotational direction and a signal interpolation processing circuit. The scale 43 is connected to a rotary driving shaft of a motor or the like. The scale 43 is employed as an optical scale for detecting a rotation quantity of the driving shaft. FIGS. 8 through 12 illustrate some variations of a method of mounting the scale 43. In any variation, the scale 43 is fitted directly to the rotary driving shaft 45. With this arrangement, it is possible to keep high both a fitting accuracy and a concentricity between the fitting portion and the grating surface serving as a gradation for detecting the rotations. Especially in the variant form depicted in FIG. 12, an interior of the cylinder in which the gratings are formed is hermetically closed. This yields advantages of eliminating adhesion of dust or oil to the grating unit and significantly increasing a dust protective capability.

Figure 7:
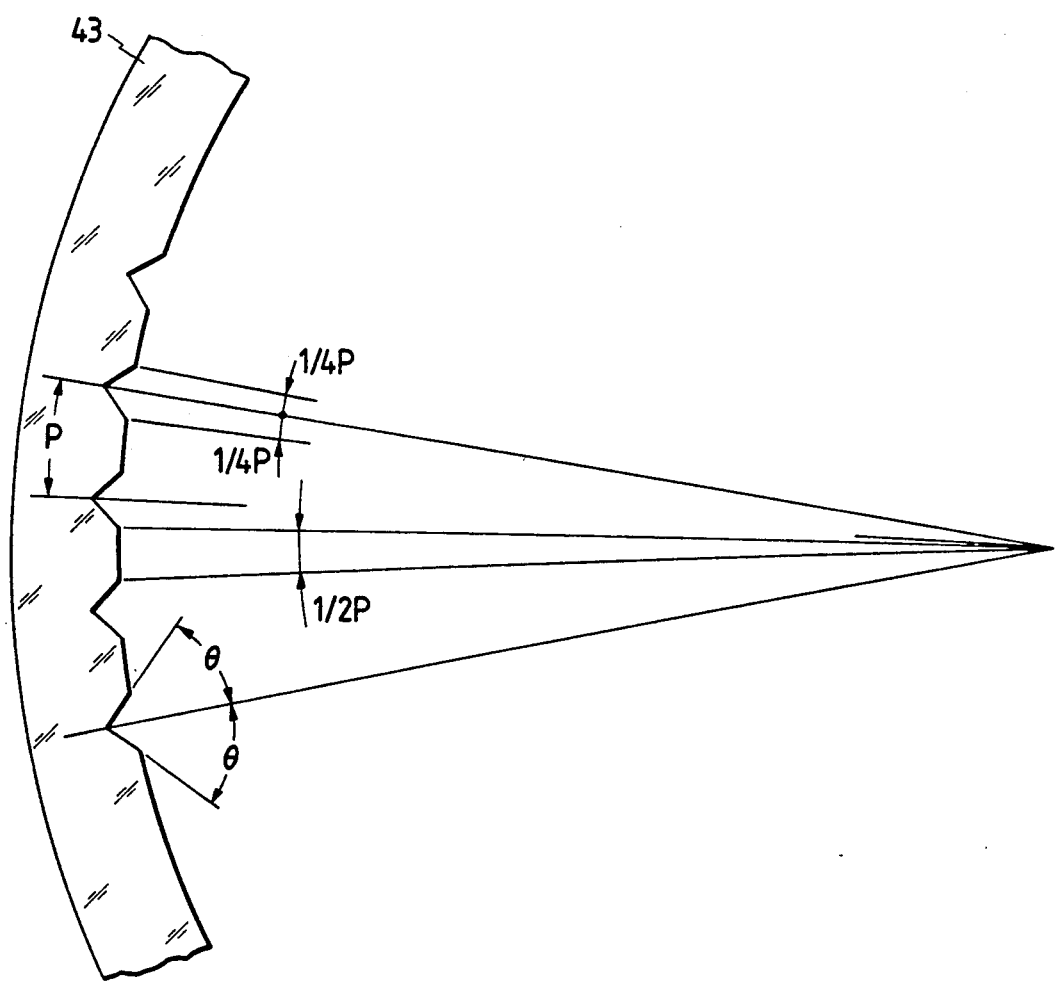
FIG. 7 is a view fully illustrating a grating unit of the scale.
Figure 8:
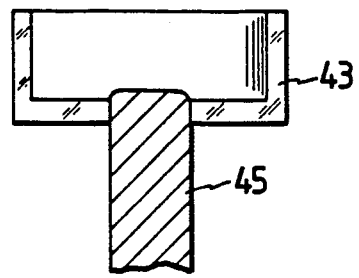
FIGS. 8, 9, 10, 11, and 12 are diagrams showing some variations of a method of mounting a rotary grating unit.
Figure 10:
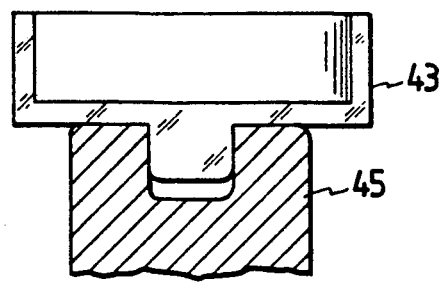
Figure 9:
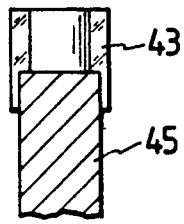
Figure 11:
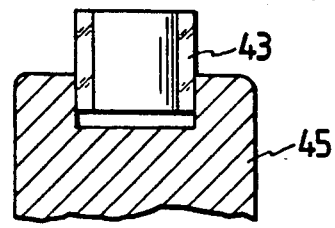
Figure 12:
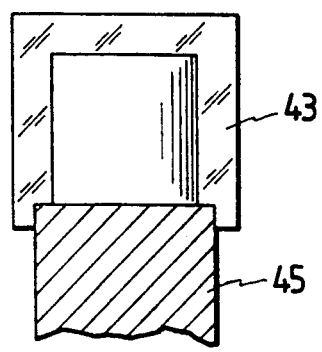

FIG. 7 is a view illustrating in detail the grating unit of the scale 43. The V-shaped grooves and the flat portions are alternately arranged, thus forming gratings. (n)-pieces of V-shaped grooves are furrowed in the cylindrical internal side surface at pitches P (rad) ($n \times P = 2\pi$rad) in the peripheral direction. A width of the V-shaped groove is $\frac{1}{2}$ P (rad). Each of the two flat surfaces for forming the V-shaped groove has a width of $\frac{1}{4}$ P (rad). Each oblique surface is inclined at an angle greater than a critical angle—i.e., $\theta = 45°$ in this embodiment—with respect to a straight line which connects the center to the bottom of the V-shaped groove.

A spacing d (an inside diameter of the scale) along the optical axis between gratings of first and second regions 51 and 52 of the scale 43 is set to satisfy the following relation:

$$d = N \cdot P^2 / \lambda (N = 3)$$

$P = \pi d/n$ (n is the total number of slits)

where P is the grating pitch, and $\lambda$ is the wavelength in this embodiment. The diameter d of the scale 43 is thus set. It is therefore possible to project an image of the grating of the first region 51 of the side surface of the scale 43 directly on the grating of the second region 52. In this case, there is no necessity for incorporating an image forming optical system into the hollow portion of the scale 43. The grating image projected thereon is, as mentioned before, referred to as the Fourier image. The grating image is formed by the self-image-forming action of the grating concomitantly with the light diffractive phenomenon. The scale 43 in this embodiment assumes a cylindrical configuration and therefore has a tendency in which the contrast degrades due to a slight bend of the Fourier image. There is no problem in practical use, if the light irradiation means (41, 42) and the scale 43 are constructed to satisfy the following condition:

$$(N - \tfrac{1}{2})P^2/\lambda < d < (N + \tfrac{1}{2})P^2/\lambda (N \text{ is the natural number})$$

$P = \pi d/n$ (n is the total number of slits)

Note that the scale 43 is formed of plastic in this embodiment. This material is suitable for mass-production by a manufacturing method such as injection molding or compression molding. Namely, it is feasible to provide the encoder at still lower costs than by a conventional processing method using a photolitho process.

The encoder having a construction of this embodiment is arranged in the following way. When an outside ambient temperature changes, the diameter d of the scale, the grating pitch P and the wavelength $\lambda$ of the semiconductor laser slightly vary. As a result, there is caused a relative positional deviation between a Fourier image forming position and a grating surface position. This is probably a factor for a decrease in S/N ratio of the detecting signal. For instance, when the temperature rises, the diameter d of the scale increases. Concomitantly with this increase, a value of the grating pitch P is also incremented. Besides, the wavelength λ shifts to a larger wavelength side. In this case, a position L of the Fourier image changes at a ratio of $P^2/\lambda$, wherein $L = N \cdot P^2/\lambda$. A material of the scale and characteristics of the semiconductor laser are selected so that a variation quantity (Δd) of the diameter d of the scale due to changes in temperature approximates to a shift quantity (ΔL) of the Fourier image to the greatest possible degree. Hence, it is feasible to reduce the relative positional deviation between the grating surface position and the Fourier image forming position. Even when causing the changes in the outside ambient temperature, a degradation in the S/N ratio of the detecting signal is reduced. In the semiconductor laser having a wavelength 780 nm employed in this embodiment, a wavelength fluctuation on the order of 10 nm is caused for a temperature change of 50° C. It is preferable to adopt a scale material exhibiting a relatively large coefficient of thermal expansion. In accordance with this embodiment, the scale 43 is made of plastic (acrylic resin where n=1.49). The coefficient of thermal expansion is greater than that of glass. Hence, there is produced such an advantage that a drop in the S/N ratio of the output signal due to the fluctuations in temperature is further reduced. The encoder can be offered at low costs. In combination with this advantage, the plastic is quite suited as a material of the encoder scale in this embodiment.

The measuring principle of this embodiment will next be described with reference to FIGS. 5A through 5C.

The beams coming from the semiconductor laser 41 are converted into a convergent beam by adjusting a position of the collimator lens system 42. The convergent beam is incident on a first region 51 of the scale 43. The reason why the convergent beam is used will be elucidated. The side surface of the scale 43 has a refractive power equivalent to that of a concave lens due to a difference in curvature between the external and internal side surfaces. The beams entering the scale 43 become substantially parallel beams owing to action of the concave lens.

Figure 5C:
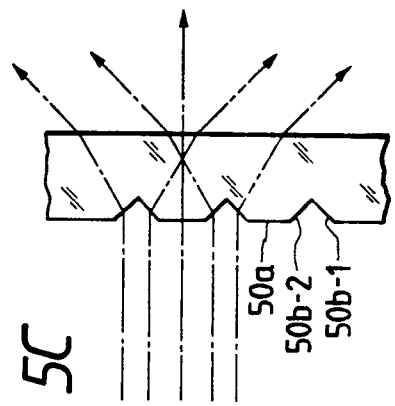
Figure 5B:
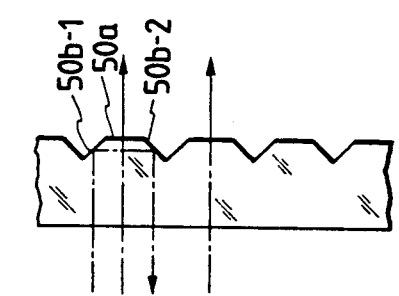

The convergent beam, as illustrated in FIG. 5B, reaches the grating unit of the first region. Then, the convergent beams travel into the cylinder after passing through a surface 50a. The beam which reaches a surface 50b-1 of the grating unit is deflected to a surface 50b-2 after undergoing full reflection as shown in the Figure. It is because the oblique surface is inclined at more than a critical angle. The beam is also fully reflected by a surface 50b-1. The beam, which reaches the surface 50b-1, is eventually returned substantially in the incident direction without traveling into the interior of the rotary body. Similarly, the beam which reaches the surface 50b-2 is returned by repeating the full reflection. Hence, the beam, which reaches a range defined by the two oblique surfaces 50b-1 and 50b-2 constituting the V-shaped groove in the first region 51, is reflected without advancing into the cylinder. Only the beam, which reaches the surface 50a, advances into the cylinder. That is, the V-shaped groove diffraction grating in the first region 51 has the same action as that of the transmission type amplitude grating.

The beams are diffracted by the grating unit of the first region 51, whereby the diffraction beams of 0th-order, ±first-order, ±second-order, . . . are generated by action of the gratings. Two or three beams of the 0th-order and ±first-order beams interfere with each other. As a result of this interference, the Fourier image of the grating of the first region 51 is formed inwardly of the scale 43. The Fourier image is repeatedly formed at a basic distance L in positions of integral multiples of L. In this embodiment, the light source wavelength λ, the grating pitch P and the position of the collimator lens system 2 are set so that the 3rd (N=3) Fourier image is formed on the grating surface of the second region 52. A shading pitch of this Fourier image is equal to the grating pitch P of the first and second regions 51 and 52.

The beam is, as illustrated in FIG. 5C, substantially perpendicularly incident on the surface 50a in the second region 52. Hence, the beam penetrates straight the surface and reaches the photodetector 44c. The beams, which will reach the two oblique surfaces 50b-1 and 50b-2 cooperating to form the V-shaped groove surface, are incident thereon at an incident angle of approximately 45°. Consequently, the beams are largely refracted in different directions and reach the photodetectors 44a and 44b, respectively. In the second region, the beams travel separately in the three directions. It is because there are provided totally three kinds of surfaces inclined in differenct directions—i.e., the two oblique surfaces inclined in different directions with respect to the incident beams and the flat surface between the V-shaped grooves. These beams respectively reach the photodetectors 44a, 44b and 44c disposed corresponding to the individual surfaces. Namely, the V-shaped groove gratings function as light wavefront splitting elements in the second region 52.

As discussed above, the scale in this embodiment characteristically has two functions. The scale functions as the amplitude type diffraction grating in the first region 51 and as the wavefront splitting elements for detecting two phases in the second region 52.

The following is an explanation of variations in light quantity detected by the photodetectors 44a, 44b and 44c when the scale 43 rotates. It is herein assumed that the scale 43 rotates counterclockwise.

Figure 13:
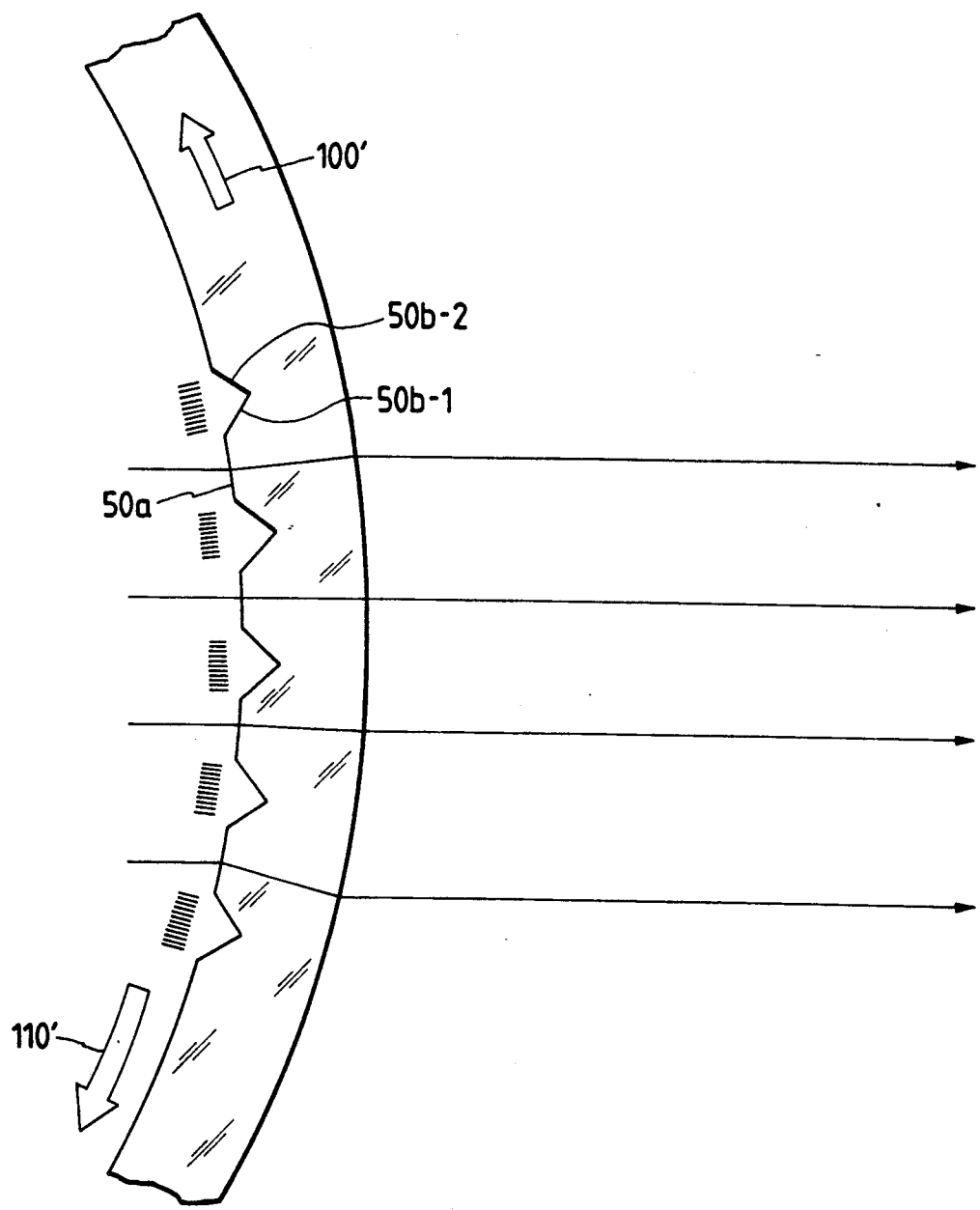
FIGS. 13 and 14 are views of assistance in explaining the principle of this embodiment.
Figure 14:
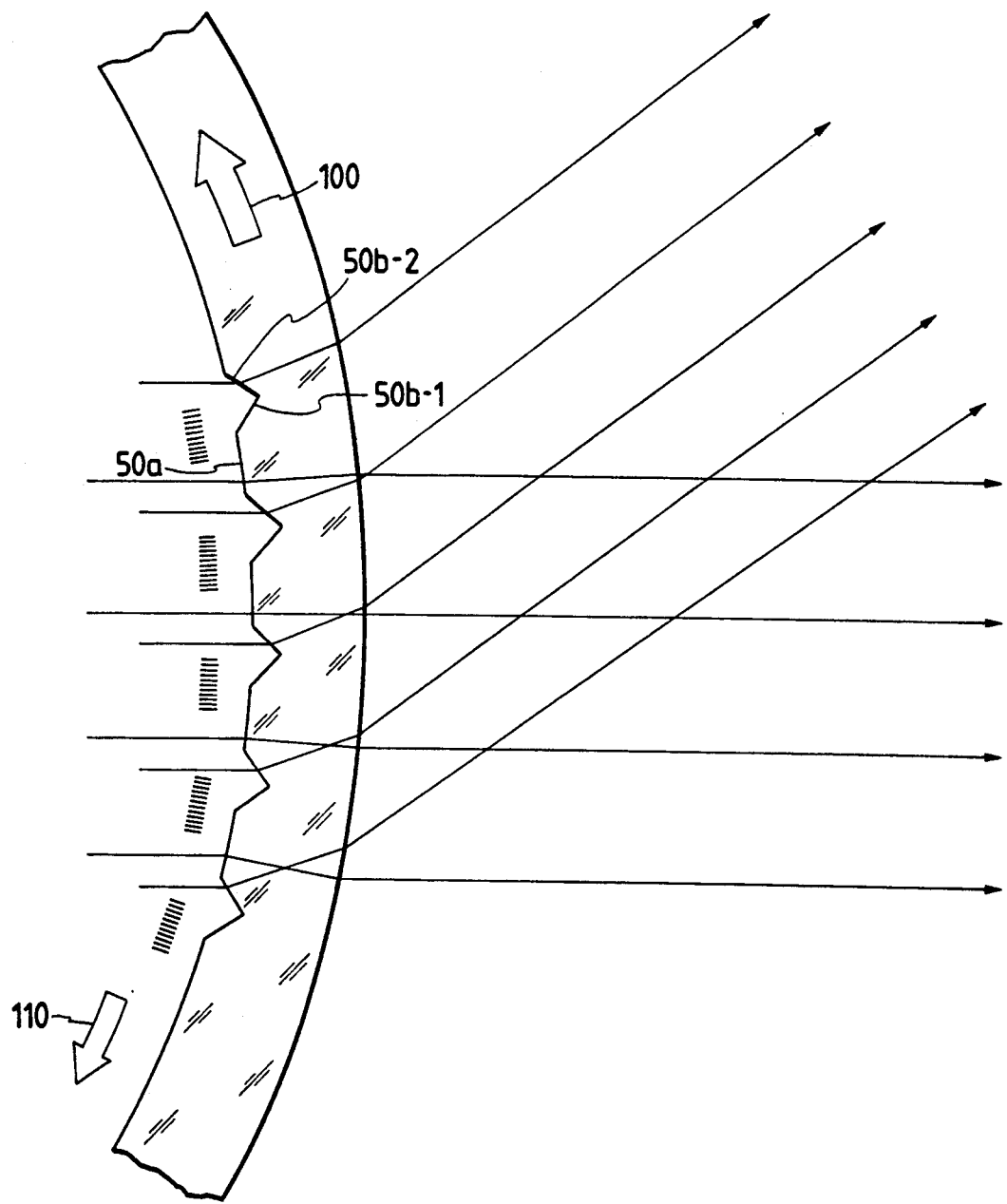

FIG. 13 depicts a situation where shading grating images having a period equal to the grating pitch P are overlapped in the second regions 52. In this case, a bright part of the shading grating image is overlapped with a portion 50a. The beams penetrate a portion 50a and concentrate at the photodetector 44c. FIG. 14 shows a situation where the diffraction grating unit rotates counterclockwise (in an arrowed direction 100) through ¼ P from a state of FIG. 13. In this case, the shading grating image moves in an arrowed direction 110. At this time, some of the beams penetrate the portion 50a, and the rest of the beams reach 50b-2. Therefore, one-half of the beams incident on the second region 52 are incident on the photodetector 44c, while the remaining half of beams are incident on the photodetector 44a.

Figure 15A:
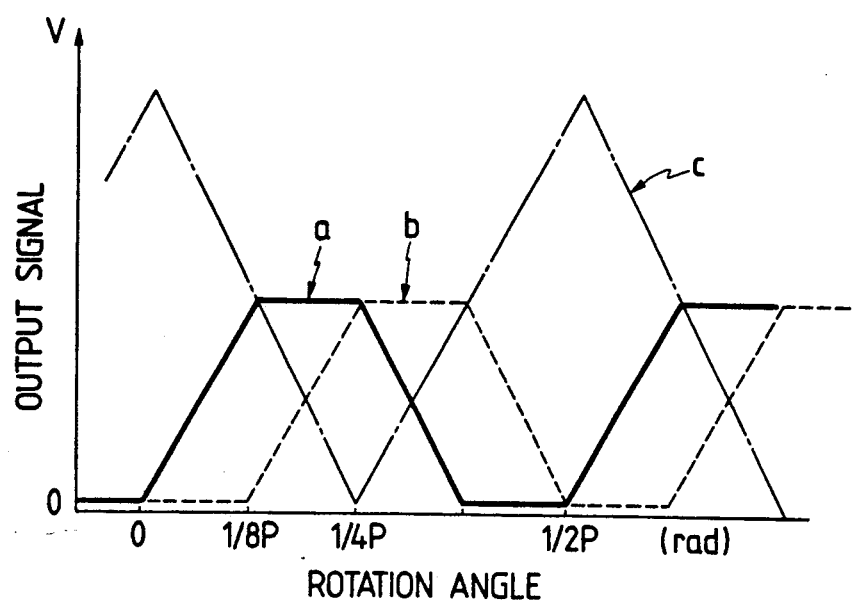
FIGS. 15A and 15B are diagrams showing waveforms of output signals of the encoder in this embodiment.
Figure 15B:
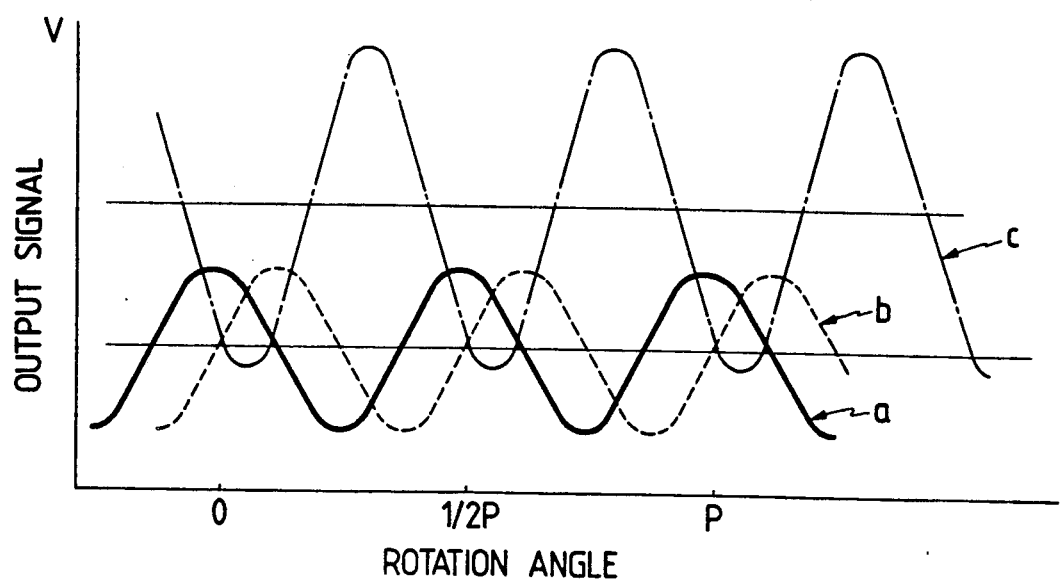

As explained above, a quantity balance of beams incident on the respective photodetectors changes corresponding to the relative displacement between the positions of grating and the Fourier image. As a result, the light quantity variations concomitant with the rotations of the grating are, as shown in FIG. 15A, obtained on the assumption that the scale 43 rotates counterclockwise. The axis of abscissa herein indicates a rotation quantity of the cylindrical grating, while the axis of ordinate indicates a light receiving quantity. Signals a, b and c correspond to the photodetectors 44a, 44b and 44c. Note that whereas in the clockwise rotation of the scale 43, the symbol a is an output of 44b, b is an output of 44a, and c is an output of 44c. The rotational direction can be discerned based on this difference. FIG. 15A illustrates theoretical variations in light quantity, wherein the contrast of the Fourier image is extremely high enough to approximate to an ideal level. As a matter of fact, however, the contrast of the Fourier image is rather low. Hence, each light quantity, as shown in FIG. 15B, changes in a substantially sine wave-like configuration.

Figure 16A:
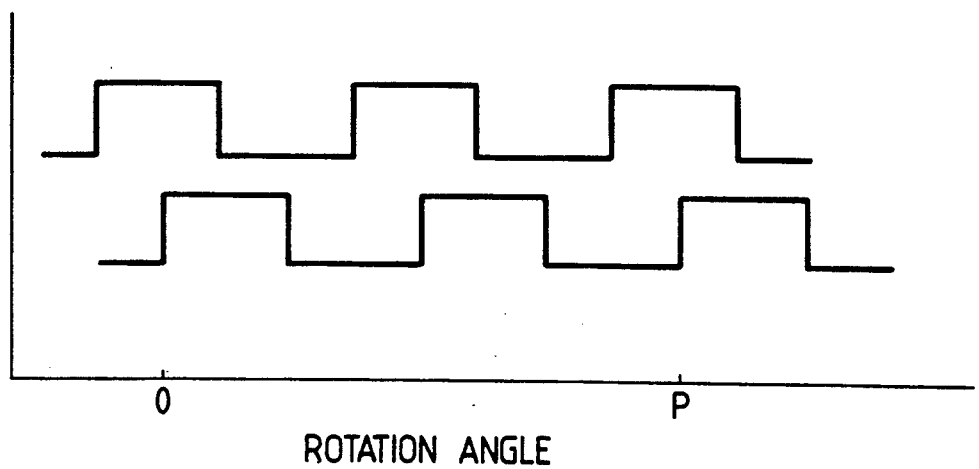
FIGS. 16A and 16B are diagrams of assistance in explaining signal processing.
Figure 16B:
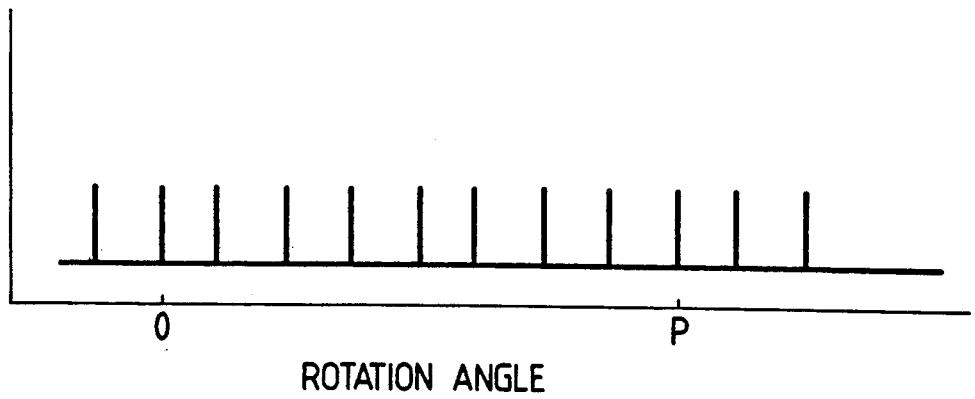
Figure 17:
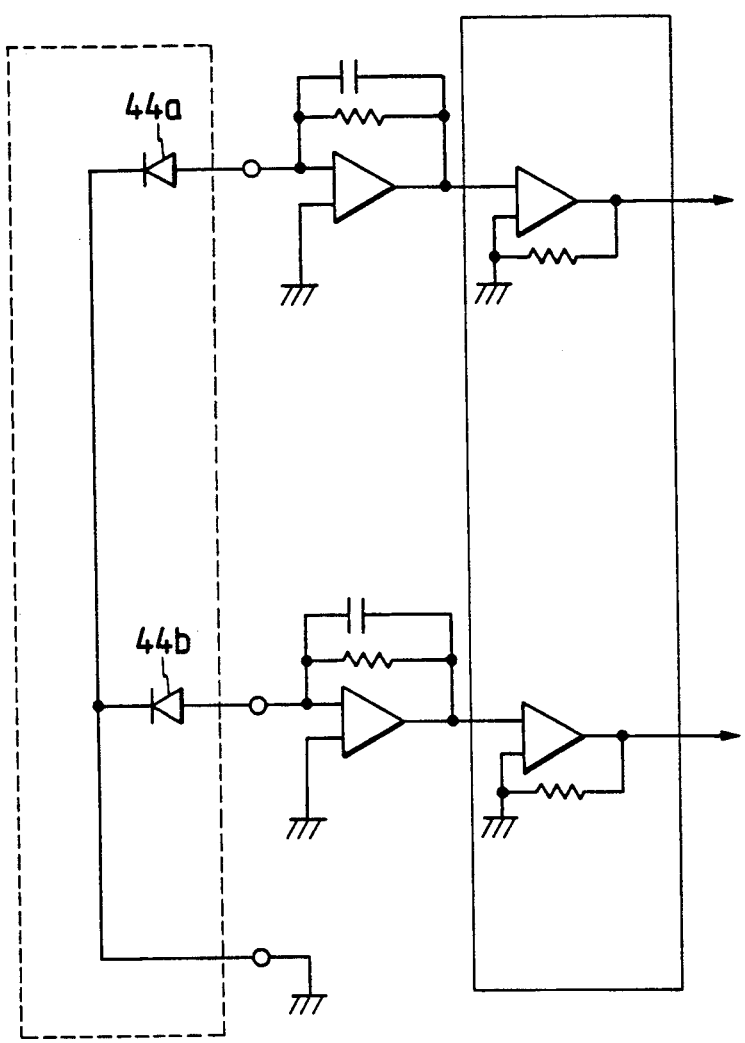
FIG. 17 is a diagram showing one example of circuitry.

There will next be described specifically electric processing in a signal processing circuit 46 on the basis of these signals. FIG. 17 shows one example of the signal processing circuit. When the grating unit rotates through P (rad), sine wave-like output waveforms of two periods appear. Particularly in this case, a phasic relation between a and b shows a phase difference of 90°. Therefore, only the output signals a and b are employed. The output signals a and b are changed, as illustrated in FIG. 16A, in a rectangular waveform through a comparator circuit. Pulse signals are obtained at rise and fall portions of the rectangular waveforms. As shown in FIG. 16B, eight pulses can be obtained at a rotation angle of p (rad). Hence, when the number of gratings during one rotation is set to n, a rotation angle signal of 8 nP/R is detectable. Note that in this case, since the signal c is unnecessary, the device may be constructed by eliminating the photodetector 44c shown in FIG. 5A.

In the method described above, only the signals a and b having a phase difference of 90° are used. Fundamentally, the signal c is not required. It is, however, possible to further enhance the accuracy by use of the signal c. This method will hereinafter be described.

Figure 18A:
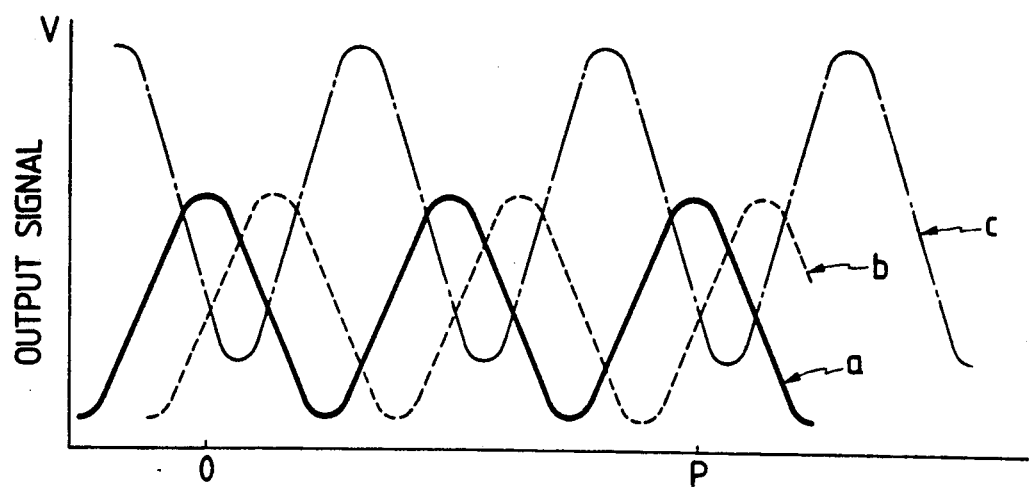
FIGS. 18A, 18B, 19, 20, 21A, 21B, 22A, 22B, and 23 are explanatory diagrams showing variant forms of signal processing.

The width of the V-shaped groove is ideally precisely ¼ P. In fact, however, the width deviates slightly from the ideal value depending on the manufacturing accuracy in some cases. Correspondingly, the output signals do not come to ideal values, with the result that the phase difference between the signals a and b does not accurately becomes 90°. It follows that the accuracy of the eventually obtained pulses is degraded. FIG. 18 is an explanatory diagram showing the output waveforms in that instance.

Now supposing that the V-shaped groove of the cylindrical grating employed is worked to have a width larger than ¼ P over the entire periphery through 360°, the phase difference between the signals a and b is a little bit greater than 90°. This relation is demonstrated by FIG. 18A.

Figure 18B:
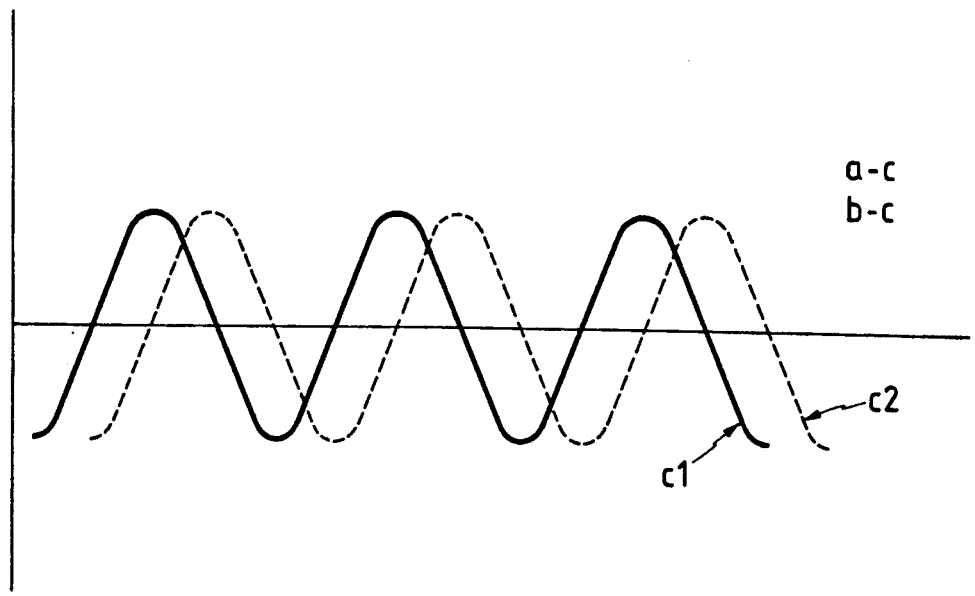
Figure 19:
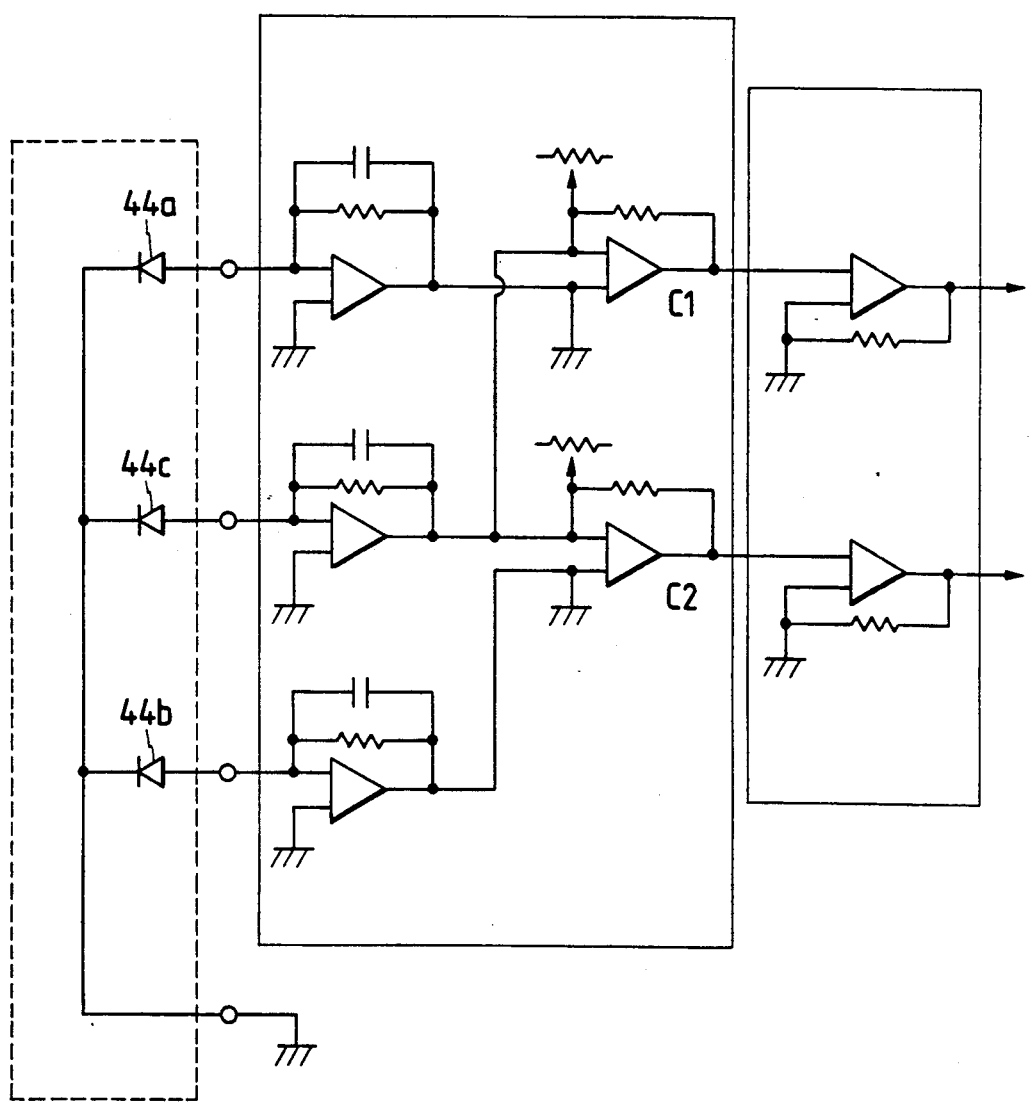

Adopting circuitry depicted in FIG. 19, differential outputs between the signals a and c and between the signals b and c are obtained by using the output signal of the photodetector 44c. As illustrated in FIG. 18B, two signals C1 and C2 are newly created. Amplitude gains of the respective signals c, b and a in this circuit are adequately adjusted, thereby making it possible to set the phase difference between the synthesized signals C1 and C2 accurately to 90°. The discernment of rotational directions and the interpolation can be effected by use of the two signals C1 and C2. The output of the photodetector 44c is thus utilized, whereby a highly accurate detection of rotation can be performed while compensating the manufacturing accuracy of the gratings.

Figure 20:
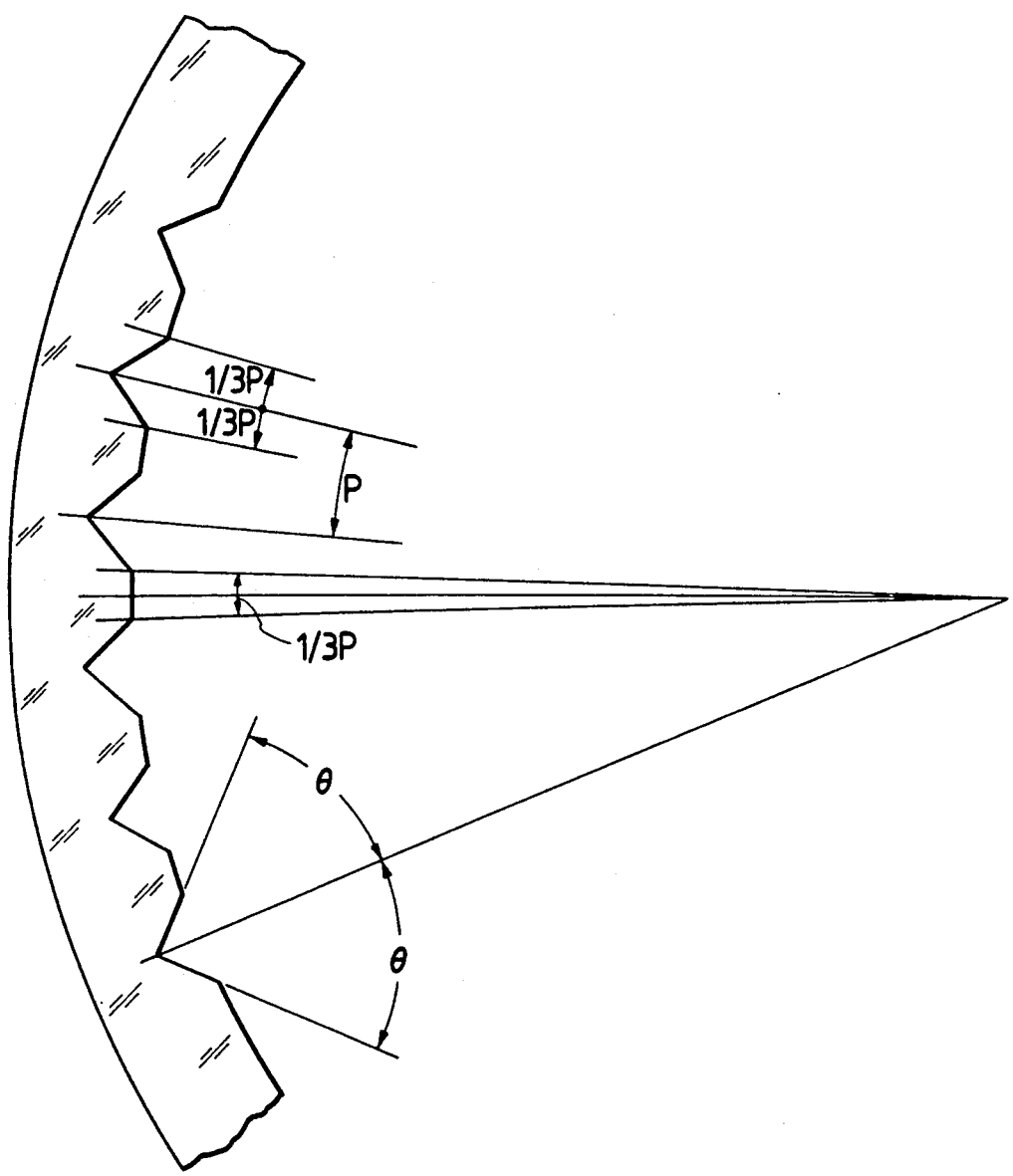
Figure 21A:
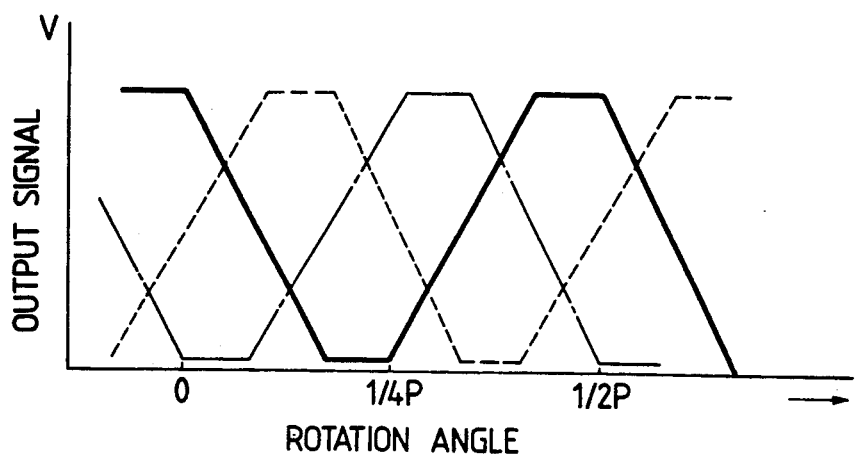
Figure 21B:
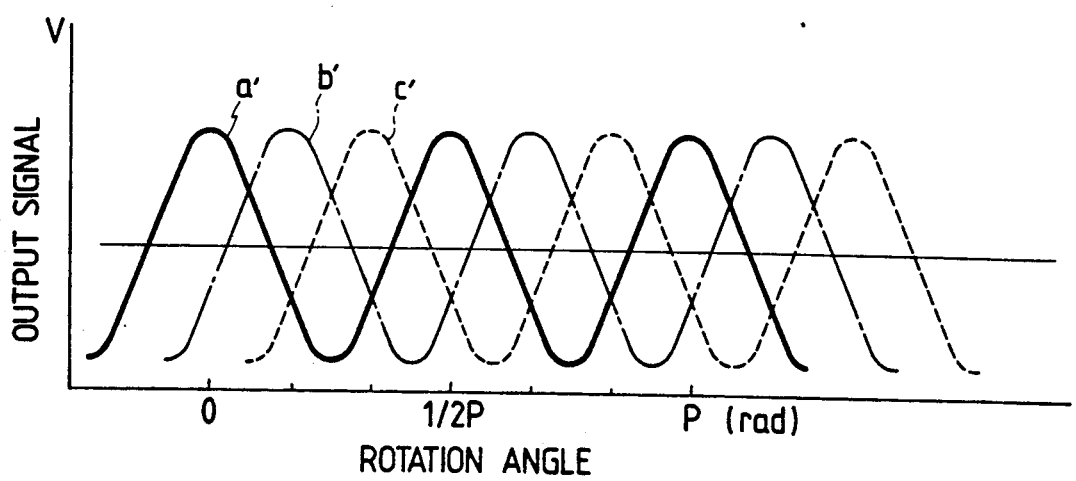

Next, a third embodiment in which a much higher accuracy is attainable will be given. In this embodiment, as illustrated in FIG. 20, the grating takes such a form that a width of the V-shaped groove is set to ⅓ P of the grating pitch P. FIG. 21A shows theoretical waveforms of the output signals of the photodetectors 44a, 44b and 44c at that time. FIG. 21B depicts waveforms a', b' and c' obtained actually. In this case, there are acquired 3-phase output signals each exhibiting a phase difference of 120° where the amplitude levels are equally arranged. In this embodiment, a still higher resolving power is obtained by employing these 3-phase output signals.

Figure 22A:
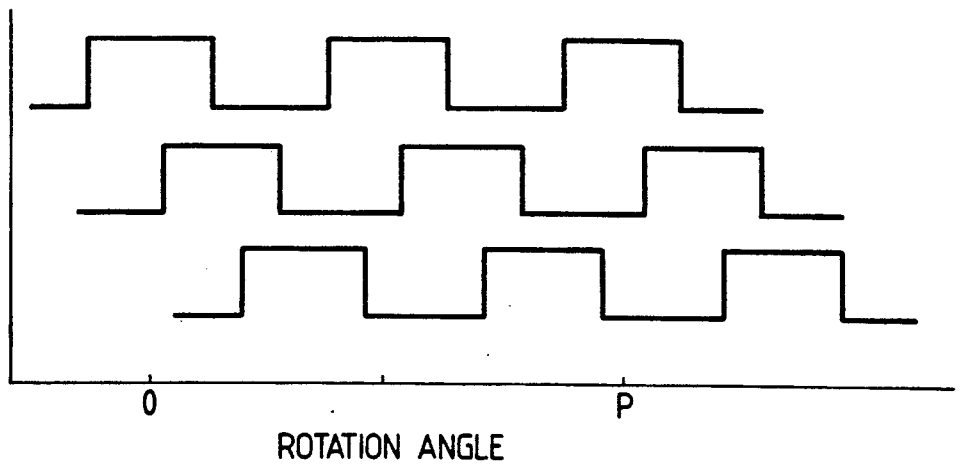
Figure 22B:
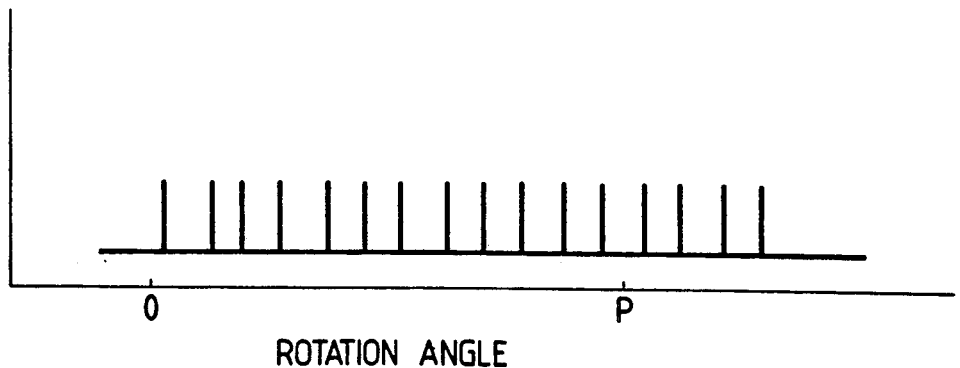
Figure 23:
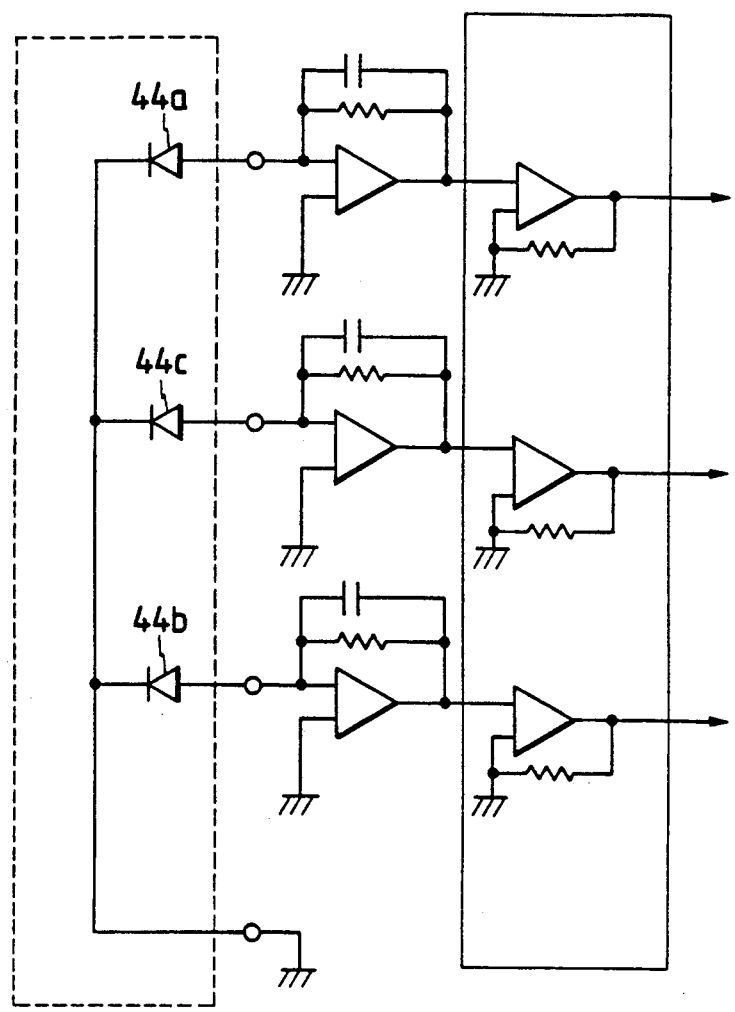

To be specific, the 3-phase signals are changed, as illustrated in FIG. 22A, in a rectangular waveform through the respective comparators by use of a signal processing circuit of FIG. 23. The signals are, as depicted in FIG. 22B, pulsed at timings of the rise and fall of the individual signals. The cylindrical grating unit rotates through P (rad), and it follows that 12 pulses are obtained. Therefore, when the number of gratings is set to n, a rotation angle signal of 12n P/R is obtained. 4-fold pulsing is effected in the previous mode where the 2-phase signals are employed. In contrast, much finer 6-fold pulsing can be performed in this mode where the 3-phase signals are employed.

Figure 24A:
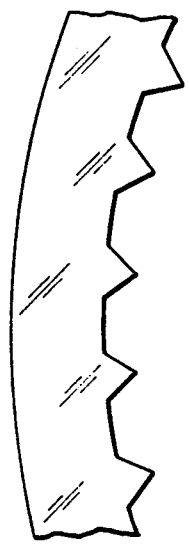
FIGS. 24a and 24B are diagrams showing a variant form of a grating configuration.
Figure 24B:
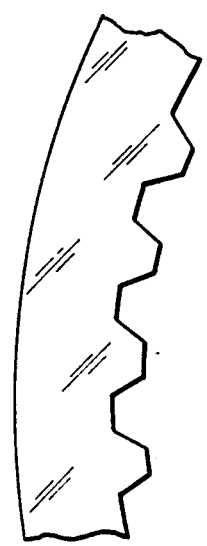

Note that in the embodiments discussed so far, the V-shaped grooves are arranged at the equal spacings to form the rugged grating unit. FIG. 24A shows a variant from in which V-shaped crests and flat portions may be alternately arranged to provide ruggedness. Another example of the rugged configuration is given in FIG. 24B. In addition, each of the rugged gratings may be formed into a curved surface. The rugged configuration is not necessarily symmetric but may be asymmetric. In any case, the rugged portions including the surfaces inclined to the incident beams are arranged at the equal spacings to constitute the grating unit. The scale is usable on condition that the scale has a function as the amplitude type diffraction grating and a wavefront splitting function as well.

In the embodiments given above, the diplophase signals are fetched by the plurality of photodetectors. If single-phase signals are satisfactory, a single piece of photodetector 44c in FIG. 5A may suffice.

The embodiment described above has dealt with the rotary encoders based on the principle of a so-called talbot interference. One of other considerable arrangements is that an optical scale furrowed with V-shaped grooves is applied to an encoder incorporating an image forming optical system, the encoder being disclosed in Japanese Patent Laid-Open Application No. 63-81212.

The light source usable in the present invention is not limited to the semiconductor laser but may be, e.g., a point light source LED. The costs can be further reduced by using the LED which is more inexpensive than the semiconductor laser.

Figure 25A:
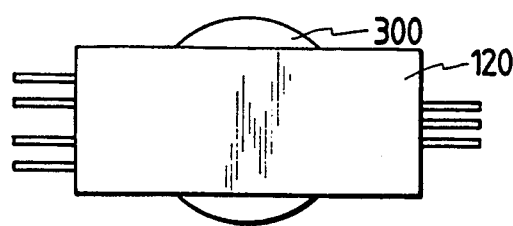
FIGS. 25A, 25B, and 25C are block diagrams depicting a motor encoder.
Figure 25B:
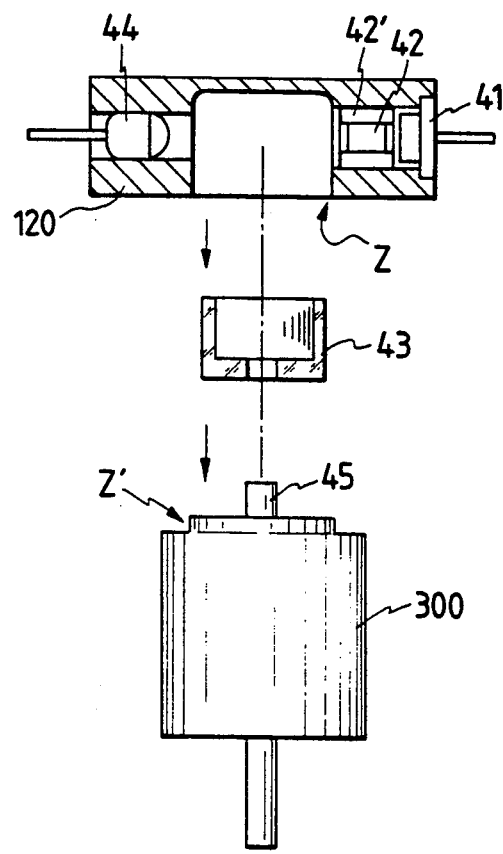
Figure 25C:
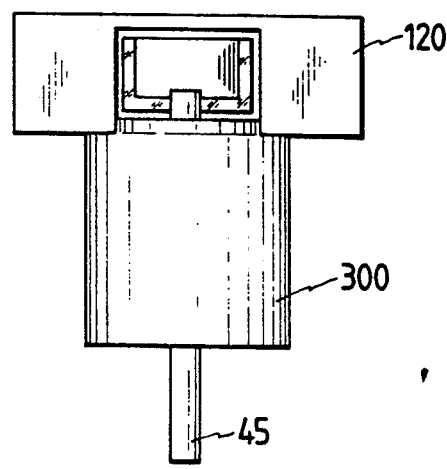

FIG. 25 is a block diagram showing an application example of the above-mentioned encoder, wherein the encoder is attached to a rotation output unit of a motor to provide a united motor encoder. FIG. 25A is a top view thereof. FIG. 25B is a side elevation showing a state where the motor encoder is assembled. FIG. 25C is a side elevation depicting the completed motor encoder. The scale 43 is at first attached to a rotary shaft 45 at the rear end of a motor 300 in any one of the ways described in FIGS. 8 through 12. Members such as a semiconductor laser 41, a collimator lens 42, a lens holder 42' and a photodetector 44 (any one of the above-described photodetectors 44a, 44b and 44c) are combined into a united detecting head unit 120. This detecting head unit 120 is covered on the scale 43. A fitting portion Z of the detecting head unit 120 is joined to a fitting portion Z' of the case rear end of the motor 300, thus uniting the components as shown in FIG. 25C.

The rotary scale is secured directly to the rotation output unit of the motor in this manner. The detecting head unit for reading the rotations is made integral with the motor case. The motor encoder which is easy to align can be attained with a simple construction. Furthermore, the rotary scale and the detecting head unit are configured separately, thereby facilitating the assembly.

Figure 26:
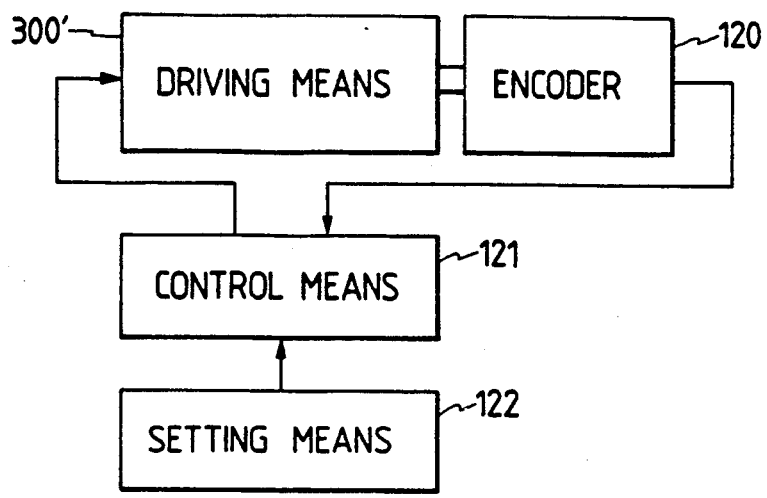
FIG. 26 is a system block diagram illustrating an encoder-based driving system.

FIG. 26 is a system block diagram of a driving system including the rotary encoder, showing one example of a system using the encoder given above. A driving means 300' has driving sources such as a motor, an actuator and an internal combustion engine. The encoder 120 explained above is connected to a rotation output unit of the driving means 300', thereby detecting driving conditions such as a rotation quantity and a rotating speed. A detection output of this encoder is fed back to a control means 121. In the control means, a driving signal is transmitted to the driving means 300' to develop a driving condition set by a setting means 122. This type of feedback system is thus configured, whereby the rotational status set by the setting means can be obtained. This driving system is applicable to a variety of machine tools or manufacturing machines, measuring instruments, robots, cameras, audio devices and information devices. The driving system is not limited to these devices but is applicable more widely to the whole device incorporating the driving means.

The cylindrical optical scales employed in the first and second embodiments can be manufactured by, e.g., plastic molding. The optical scales can be provided at quite low costs. The cylindrical scales used therein serve to miniaturize the device and decrease the inertia. Besides, the cylindrical scales facilitate the assembly.

In accordance with an embodiment which will hereinafter be described, a rotary encoder comprises: a hollow body; gratings arranged in a rotation detecting direction in the hollow body; a light irradiation means for irradiating a first region formed with the grating with a beam from inside of the hollow body and projecting a Fourier image of the grating of the first region on the grating of a second region different from the first region of the hollow body by using the beam reflected from the grating of the first region; and a photodetector means for receiving the beam reflected from the grating of the second region. These components are configures to project the Fourier image of the grating of the first region on the grating of the second region. This configuration eliminates the necessity for incorporating the image forming optical system in an interior (hollow portion) of the hollow body. It is therefore feasible to reduce a diameter of the hollow body. An extremely small-sized rotary encoder can be provided.

Figure 27:
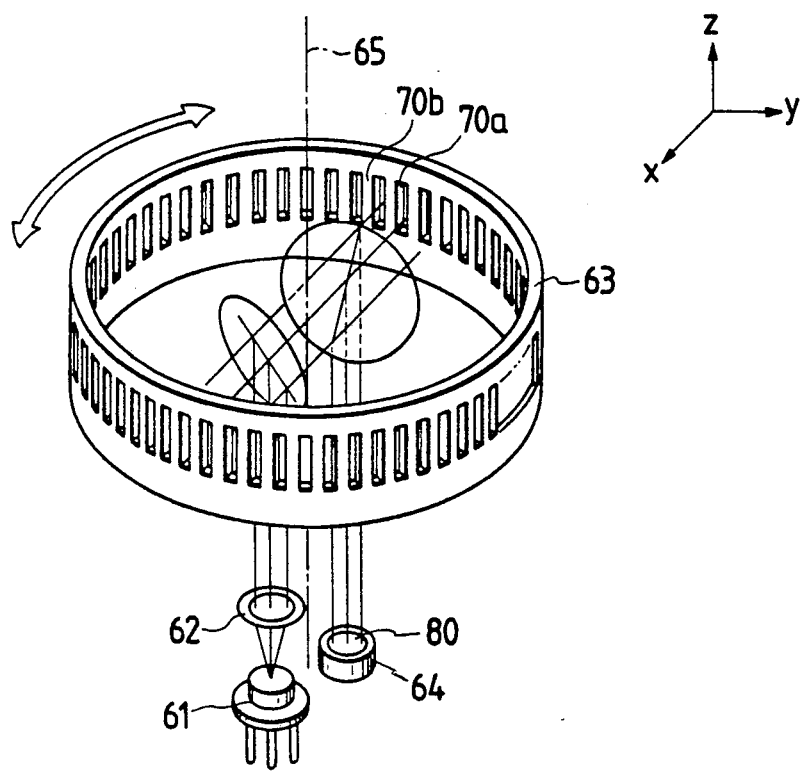
FIG. 27 is a perspective view depicting a rotary encoder in a fourth embodiment of the invention.

FIG. 27 is a perspective view showing a fourth embodiment of the invention. Referring to FIG. 27, the numeral 61 designates a semiconductor laser for emitting coherent beams (monochromatic beams) each having a wavelength λ. A collimator lens system 62 functions to collimate the divergent beams emerging from the semiconductor laser 61 into substantially parallel beams within an x-z plane. The collimator lens system involves the use of, for instance, anamorphic lens or the like; and the beams are emitted in a convergent state in a direction perpendicular to the x-z plane. A hollow body 63 is herein a cylindrical rotary body. The hollow body 63 rotates in arrowed directions about a rotary axis 65 parallel to the generatrix of the cylinder. The rotary body 63 is connected via an unillustrated connector to a driving shaft of a motor or the like. The rotary body 63 is employed as an optical scale for detecting a rotation quantity of the driving shaft. The axis 65 coincides with the central axis of the driving shaft. The axis 65 also substantially coincides with the central axis of the rotary body.

The rotary body 63 is composed of a light reflective material such as a metal, glass or plastic. A side surface 70 of the rotary body 63 is formed with a multiplicity of slits 70a arranged at equal spacings at pitches P in rotational directions thereof. The beams incident on the side surface 70 of the rotary body 63 travel through the slits 70a and are reflected by portions 70b between the slits 70a. Namely, the slits 70a are transmitting portions, whereas the portions 70b are reflecting portions. These transmitting portions and the reflecting portions are alternately regularly arranged in the rotational direction, thus forming the gratings. An optical scale is thus constructed. A photoelectric converting element 64 consists of photodetectors. The photoelectric converting element 64 outputs an electric signal corresponding to an intensity of the beam incident on a light receiving surface 80.

The numerals 66 and 67 represent half-mirrors.

Figure 28:
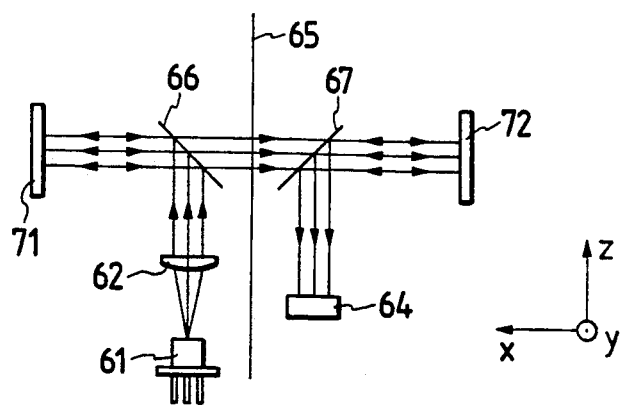
FIG. 28 is a sectional view showing the same encoder.

FIG. 28 is a sectional view showing the fourth embodiment of this invention. The present invention will hereinafter be explained with reference to FIG. 28.

The beams emerging from the semiconductor laser 61 are collimated into substantially parallel beams by means of the collimator lens system 62. A part of the parallel beams are reflected leftwards by the half-mirror 66 and incident upon a first region 71 of the rotary body 63.

The beam reflected by the first region again reaches the half-mirror 66. The beam passing through the half-mirror 66 further penetrates the half-mirror 67. A second region 72 is irradiated with these beams.

A spacing d (hereinafter referred to as [as diameter d of the rotary body]) along the optical axis between the gratings of the first and second regions 71 and 72 is set to satisfy the following relation:

$$d = N \frac{P^2}{\lambda} \quad (N = 3)$$

$$P = \frac{\pi d}{n} \quad (n \text{ is the total number of slits})$$

where P is the grating pitch, and λ is the wavelength. The diameter d of the rotary body 63 is thus set. As a result, an image of the grating in the first region 71 of the side surface 70 of the rotary body 63 can be projected directly on the grating of the second region 72. In this case, there is no necessity for incorporating an image forming optical system into the hollow portion of the rotary body 63. The grating image projected thereon is known as a Fourier image. This grating image is formed by self-image-forming action of the grating concomitantly with a light diffractive phenomenon. The rotary body 63 in this embodiment assumes a cylindrical shape, and hence the Fourier image is bent somewhat, with the result that the contrast tends to degrade. However, if the semiconductor laser 61, the collimator lens system 62, the half-mirrors 66, 67 and the rotary body 63 are constructed to fulfill the following conditions, there is no problems in practical use.

$$\left(N - \frac{1}{4}\right)\frac{P^2}{\lambda} < d < \left(N + \frac{1}{4}\right)\frac{P^2}{\lambda}$$

(N is the natural number)

$$P = \frac{\pi d}{n}$$ (n is the total number of slits)

The above is a description of the beams traveling in directions parallel to the sheet surface in FIG. 28. The beams traveling in directions perpendicular to the sheet surface will be explained.

Figure 29:
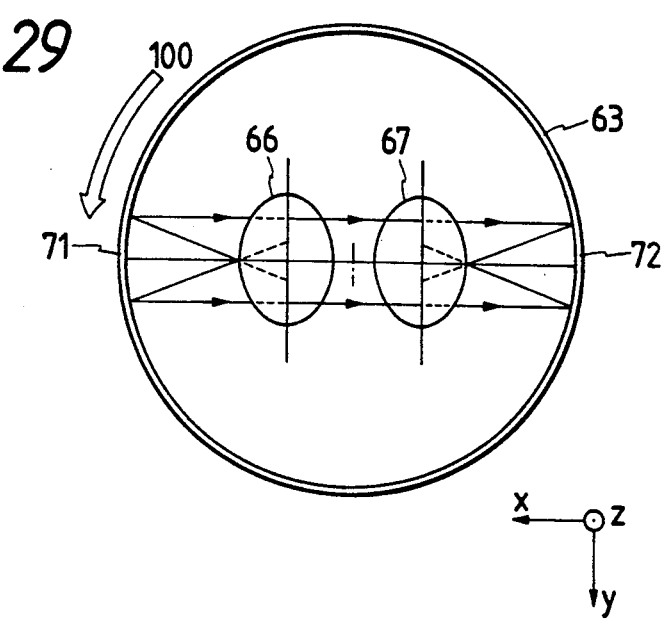
FIG. 29 is a top view showing the same encoder.

FIG. 29 is a top view showing the embodiment of this invention.

The beams emerging from the collimator lens system 62 are, as explained earlier, substantially parallel beams in the direction parallel to the sheet surface (within the x-z plane) in FIG. 28. Whereas in the directions perpendicular to the sheet surface in FIG. 28, the beams, after being reflected by the internal surface of the rotary body 63, become substantially parallel beams.

Namely, a distance from the reflection surface of the rotary body 63 is set to have a focal point at a point of ½ of a radius of curvature of the reflection surface.

With this arrangement, the beams reflected from the cylindrical reflection portion of the rotary body become substantially parallel beams. The parallel beams then go to the second region 72.

The principle of detecting a rotation angle will be described in detail with reference to FIG. 29.

The beams coming from the semiconductor laser 61 are reflected by the reflection surface of the rotary body 63. The reflected beams are collimated into parallel beams by the collimator lens system 62. The first region 71 of the rotary body 63 is illuminated with the parallel beams. The parallel beams are diffracted by the grating of the first region 71. 0th-order, ±first-order and ±second-order diffracted beams are produced from the grating of the first region 71. Two or three beams of the 0th-order and ±first-order diffracted beams interfere with each other. Due to this interference, the Fourier image of the grating of the region 71 is projected on the grating of the region 72. A shading pitch of the Fourier image is equal to the pitch P of the grating of the region 71. As described above, the Fourier image is bent along a curved surface of the region 72. This does not influence an accuracy of measurement so much.

Supposing that the rotary body 63 rotates, as illustrated in FIG. 29, in an arrowed direction 100 (CCW direction: counterclockwise direction). The Fourier image shifts in an opposite direction (CW direction: clockwise direction) to the arrow 100. At this time, the grating of the region 72, on which the Fourier image is projected, shifts in the arrowed direction 100. Hence, a relative angular variation between the Fourier image and the grating of the region 72 is 2θ when the rotary body 63 rotates through an angle θ. A rotation angle can be measured with a resolving power that is twice the grating pitch.

The grating of the region 72 is illuminated with the Fourier image of the grating of the region 71. The beam reflected by the grating of the region 72 is incident on the light receiving surface 80 (not shown in FIG. 29) of the photoelectric converting element 64. The photoelectric converting element 64 converts the received beam into an electric signal. Based on this signal, the rotation angle of the rotary body 63 is measured. In the rotary encoder in this embodiment, as explained earlier, when the rotary body 63 rotates through the angle θ, the Fourier image of the grating of the region 71 and the grating of the region 72 relatively rotate through an angle 2θ. For this reason, if the total number of the slits 70a of the rotary body 63 is n, (2n)-pieces of sine wave pulses are outputted from the photoelectric converting element 64 per rotation of the rotary body 63. The rotation angle is measured by sequentially counting the sine wave pulses. A rotating speed of the rotary body 63 can be detected based on the sine wave pulses from the photoelectric converting element 64.

As described above, there is no necessity for incorporating the image forming optical system into the cylindrical rotary body 63. The rotary body can be miniaturized correspondingly.

Figure 30:
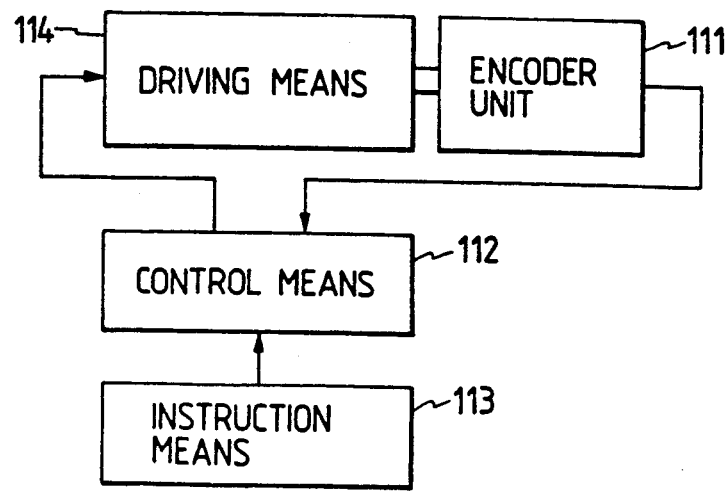
FIG. 30 is an explanatory diagram showing an example of using the same encoder.

FIG. 30 is a system block diagram of a driving system using the encoder, showing an application example of the encoder. An encoder unit 111 is connected to a movement unit of a body to be driven or a driving output unit of a driving means 114 including a driving source such as a motor, an actuator and an internal combustion engine. With this arrangement, there are detected driving conditions such as a rotation quantity and rotating speed, or a moving quantity and moving speed. The encoder unit 111 is constructed in the manner shown in FIG. 1. A detection output from the encoder unit 111 is conceived as an output, i.e., a counter output, of the result of counting the pulses by an unillustrated known counter provided in the encoder unit 111. An instruction signal is transmitted from an instruction means 113 to a control means. The instruction means 113 may be a known control panel (e.g., a keyboard) by which the operator is capable of directly controlling the driving condition of the driving means. Alternatively, the instruction means 113 may be a memory means for automatically transmitting a control signal on the basis of set conditions recorded. The control means 112 compares an output of the counter incorporated into the encoder unit 111 with the instruction signal. The control means 112 transmits a driving signal to the driving means 114 to obtain an instructed rotation angle (or a rotating speed). Such a feedback system is constructed, thereby making it possible to keep the driving condition instructed by the instruction means 113 without undergoing influences from outside. This type of driving system is applicable to, e.g., machine tools, manufacturing machines, industrial robots, measuring instruments and recording devices. The driving system is not limited to these device but is applicable more widely to general devices having the driving means.

The driving system is, as illustrated in FIG. 30, incorporated also into an embodiment which will be described with reference to FIGS. 5 to 11.

Figure 31A:
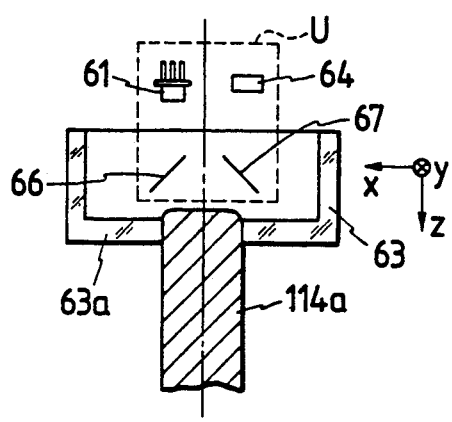
FIGS. 31A, 31B, 31C, and 31D are sectional views each showing a configuration of a connecting unit to the driving means of the rotary encoder in this embodiment.

FIG. 31A is a sectional view depicting a state of a connecting unit between the driving means 114 and the encoder unit 111 shown in FIG. 30. In FIG. 31A, the symbol 63a denotes a fitting member provided integrally with a bottom surface of the cylindrical rotary body 63. A rotary shaft 114a serves as a moving unit of a body to be driven or a driving output unit of the driving means. A semiconductor laser 61, a photoelectric converting element 64 and half-mirrors 66, 67 are integrally fixedly disposed as components of a unit U provided in a fixed position. The unit U defined as a detecting head and the cylindrical rotary body are configured separately. In this embodiment, the fitting unit provided integrally with the bottom part of the rotary body 63 is fitted to the rotary shaft, thus effecting the connection therebetween.

The cylindrical grating unit in this embodiment includes the shaft fitting member fitted directly to the rotary shaft the rotation of which is detected. The shaft fitting member can be integrally formed by plastic molding, for instance, injection molding or compression molding. It is therefore possible to secure a high concentricity between the grating surface serving as gradations for detecting the rotation and the fitting portion and also a high fitting accuracy between the shaft and the fitting portion. A rotation detecting accuracy can be thereby enhanced. As a matter of course, the mounting members are unnecessary. The space can easily be saved, and the costs can be also reduced.

Figure 31B:
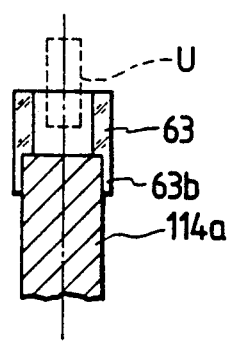
Figure 31C:
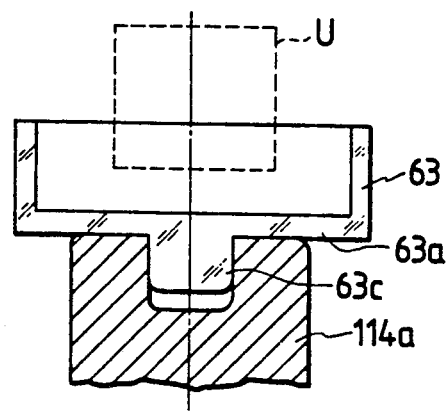
Figure 31D:
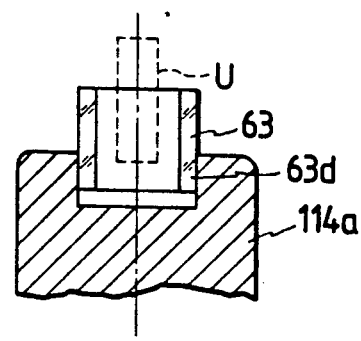

FIGS. 31B, 31C and 31D are sectional views each showing a state of connecting portion between the driving means 114 and the encoder unit 111 in the embodiment shown in FIGS. 5 to 7 according to the present invention. The same components as those in the embodiments discussed above are marked with the like symbols. Other configurations, operations and principles of the embodiment of FIGS. 5 through 7 are the same as those of the fourth embodiment, and the description thereof is omitted.

In a fifth embodiment of FIG. 31B, a fitting recess is formed in the internal surface of the rotary body 63. In a sixth embodiment of FIG. 31C, a fitting protrusion is provided on a fitting portion 63a of the rotary body 63. Fitting is thus effected. In a seventh embodiment of FIG. 31D, a portion 63d on the external surface of the rotary body 63 serves as a fitting portion intactly. In any case, the fitting portions are formed integrally with the rotary body. The same effects explained in the fourth embodiment are exhibited.

Figure 32:
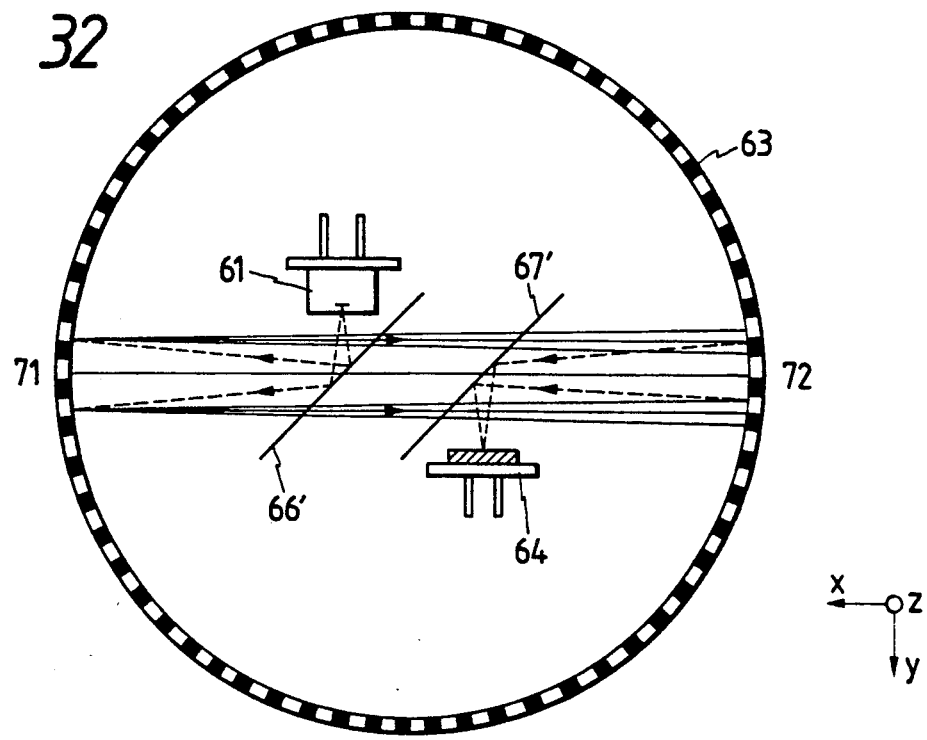
FIG. 32 is a top view depicting the rotary encoder in an eighth embodiment of the invention.

FIG. 32 is a top view showing an eighth embodiment of this invention. The measuring principle and operation of the eighth embodiment are the same as those of the fourth embodiment, and the description thereof is omitted. The explanation will be given with reference to only the top view similar to FIG. 29. The following is a description of one different arrangement of the eighth embodiment from the fourth embodiment. The semiconductor laser 61 emits the beams from a direction y. A half-mirror 66' reflects the beam in a direction x. A half-mirror 67' reflects the reflected beams from the region 72 in a direction y. This arrangement is practicable. Other difference is that no collimator lens system 62 is prepared. In this case, the placement is performed so that a distance (length of a light path) leading from a light emitting point of the semiconductor laser 61 via the half-mirror 66' to a reflection surface of the region 71 is substantially one-half of a radius of curvature of a reflection surface of the rotary body 63. With this arrangement, the reflected beams from the region 71 become substantially parallel beam within the x-y plane. The reflected beams from the region 71, however, do not become the parallel beams in the direction perpendicular to the sheet surface (within the Y-Z plane). Consequently, the beams incident on the photoelectric converting element 64 via the half-mirror 67' after being reflected by the region 72 decrease in light quantity in proportion to the divergence within the y-z plane as compared with the fourth embodiment. Besides, the contrast of the Fourier image on the region 72 degrades. A large proportion of influences by these phenomena can be eliminated by reducing a divergent angle of the semiconductor laser 61 or decreasing the light path to the element 64.

Figure 33:
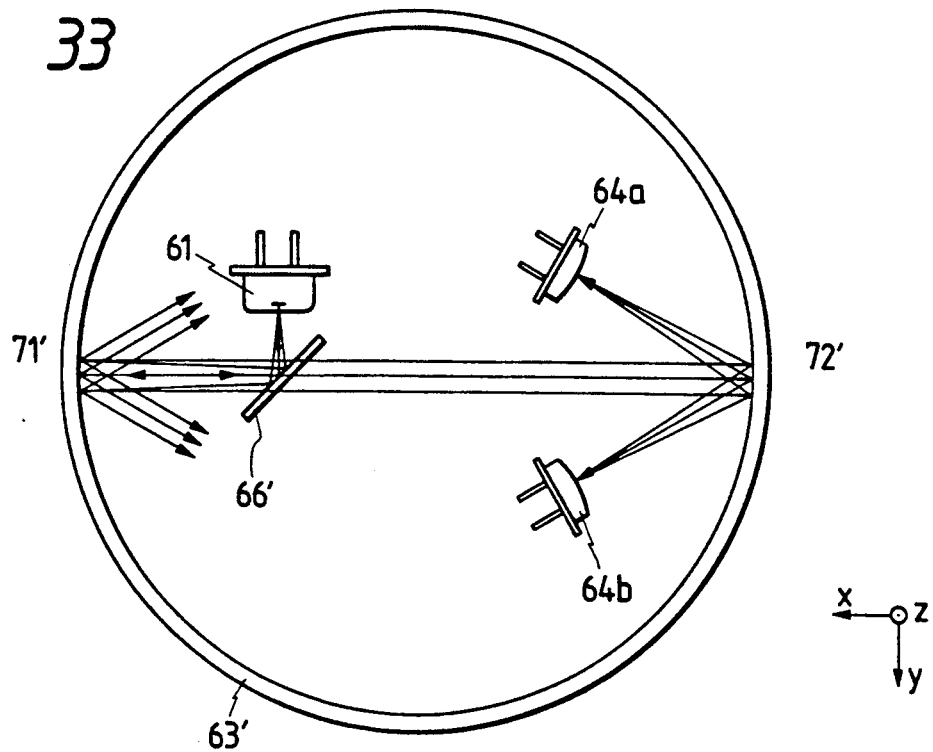
FIG. 33 is a top view illustrating a rotary encoder in a ninth embodiment of the invention.

A ninth embodiment of this invention will be explained referring to FIG. 33. The ninth embodiment has the following arrangement different from the eighth embodiment. A cylindrical grating unit furrowed with reflective V-shaped grooves, which will be mentioned later, is provided on a cylindrical rotary body 63'. No half-mirror 67' is prepared herein. Furthermore, the two beams emerging obliquely from a region 72' are received by two photoelectric converting elements 64a, 64b, thereby obtaining 2-phase sine wave pulse outputs assuming different phases.

Figure 34:
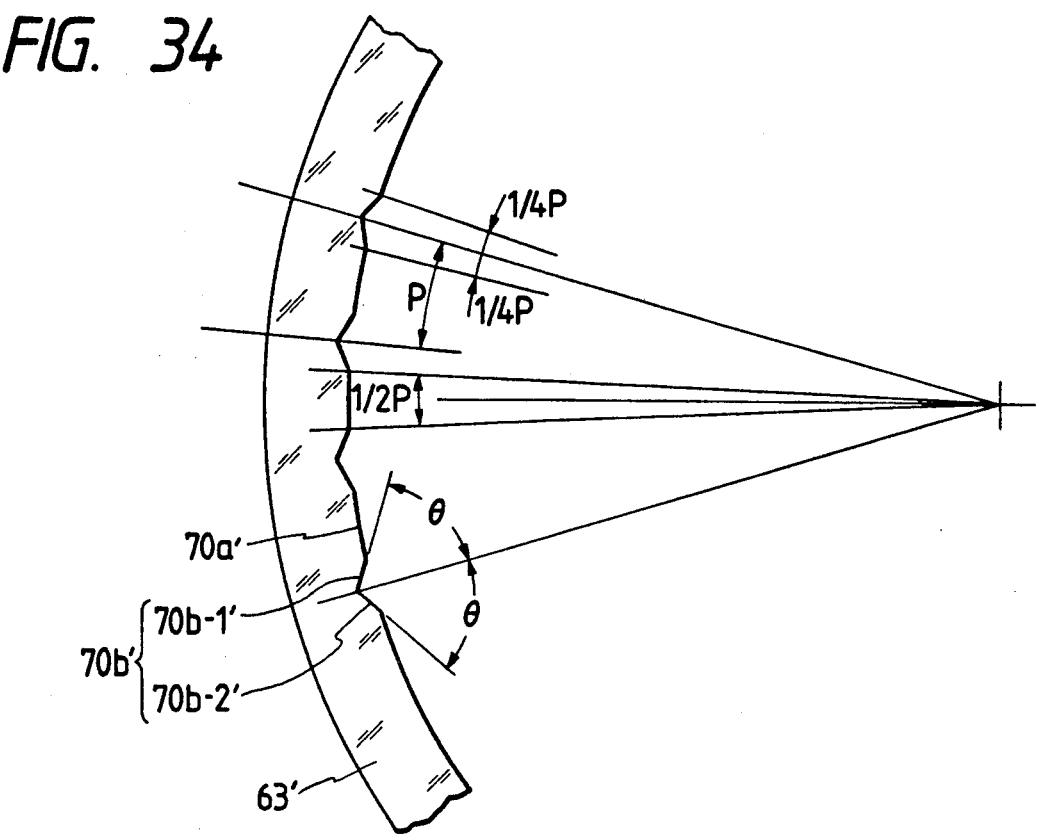
FIG. 34 is an explanatory view showing a grating unit of the same encoder.

The cylindrical grating unit with the reflective V-shaped grooves will be explained in detail. FIG. 34 is an explanatory view showing the grating unit.

Figure 35:
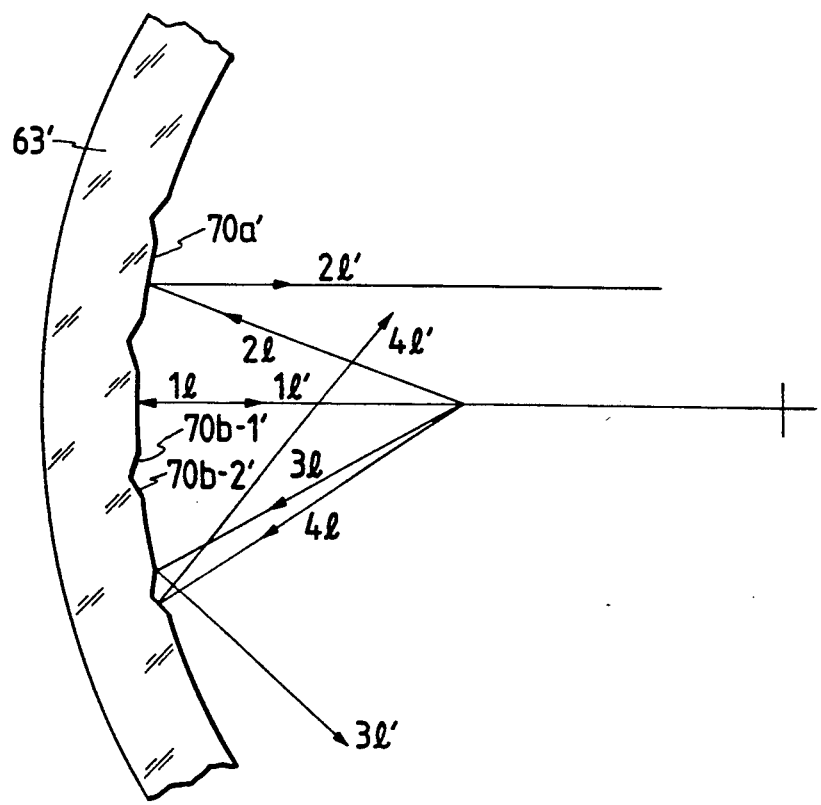
FIGS. 35 and 36 are diagrams of assistance in explaining beam action of the same grating unit.
Figure 36:
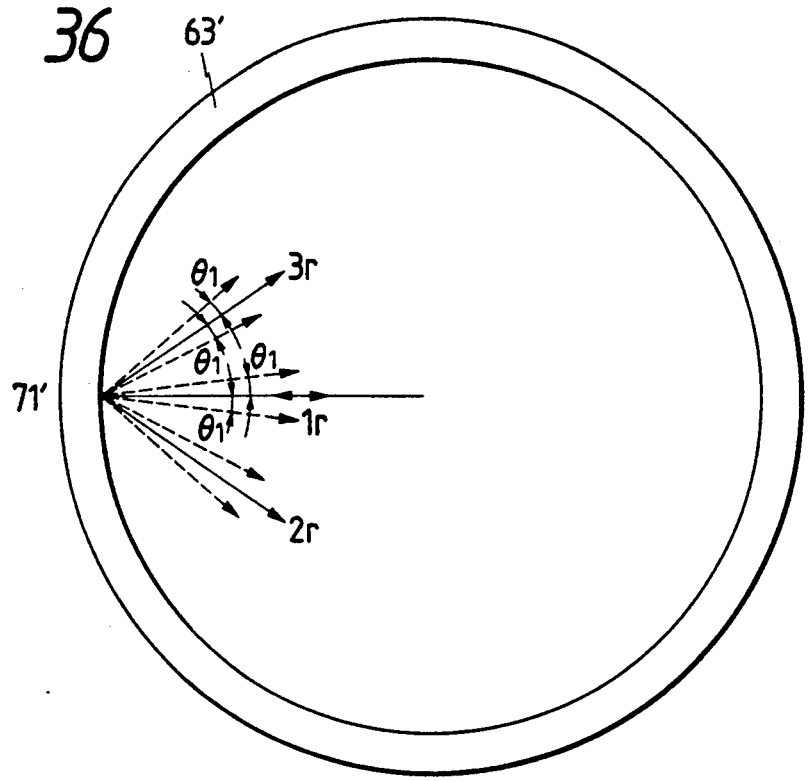

FIGS. 35 and 36 are views of assistance in explaining the light beam action of the gratings.

The symbol 70a' represents a flat reflecting portion formed between the V-shaped grooves (hereinafter referred to as a V-groove); and 70b' denotes a V-groove portion. Two flat reflecting portions 70b-1' and 70b-2' cooperate to form the V-groove 70b'.

n-pieces of V-grooves 70b' are arranged at equal spacings at pitches P (rad) in the peripheral direction along the internal side surface of the rotary body 63' (nP=2πrad). A width of one V-groove 70b' is set to ½ P (rad). Each of the two flat reflecting portions 70b-1' and 70b-2' which form one V-groove has a width equivalent to ¼ P(rad). Each oblique surface has a value θ which falls within a range of 45<θ<90 (deg) with respect to the plane formed by connecting a V-groove bottom angular part to the central axis of the cylinder. In this embodiment, θ=75 (deg).

The optical action of the V-groove reflection grating unit of this invention will be explained referring to FIG. 35.

Provided within the cylinder is a point light source 0 (which herein indicates a position equivalent to a divergent origin of the semiconductor laser 61 when the half-mirror 66' is not prepared). FIG. 35 shows a beam follow-up result when the beams from the point light source 0 are incident on the reflection surfaces 70a', 70b-1' and 70b-2'. Beams 1l–4l are reflected as indicated by 1l'–4l'. As can be understood from FIG. 35, the beam reflected by the flat reflecting portion 70a' travels as a beam substantially parallel to the radial direction of the cylinder. The beams reflected by the flat reflecting portions 70b-1' and 70b-2' travel in other directions. Now turning to FIG. 36, the light beam action of FIG. 35 will be described in association with the whole region 71' irradiated with the beams. Considering a relation in reflection angle between the respective surfaces 70a', 70b-1' and 70b-2' and a diffractive effect within the region 71', positive reflected beams (0th-order beams) from the individual surfaces are indicated by 1r, 2r and 3r. Besides, ±first-order beams (indicated by broken lines in the Figure) are generated with the beams 1r, 2r and 3r each interposed therebetween. (High-order diffraction beams, though generated, have a weak intensity enough not to cause any influence, and hence the description thereof is omitted).

The ±first-order beams and each positive reflected beam interposed therebetween cooperate to form the Fourier image. There is herein employed the Fourier image formed by the positive reflected beam 1r from the surface 70a' and the ±first-order beams between which 1r is sandwiched in.

The 0th-order beams 2r and 3r from the V-groove surfaces 70b-1' and 70b-2' and the ±first-order beams incidental thereto are superposed on the region of the 0th-order and ±first-order beams from the flat reflecting portion 70a'. This causes a noise of the Fourier image. Hence, it is required that the angle θ of the V-groove be set to prevent a crossover. The crossover is a phenomenon in which the ± first-order beams from the V-groove are superposed on the region of the ±first-order diffracted beams by the flat surface grating 70a', or alternatively the ±first-order beams approach the central 0th-order beam. An angle $\theta_1$ (unit: deg) to the central 0th-order beam between the ±first-order beams is given by:

$$\sin \theta_1 = \frac{\lambda}{P}$$

$$\theta_1 = \sin^{-1}\left(\frac{\lambda}{P}\right)$$

where P is the grating pitch (unit: rad), and λ is the wavelength. To prevent the crossover, θ is required to be set such as:

$$90 - \theta > \theta_1$$

namely, $$\theta < 90 - \sin^{-1}\left(\frac{\lambda}{P}\right)$$

(unit: deg)

To be specific, as explained before, it is desirable to take a value within a range of 45<θ<90 (deg).

Turning back to FIG. 33, the beams emitted from the light source unit 61 are incident on the cylindrical grating unit 63' through the half-mirror 66'. The incident beams, as described in FIGS. 34 to 36, travel separately in three directions. As explained before, there is used especially the Fourier image formed by the positive reflected beam (0th-order beam) from the grating portion 70a' and the ±first-order beams therefrom. In this case, the Fourier image can be formed on the second region 72' by the same action as that of the previous embodiment.

The shading grating image formed on the second region 72' is reflected by the grating portion of the second region. At this moment, the shading grating image is incident selectively on the reflection surfaces 70a', 70b-1' and 70b-2' with the rotations of the grating unit. The reflection surfaces 70b-1' and 70b-2' are disposed such that the centers deviate from each other by ¼ pitch, i.e., P/4. The positive reflected beam from 70b-1' is received by a photodetector 64a, while the positive reflected beam from 70b-2' is received by a photodetector 64b. Two sine wave pulses showing a phase difference of 90° with respect to each other are thereby obtained.

A rotational direction is detected from the two sine wave pulse signals exhibiting the phase difference of 90°. Count pulses for ¼ pitch of the sine wave can be obtained. Count outputs to which the rotational direction is added are obtained by a known counter unit with the aid of the count pulses and the rotational direction detected. A method of and a device for performing this operation are well known, and hence the description thereof is omitted herein. Specifically, 500 V-grooves are furrowed inwardly of the cylinder having a diameter of 5 mm. 4000 count pulses are obtained per revolution by use of this device.

In accordance with this embodiment, the cylindrical grating unit is formed not with the slits but with the V-shaped grooves. Therefore, the mass-production is attainable by suitable processing methods such as plastic injection molding or compression molding (the reflection surfaces are coated with reflective films as the case may be). The costs can be readily reduced as compared with the conventional processing methods based on the photolitho process.

As set by the above-mentioned method, the following advantage is acquired. The two sine wave pulse signals having the phase difference with respect to each other can be easily surely obtained (because of a greater amount of detected light than in the case of employing the ordinary diffraction grating).

The foregoing two reflected beams from the region 72' may be deflected in a direction Z by means of mirrors, respectively.

Figure 37:
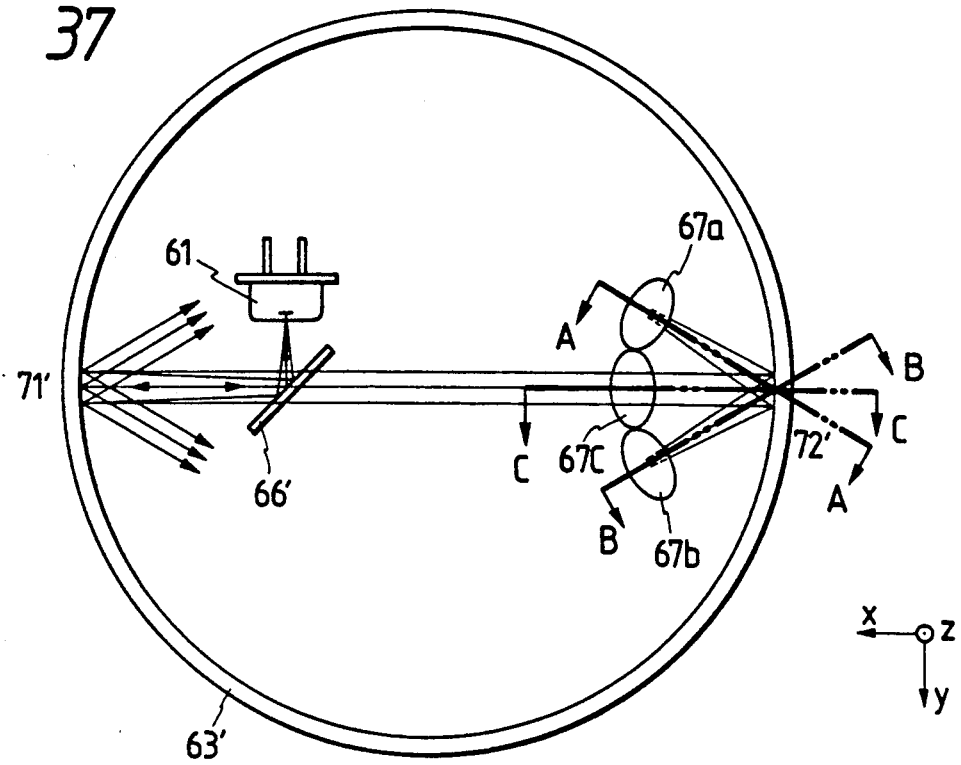
FIG. 37 is a top view depicting a rotary encoder in tenth embodiment of the invention.

FIG. 37 is a top view showing a tenth embodiment of the invention. In this embodiment, as depicted in the reflected beams from the flat reflecting portion 70a' of the region 72' are also reflected in the direction Z by use of a half-mirror 67c. These three reflected beams are respectively detected, thereby obtaining 3-phase sine wave pulse signals assuming different phases. This arrangement is different from the ninth embodiment.

Figure 38A:
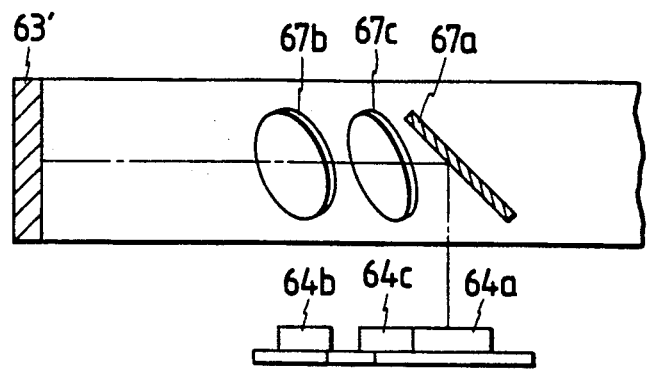
FIGS. 38A, 38B, and 38C are sectional views taken substantially along the lines A—A, B—B and C—C of FIG. 37.
Figure 38B:
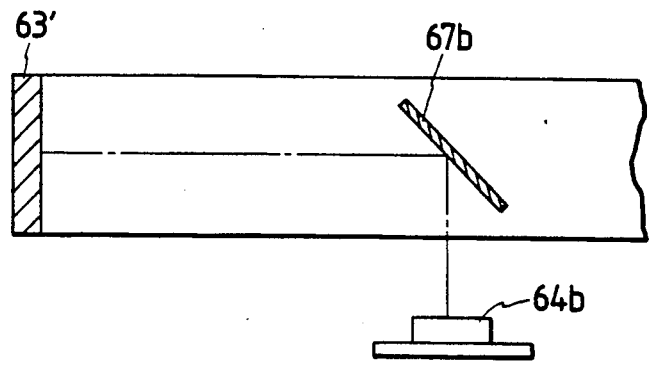
Figure 38C:
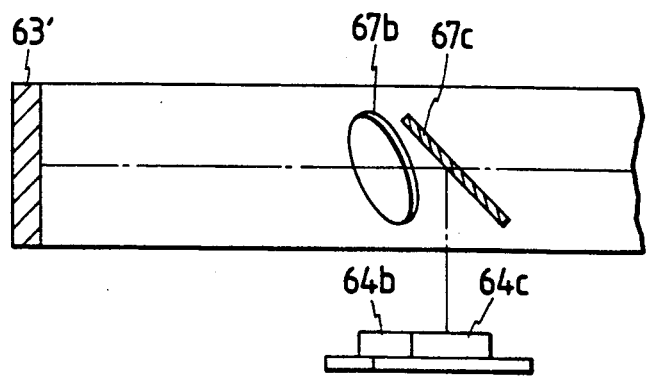

FIGS. 38A, 38B and 38C are sectional views taken substantially along the lines A—A, B—B and C—C of FIG. 37. The reflected beams from the flat reflecting portions 70b-1', 70b-2' and 70a' are detected by photoelectric converting elements 64a, 64b and 64c.

Figure 39A:
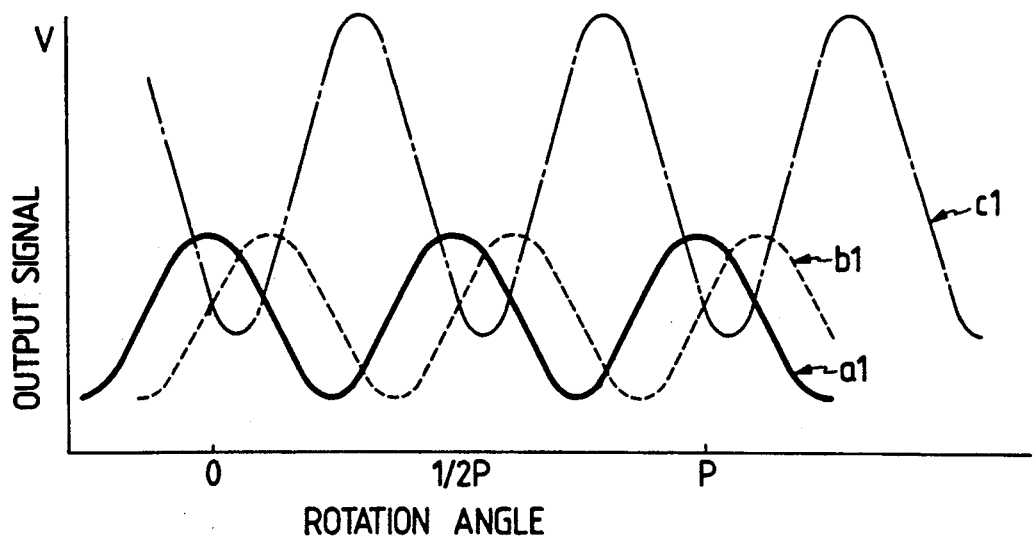
FIGS. 39A, 39B, and 39C are diagrams illustrating waveforms of signals in the same encoder.

This embodiment will hereinafter be explained. Based on the construction discussed above, the waveforms of the output signals are exemplified by FIG. 39A.

When rotating in the CCW direction:
the output waveform of the photoelectric converting element 64a is a1 (b1 when rotating in the CW direction);
the output waveform of 64b is b1 (a1 when CW); and
the output waveform of 64c is c1 (also c1 when CW).

In this embodiment, when the grating unit rotates through P (rad), there appears an output sine waveform of two periods. Especially in this case, a phase difference between the output signals a1 and b1 is 90°. For this reason, the output signals a1 and b1 are used and changed in rectangular waveforms depicted in FIG. 39B through a known comparator circuit. Pulse signals shown in FIG. 39C are obtained at the rise and fall points of the respective rectangular waveforms. Eventually, 8 pulses can be acquired at the rotation angle of P (rad). Hence, it is assumed that the number of gratings provided in the rotational directions of the hollow body is set to n, (8×n)-pieces (pulse/one rotation) of rotation angle signals can be detected.

FIG. 39 illustrates the output waveforms of the V-groove cylindrical grating unit assuming the configuration of FIG. 34. In this case, the V-groove width is not ideally ½ P but becomes slightly narrower or wider such as 6/10 P. If the V-grooves having these widths are formed over the periphery, the phase difference between the output signals a1 and b1 is not exactly 90°. The value deviates somewhat from 90°. This degrades the accuracy when causing an error in the pulse interval in the case of being pulsed finally.

A method of correcting the slight deviation of the phase difference on the circuit will be described.

Figure 40A:
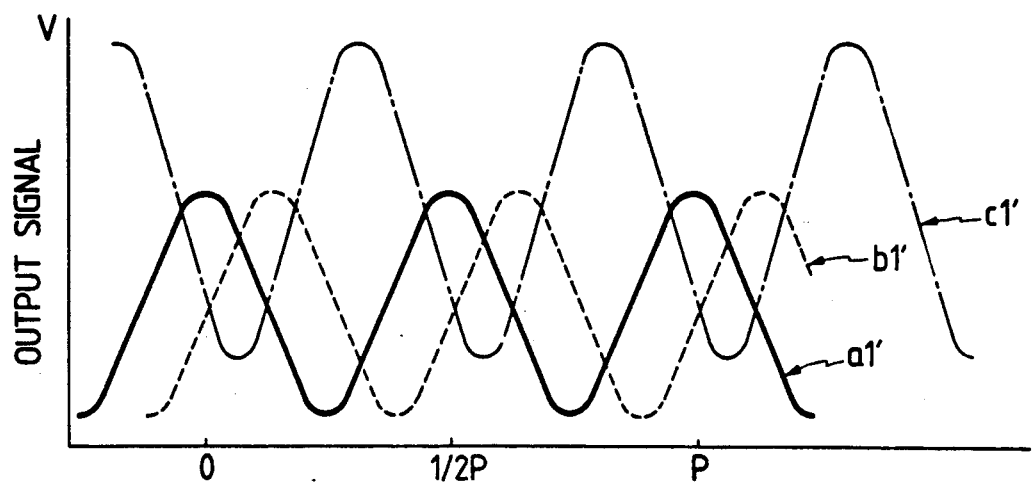
FIGS. 40A and 40B are waveform diagrams of assistance in explaining the principle of phase correction in the same encoder.
Figure 40B:
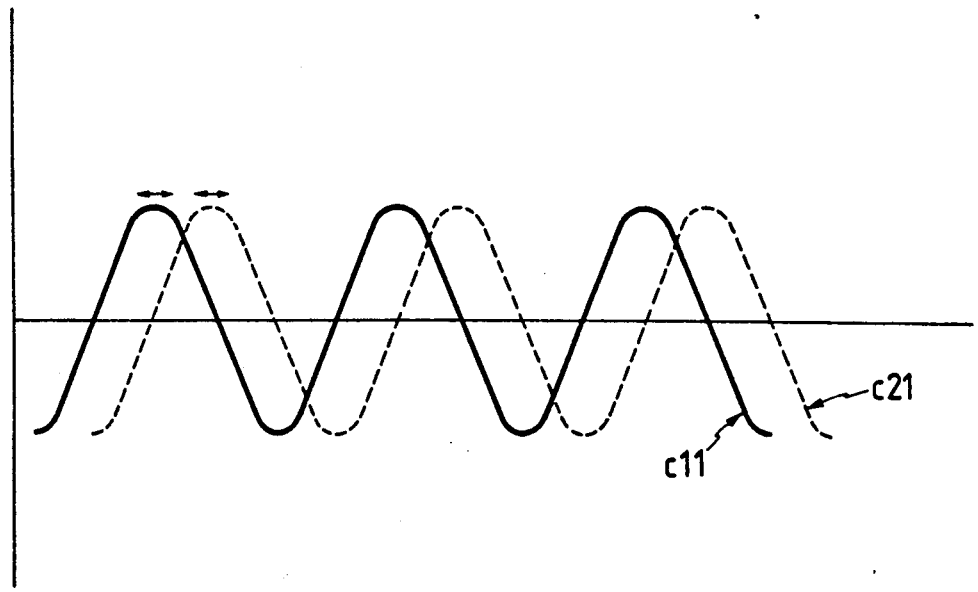

Now supposing that the V-grooves each having a width wider than ½ P are furrowed over the entire periphery of the cylinder, the phase difference between outputs a1' and b1' of the elements 64a and 64b is greater than 90°. FIG. 40A shows the waveforms indicated by a1' and b1' at that time.

A differential output signal C11 between the outputs a1 and c1 is created by adjusting amplitude gains of these outputs. Similarly, a differential output signal C21 between the outputs b1 and c1 is created by adjusting the amplitude gains of these outputs. A phase difference between the signals C11 and C21 is changeable to an arbitrary value lower than the phase difference between a1' and b1', depending on a degree of adjustment of the amplitude gains at that time. Therefore, the amplitude gains are adjusted in accordance with the V-groove width larger than designed, whereby the phase difference can be constantly precisely adjusted to 90°.

The phase difference between the signals C1 and C2 as a differential output between a signal c1' and signals a1', b1' can not be set larger than the phase difference between the original signals a1' and b1'. Therefore, the V-groove is formed beforehand in a relatively large size. With this arrangement, the phase difference becomes greater than 90° when causing an error in the phase difference. If the error is produced, the amplitude gains are adjusted to reduce a phase difference between differential outputs C11 and C21 under the phase difference between the outputs a1' and b1' by an amount of the error.

Figure 41:
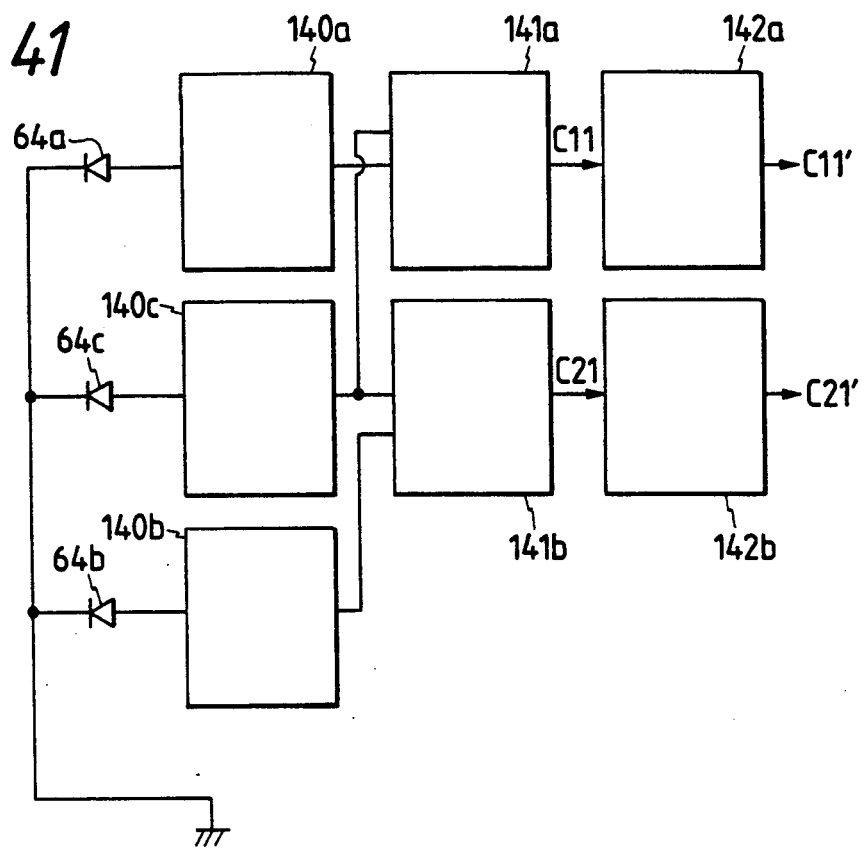
FIG. 41 is a block diagram depicting circuitry in the same encoder.

FIG. 41 is a block diagram depicting the circuitry for generating the above-mentioned differential outputs in the device of this invention. Designated at 140a, 140b and 140c are amplitude gains adjusting circuits for adjusting the amplitude gains of the output signals from the photoelectric converting elements 64a, 64b and 64c. Indicated at 141a and 141b are differential amplifiers for generating differential outputs between the outputs of the amplitude gain adjusting circuits 140a and 140b and the output of the amplitude gain adjusting circuit 140c. Comparators 142a and 142b convert the outputs C11 and C21 of the differential amplifiers 141a and 141b into binary-coded pulse signals (marked with C11' and C21') shown in FIG. 39$^B$. The outputs C11 and C21 are converted into count pulse signals (FIG. 39C) having a smaller period by a known method. The description of operations given above is omitted.

The phase difference may be adjusted to 90° by adjusting the amplitude gains of the signals a1', b1' and c1' in the amplitude gain adjusting circuit, while the operator confirms the waveforms of C11 and C21 by use of an oscilloscope or the like. If the V-groove is formed smaller than designed, an adder may be used in place of the differential amplifiers 141a and 141b.

In accordance with this embodiment, as discussed above, the 3-phase signals are taken. By employing one of these signals, the phase difference between other two signals are adjusted. Even if an error is caused in manufacturing the gratings, the error can be corrected. The rotations can be detected more accurately.

Figure 42:
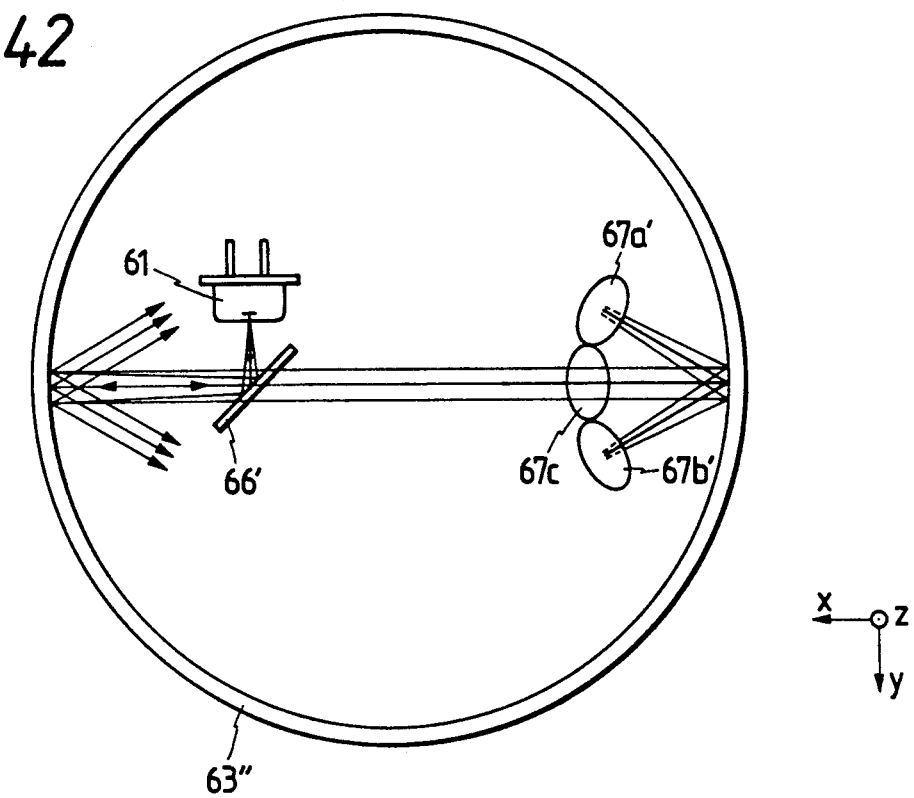
FIG. 42 is a top view showing a rotary encoder in an eleventh embodiment of the invention.

FIG. 42 is a top view showing an eleventh embodiment of this invention. In this embodiment, a cylindrical rotary body including a grating unit different from that in the tenth embodiment. Instead of the mirrors 67a and 67b, half-mirrors 67a' and 67b' having the same reflectance as that of the half-mirror 67c are employed. The output signals from the elements 64a, 64b and 64c undergo a different process from the tenth embodiment. Excepting the above, other configurations are the same as those in the tenth embodiment. The explanation of the same configurations is omitted.

Figure 43:
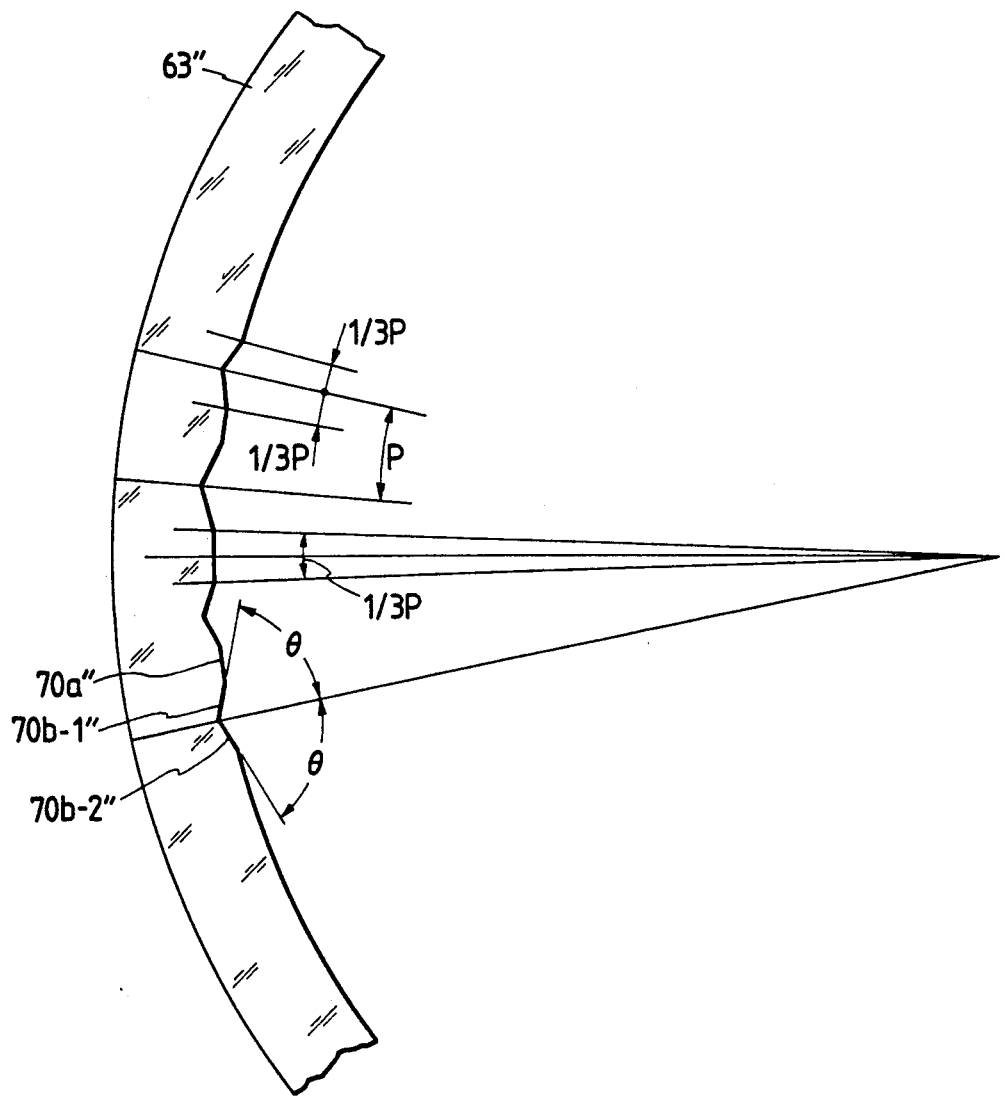
FIG. 43 is an explanatory view showing a grating unit of the same encoder.

FIG. 43 is a view of assistance in explaining a form of a grating unit of a cylindrical rotary body 63" in the same device. This type of rotary body has the following different arrangement from that shown in FIG. 34. A V-groove width is changed from ½ P given above to ⅔ P. A width of a flat surface 70a" between the V-grooves is set to ⅓ P. Widths of flat surfaces 70b-1" and 70b-2" which form the V-groove are set respectively to ⅓ P.

Figure 44A:
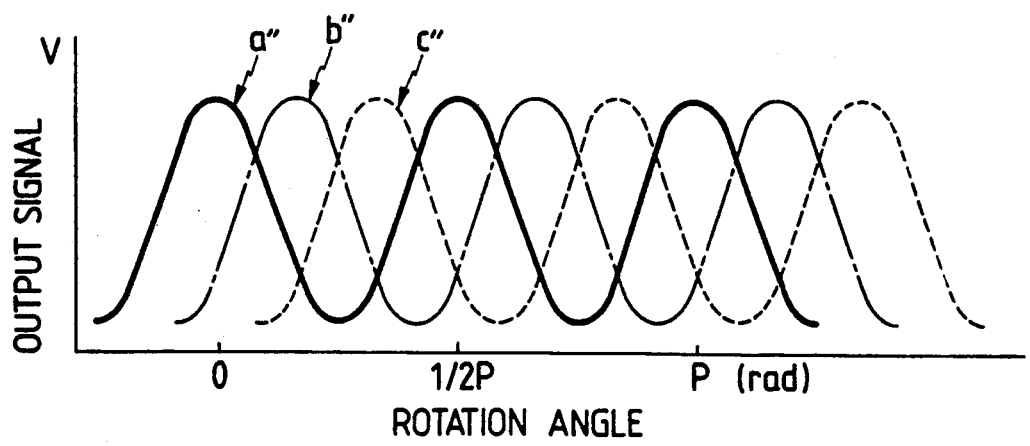
FIGS. 44A, 44B, and 44C are diagrams illustrating waveforms of signals in the same encoder.

In the thus configured grating unit, FIG. 44A shows an example of waveforms of output signals a", b" and c" of the respective elements when the beams are, as in the way with the tenth embodiment, received by the elements 64a, 64b and 64c.

Figure 44B:
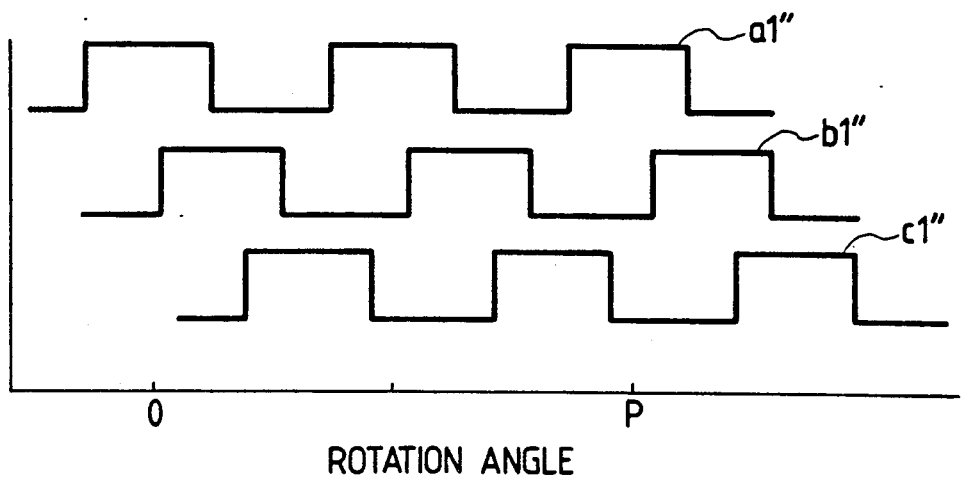
Figure 44C:
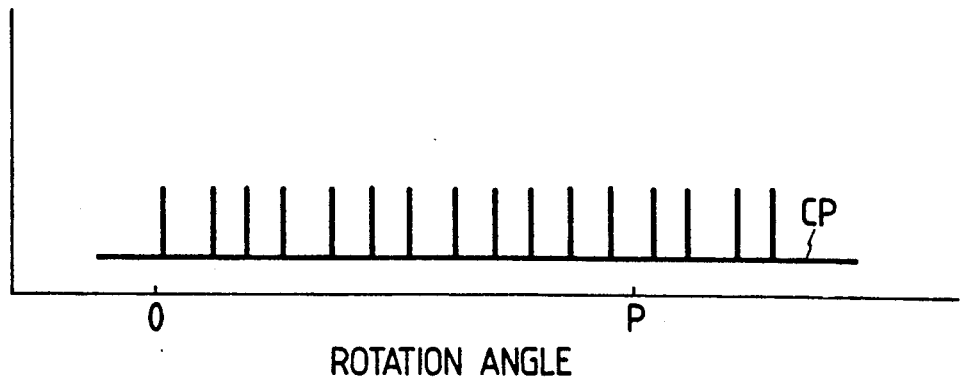

In this case, output signal amplitudes of the outputs a", b" and c" are substantially the same. Besides, an inter-2-phase relation exhibits a delay or advancement of approximately 120°. These 3-phase signals are subjected to rectangular waveform processing through the individual comparators, thus creating rectangular pulse signals (FIG. 44B). As illustrated in FIG. 44C, the pulse signals are generated at the rise and fall points of the rectangular pulse signals. A pulsing process is thus performed. When the cylindrical grating unit rotates through only P (rad), 12 pulses are obtained.

Hence, when the total number of gratings is set to n, (12×n)-pieces (pulse/one rotation) of rotation angle signals are acquired.

Owing to the grating configuration (FIG. 43) of the cylindrical grating unit of this invention, the count pulses are incremented by utilizing all three pieces of 3-phase signals. A resolving power can be thereby increased.

Figure 45:
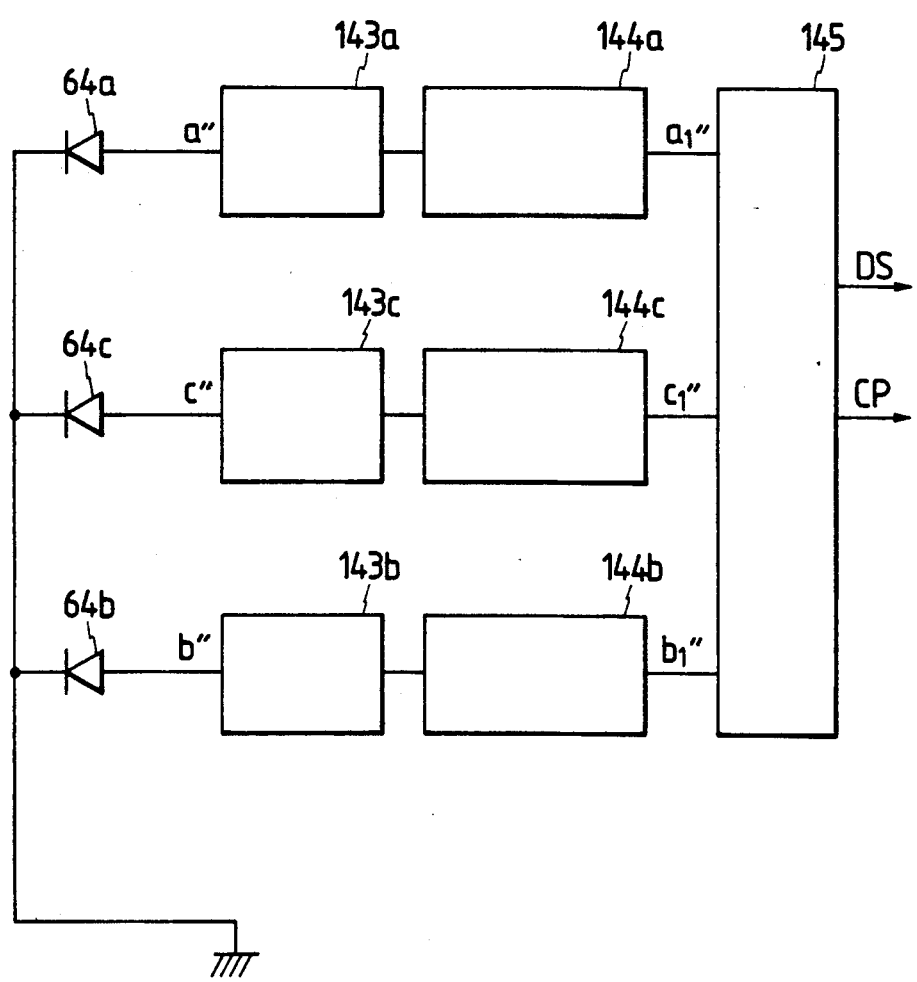
FIG. 45 is a block diagram showing circuitry in the same encoder.

FIG. 45 is a block diagram depicting a circuit for executing the above-described process. Amplitude amplifying circuits 143a, 143b and 143c amplify the amplitudes of the outputs a", b" and c" from the respective elements. Comparators 144a, 144b and 144c output the output signals from the amplitude amplifying circuits 143a, 143b and 143c in the form of retangular pulse signals as in the case of outputs a1", a2" and a3" of FIG. 44B. Designated at 145 is a pulse generating circuit for generating count pulse signals CP shown in FIG. 44C by generating the pulses at the first and last transitions of the outputs a1", a2" and a3" from the respective comparators. The pulse generating circuit 145 also discerns the directions and output directional signals DS. The signals CP to which the directional signals DS are added are counted by a known counter, thereby detecting a rotation quantity of the rotary body 63".

As mentioned earlier, when using the 3-phase output signal, it is possible to obtain the 6-fold frequency pulse signal having a higher resolving power than that of the pulse signal having a frequency that is four times as high as the sine wave pulse signal based on the conventional 2-phase output signal.

In accordance with the fourth through eleventh embodiments discussed above, the cylindrical rotary body conceived as a hollow body rotates. While the light source and the photoelectric converting elements—i.e., the unit U—are fixed. The rotating and fixed sides may, however, be reversed. In the respective embodiments, the rotary body is connected to the rotary shaft by any one of methods shown in FIGS. 31A–31B.

In the respective embodiments, as in the fourth embodiment, the collimator lens may be provided as the necessity arises.

The hollow body is not limited to the cylindrical shape. There may be adopted arbitrary configurations capable of attaining the principle of this invention. The V-groove may assume an asymmetric V-shape or other configurations. For instance, V-shaped projection is usable.

In accordance with the fourth through eleventh embodiments, there is no necessity for incorporating the image forming optical system into the hollow body. This facilitates both the miniaturization and manufacturing of the hollow body.

In accordance with an embodiment which will hereinafter be explained, a rotary encoder comprises a light irradiation means, a cylindrical optical scale and a light receiving means. The rotary encoder detects a rotating condition of the scale by irradiating a first region on a scale side surface with beams from the light irradiation means, projecting a Fourier image of a grating of the first region on a grating of a second region different from the first region and receiving the beam traveling through the grating of the second region by the light receiving means. In the thus constructed rotary encoder, a member having a refractive index larger than the air is disposed in a light path provided inwardly of the cylindrical scale. With this arrangement, the Fourier image exhibiting a high contrast can be projected on the second region.

Figure 49:
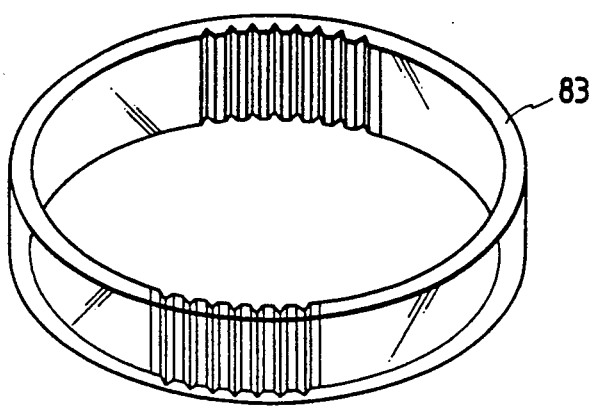
FIG. 49 is a view depicting an optical scale in this embodiment.

A detailed description will be given in conjunction with the accompanying drawings. FIG. 46A is a block diagram showing a twelfth embodiment. Referring to FIG. 46A, the numeral 81 designates a semiconductor laser for generating a coherent beam having a wavelength $\lambda(=780$ nm). A collimator lens system generally indicated at 82 serves to collimate divergent beams emerging from the semiconductor laser 81 into substantially parallel beams. The semiconductor laser 81 and the collimator lens system 82 are combined to constitute a light irradiation means. A rotary optical scale 83 including a grating unit rotates in any one of arrowed directions. FIG. 49 is a perspective view depicting the scale 83. The scale 83 is composed of an optical material exhibiting a transmission property; and at least the grating unit thereof has the transmission property. Furrowed in the internal side surface of the cylindrical scale 83 are a multiplicity of V-shaped grooves arranged over the entire periphery in the peripheral direction. The grating unit is thus formed. Referring back to FIG. 46, a glass plate 200 intervenes in a light path inwardly of the scale 83. Photodetectors 40a and 40b serving as a light receiving means are disposed in positions confronting the light irradiation means, with the scale 83 interposed therebetween. Outputs of the respective photodetectors are connected to a signal processing circuit 86. The signal processing circuit 86 includes a pulse count circuit, a circuit for discerning the rotational direction and a signal interpolation processing circuit. The scale 83 is connected to a rotary driving shaft of a motor or the like. The scale 83 is employed as an optical scale for detecting a rotation quantity of the driving shaft. FIGS. 51 through 54 illustrate some variations of a method of mounting the scale 83. In any variation, the scale 83 is fitted directly to the rotary driving shaft 85. With this arrangement, it is possible to keep high both a fitting accuracy and a concentricity between the fitting portion and the grating surface serving as gradations for detecting the rotations.

Figure 50:
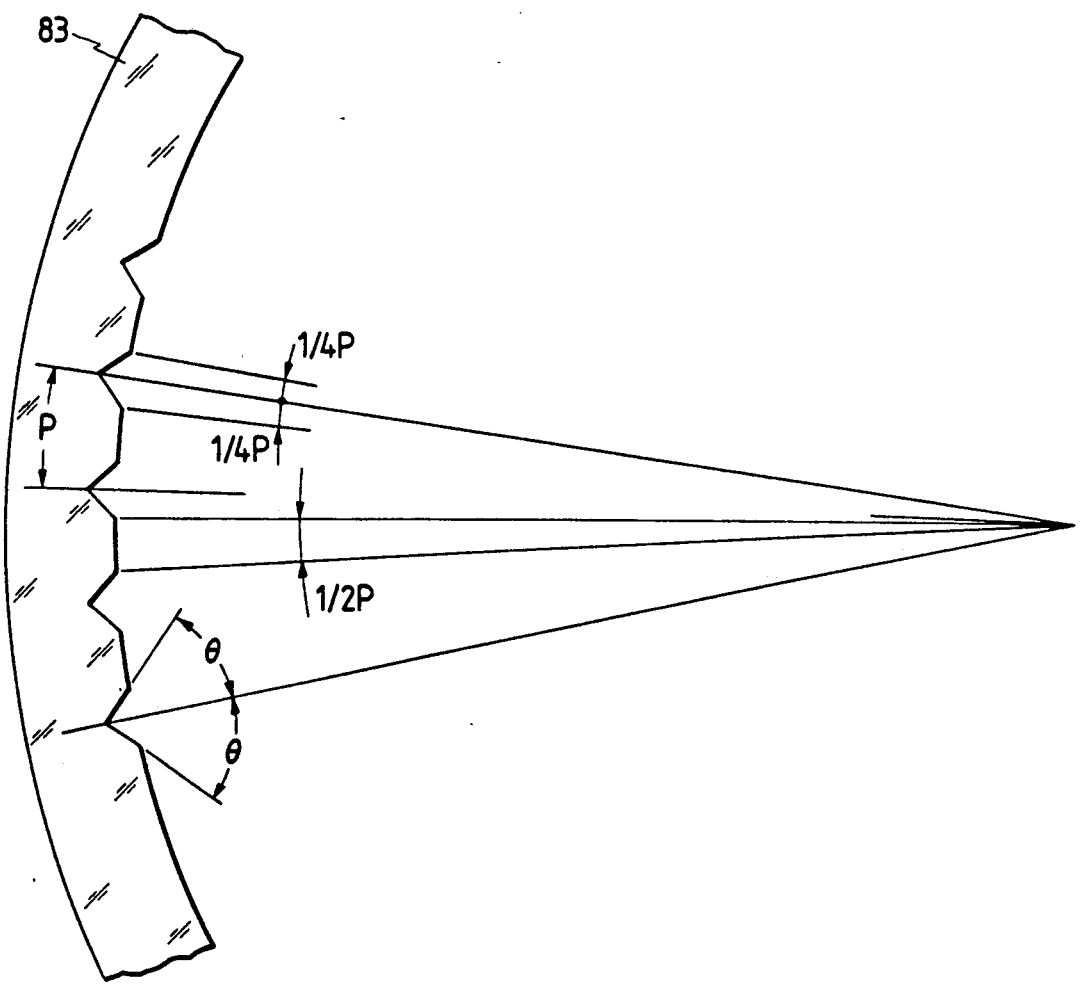
FIG. 50 is a diagram illustrating in detail a grating unit of the scale.
Figure 51:
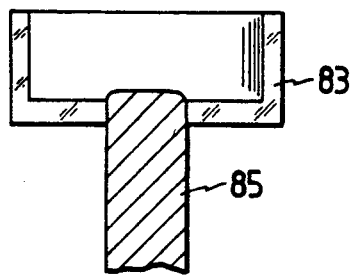
FIGS. 51, 52, 53, and 54 are diagrams showing some variations of a method of mounting the scale.
Figure 53:
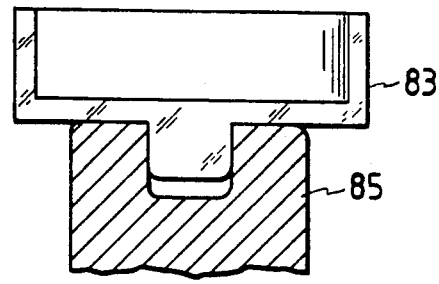
Figure 52:
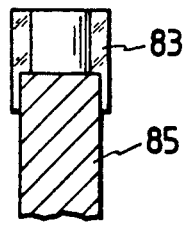
Figure 54:
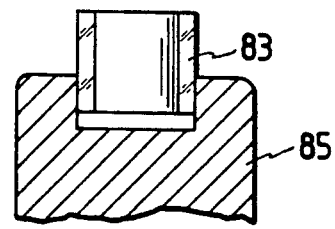

FIG. 50 is a view illustrating in detail the grating unit of the scale 83. The V-shaped grooves and the flat portions are alternately arranged, thus forming gratings. (n)-pieces of V-shaped grooves are furrowed in the cylindrical internal side surface at pitches P (rad) $(n \times P = 2 \pi \text{rad})$ in the peripheral direction. A width of the V-shaped groove is $\frac{1}{2}$ P (rad). Each of the two flat surfaces for forming the v-shaped groove has a width of $\frac{1}{4}$ P (rad). Each oblique surface is inclined at an angle greater than a critical angle—i.e., $\theta = 45°$ in this embodiment—with respect to a straight line which connects the center to the bottom of the V-shaped groove.

A spacing d (an inside diameter of the scale) along the optical axis between gratings of first and second regions 91 and 92 of the scale 83 is set to satisfy the following relation:

$$d = N \cdot P^2/\lambda \ (N=4)$$

$$P = \pi d/n \text{ (n is the total number of slits)}$$

where P is the grating pitch, and $\lambda$ is the wavelength in this embodiment. The diameter d of the scale 83 is thus set. It is therefore possible to project an image of the grating of the first region 91 of the side surface of the scale 83 directly on the grating of the second region 92. In this case, there is no necessity for incorporating an image forming optical system into the hollow portion of the scale 83. The grating image projected thereon is, as mentioned before, referred to as the Fourier image. The grating image is formed by the self-image-forming action of the grating concomitantly with the light diffractive phenomenon. The scale 83 in this embodiment assumes a cylindrical configuration and therefore has a tendency in which the contrast declines due to a slight bend of the Fourier image. There is no problem in practical use, if the light irradiation means (81, 82) and the scale 83 are constructed to satisfy the following condition:

$$(N-\tfrac{1}{2})P^2/\lambda < d < (N+\tfrac{1}{2})P^2/\lambda \text{ (N is the natural number)}$$

$$P = \pi d/n \text{ (n is the total number of slits)}$$

Note that the scale 83 is formed of plastic in this embodiment. This material is suitable for mass-production by a manufacturing method such as injection molding or compression molding. It is feasible to provide the encoder at low costs.

Based on the method in this embodiment, the Fourier image is generated resultantly by the beam action in combination with the grating portion of the first region 91. This Fourier image is formed on the grating surface of the second region 92, and a rotating condition is detected as moire. A position L of the Fourier image is expressed in the following formula. In this formula, the Fourier image has such a characteristic that the contrast of this image declines with an increment in value of N.

$$L = N \cdot P^2/\lambda \text{ (N is the natural number)}$$

Namely, when increasing the number of gratings for the purpose of providing high-pulsing in this method, a value of P is decreased if a diameter of the cylinder is constant. In order to form the Fourier image on the second region, a value of N has to be inevitably increased. As a result, the following problems are caused. The decline of contrast (a decrease in S/N ratio) is induced due to the above-described characteristic. The reliability is apt to decrease.

In this embodiment, a transmissive optical member 200 having a refractive index higher than the air (no=1) intervenes in a light path between the first region 91 and the second region 92. In this state, the position in which the Fourier image is formed is shifted. This arrangements serves to reduce the value of N. The Fourier image having a much higher contrast can be formed on the second region 92.

This action will be explained with reference to FIGS. 47 and 48.

Figure 47:
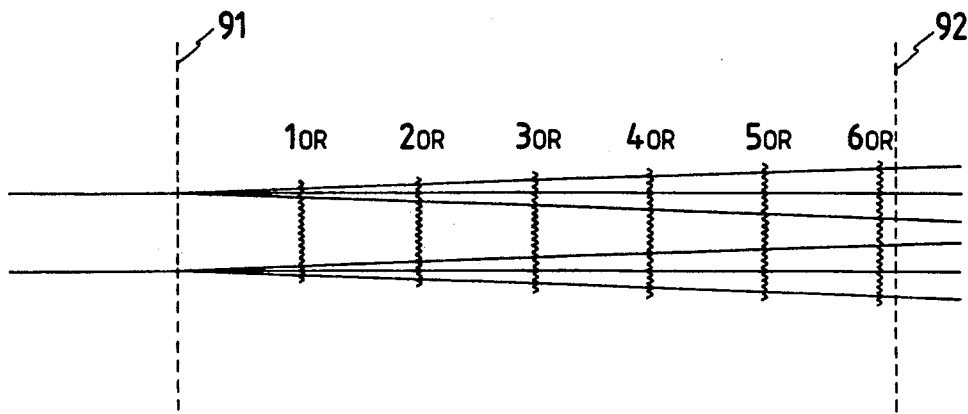
FIGS. 47 and 48 are diagrams of assistance in explaining effects of this embodiment.

FIG. 47 illustrates an example corresponding to the conventional example where nothing is disposed inside the scale. Fourier images ($1_{OR} - 6_{OR}$) are formed by the beams diffracted by the grating portion of the first region 91. The 6th (N=6) Fourier image $6_{OR}$ among these images is formed on the grating portion of the second region 92.

Figure 48:
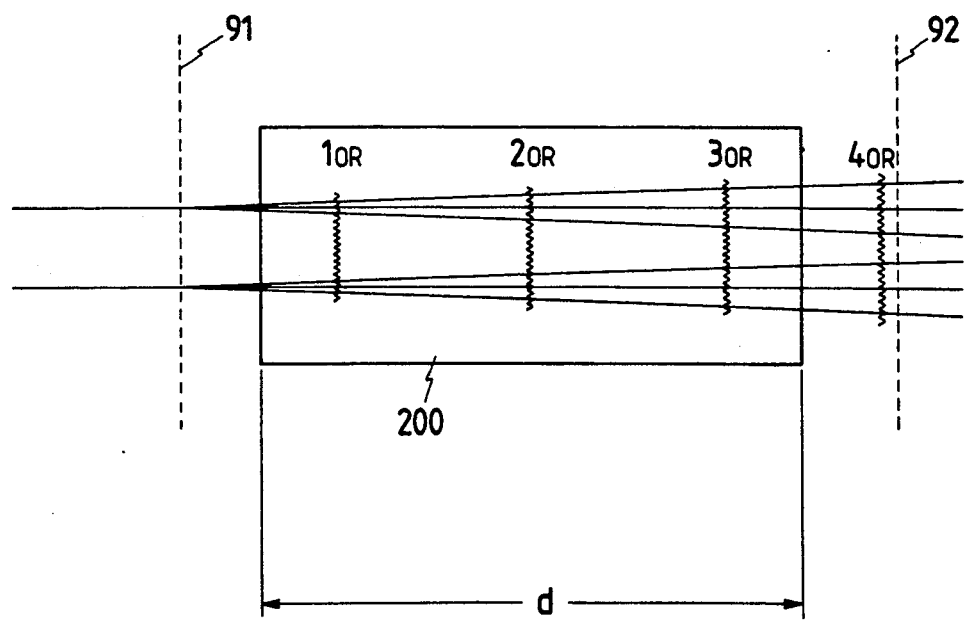

Contrastingly, FIG. 48 shows this embodiment. The optical member 200, viz., glass (the refractive index n=1.5 in this embodiment) having a refractive index larger than the air is interposed between the first and second regions in FIG. 47.

Typically, a plane parallel plate having a refractive index n (n>1) intervenes in the image forming light path. In this case, an air conversion light path d' for replacing this with the air is expressed such as:

d' = d/n (n is the refractive index of the plane parallel plate)

The calculation is effected on the presumption that an air layer defined above exists. Hence, if the refractive index n is larger than the air refractive index (no=1), the image shifts by a difference between d and d' in such a direction as to separate far away.

A moving quantity t is given by:

$$t = d(1 - 1/n)$$

The Fourier image shifts by t in such a direction as to separate from the first region.

Referring to FIG. 47, the sixth image $6_{OR}$ is formed on the grating portion of the second region 92. In FIG. 48 associated with this embodiment, the parallel glass plate 200 having a thickness d is interposed. In consequence, the sixth image separates virtually from the grating surface. Only the 4th image $4_{OR}$ shifts by t and is formed in a position of the grating portion of the second region 92. Since the 4th image exhibiting a higher contrast than that of the 6th image is employed, the S/N ratio of the detecting signal can be further improved. This in turn makes the reliability on the detection still higher.

The measuring principle of this embodiment will next be described in greater detail with reference to FIGS. 46A through 46C.

The beams coming from the semiconductor laser 81 are converted into a convergent beam by adjusting a position of the collimator lens system 82. The convergent beam is incident on a first region 91 of the scale 83. The reason why the convergent beam is used will be elucidated. The side surface of the scale 83 has a refractive power equivalent to that of a concave lens due to a difference in curvature between the external and internal side surfaces. The beams entering the scale 83 become substantially parallel beams owing to action of the concave lens.

The convergent beam, as illustrated in FIG. 46B reaches the grating unit of the first region. Then, the convergent beams travel into the cylinder after passing through a surface 130a. The beam reaches a surface 130b-1 of the grating unit is deflected to a surface 130b-2 after undergoing full reflection as shown in the Figure. It is because the oblique surface is inclined at more than a critical angle. The beam is also fully reflected by a surface 130b-2. The beam, which reaches the surface 130b-1, is eventually returned substantially in the incident direction without traveling into the interior of the rotary body. Similarly, the beam which reaches the surface 130b-2 is returned by repeating the full reflection. Hence, the beam, which reaches a range defined by the two oblique surfaces 130b-1 and 130b-2 which form the V-shaped groove in the first region 91, is reflected without advancing into the cylinder. Only the beam which reaches the portion 130a advances into the cylinder. That is, the V-shaped groove diffraction grating in the first region 91 has the same action as that of the transmission type amplitude grating.

The beams are diffracted by the grating unit of the first region 91, whereby the diffraction beams of 0th-order, order, ±first-order, ±second-order, . . . are generated by action of the gratings. Two or three beams of the 0th-order and ±first-order beams interfere with each other. As a result of this interference, the Fourier image of the grating of the first region 91 is formed inwardly of the scale 43. The Fourier image is repeatedly formed at a basic distance L in positions of integral multiples of L. The glass plate 200 having the refractive index larger than the air is disposed inwardly of the scale 83. The 4th (N=4) Fourier image is formed on the grating surface of the second region 92. The shading pitch of this Fourier image is equal to the grating pitch P of the first and second regions 91 and 92.

The beam is, as illustrated in FIG. 46C, substantially perpendicularly incident on the surface 130a in the second region 92. Hence, the beam penetrates straight the surface but is not incident on the photodetector. The beams, which will reach the two oblique surfaces 130b-1 and 130b-2 cooperating to form the V-shaped groove surface, are incident thereon at an incident angle of approximately 45°. Consequently, the beams are largely refracted in different directions and reach the photodetectors 40a and 40b, respectively. In the second region, the beams travel separately in the three directions. It is because there are provided totally three kinds of surfaces inclined in different directions—i.e., the two oblique surfaces inclined in different directions with respect to the incident beams and the flat surface between the V-shaped grooves. These beams respectively reach the photodetectors 40a and 40b disposed corresponding to the individual surfaces. Namely, the V-shaped groove gratings function as light wavefront splitting elements in the second region 92.

As discussed above, the scale in this embodiment characteristically has the two functions. The scale functions as the amplitude type diffraction grating in the first region 91 and as the wavefront splitting elements for detecting two phases in the second region 92.

The following is an explanation of variations in light quantity detected by the photodetectors 40a and 40b when the scale 83 rotates. It is herein assumed that the scale 83 rotates counterclockwise.

Figure 55:
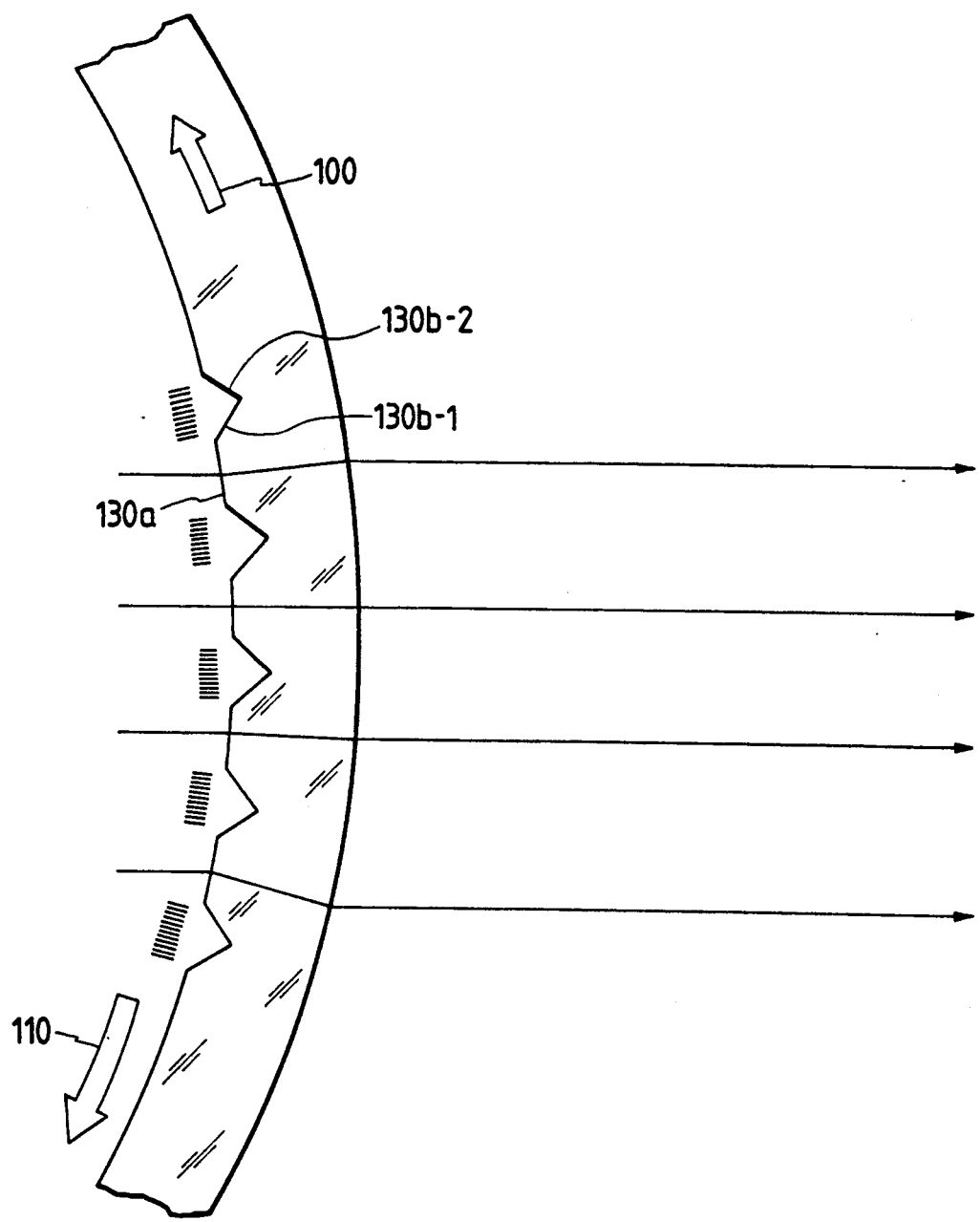
FIGS. 55 and 56 are diagrams of assistance in explaining the principle of this embodiment.
Figure 56:
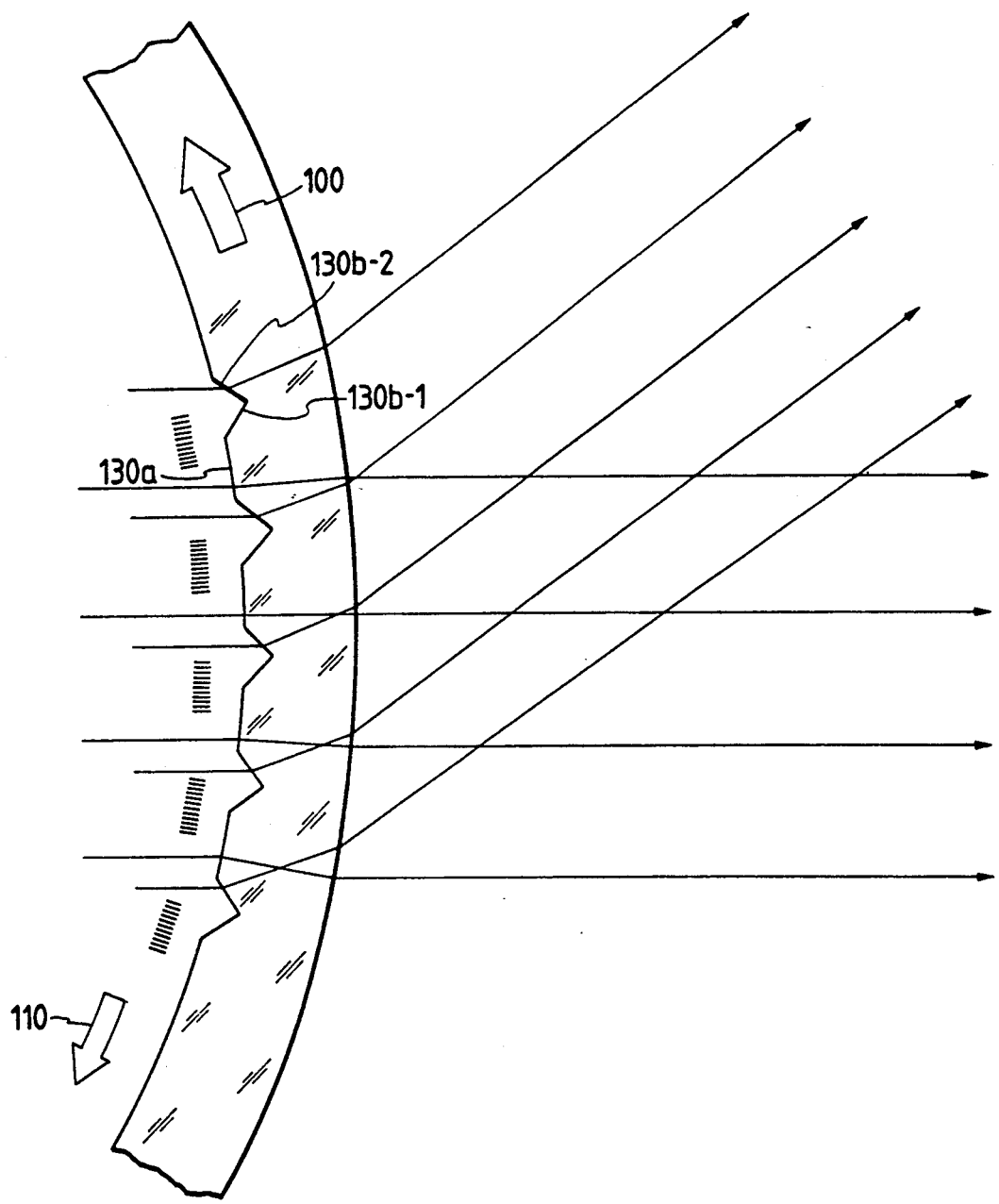

FIG. 55 depicts a situation where shading grating images having a period equal to the grating pitch P are overlapped in the second regions 92. In this case, a bright part of the shading grating image is overlapped with a portion 130a. The beams penetrate the portion 130a and travel straight. FIG. 56 shows a situation where the diffraction grating unit rotates counterclockwise (in an arrowed direction 100) through ¼ P from a state of FIG. 55. In this case, the shading grating image moves in an arrowed direction 110. At this time, some of the beams penetrate the portion 130a, and the rest of the beams reach 130b-2. Therefore, one-half of the beams incident on the second region 52 travel straight without being incident, while the remaining half of beams are incident on the photodetector 40a.

Figure 57A:
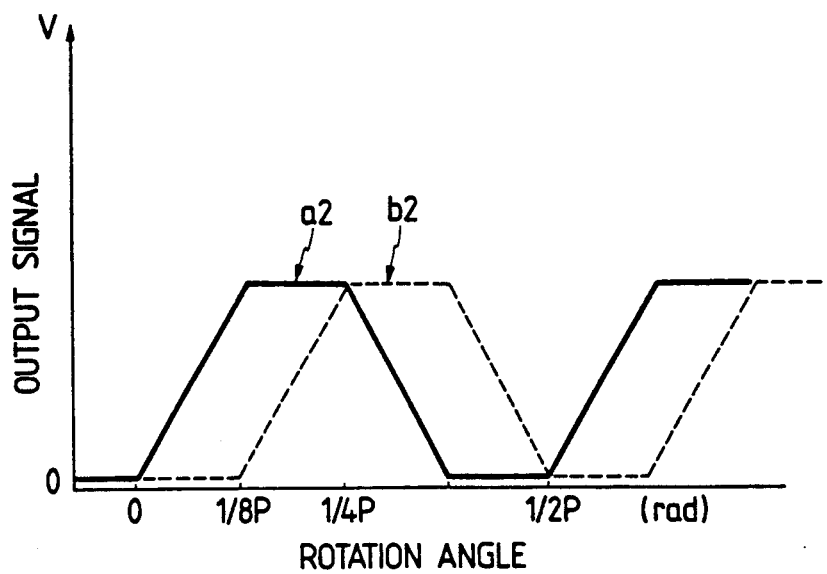
FIGS. 57A, 57B, 58A and 58B are diagrams illustrating waveforms of signals of the encoder in this embodiment.
Figure 57B:
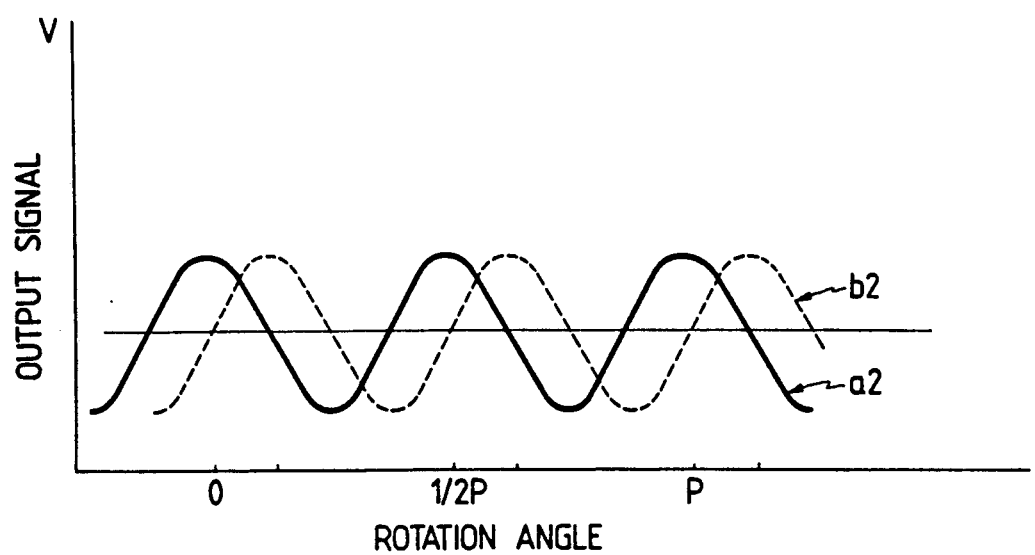

As explained above, a quantity balance of beams incident on the respective photodetectors changes corresponding to the relative displacement between the positions of grating and the Fourier image. As a result, the light quantity variations concomitant with the rotations of the grating are, as shown in FIG. 57A, obtained on the assumption that the scale 83 rotates counterclockwise. The axis of abscissa herein indicates a rotation quantity of the cylindrical grating, while the axis of ordinate indicates a light receiving quantity. Signals a2 and b2 correspond to the photodetectors 40a and 40b. Note that whereas in the clockwise rotations of the scale 83, the symbol a2 is an output of 40b, and b2 is an output of 40a. The rotational directions can be discerned based on this difference. FIG. 57A illustrates theoretical variations in light quantity, wherein the contrast of the Fourier image is extremely high enough to approximate to an ideal level. As a matter of fact, however, the contrast of the Fourier image is rather low. Hence, each light quantity, as shown in FIG. 57B, changes in a substantially sine wave-like configuration.

Figure 58A:
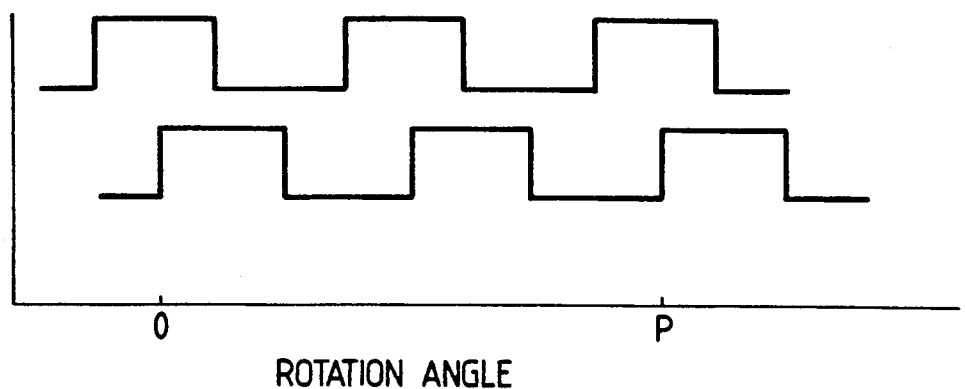
Figure 58B:
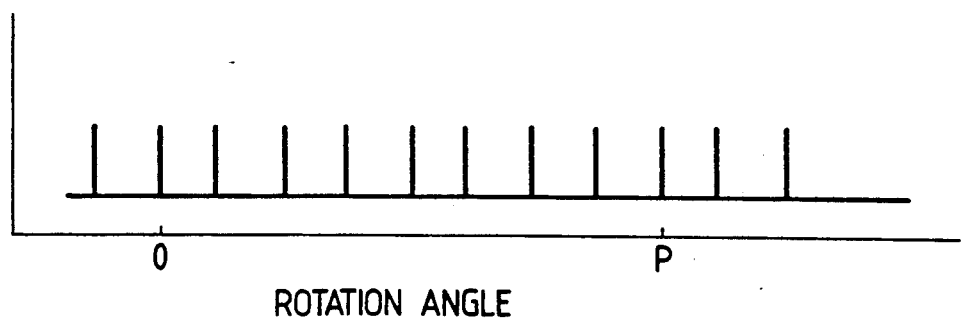

When the grating rotates through P (rad), sine wave-like output waveforms of two periods appear. A phase relation between the signals a2 and b2 shows a phase difference of 90°. These signals are changed, as illustrated in FIG. 58A, in a rectangular waveform through a comparator circuit. Pulse signals are obtained at rise and fall points of the rectangular waveforms. As shown in FIG. 58B, eight pulses can be obtained at a rotation angle of p (rad). Hence, when the number of gratings during one rotation is set to n, a rotation angle signal of 8nP/R is detectable.

Note that in the twelfth embodiment discussed above, the v-grooves are arranged at the equal spacings to form a rugged grating unit. The grating unit is not, however, limited to this rugged configuration. The grating unit is formed by arranging the rugged portions each including a surface inclined to the incident beam at the equal spacings. The scale is usable on condition that the scale has a function as the amplitude type diffraction grating and a wavefront splitting function as well.

The present invention is not limited to the rotary encoder utilizing, as in the twelfth embodiment, a so-called talbot interference. The above-mentioned member having a refractive index larger than the air may be applied to the encoder using, as shown in FIG. 1, the scale. In this case, as in the embodiment given above, there are produced effects of obtaining the high reliability and high accuracy as well.

In the twelfth embodiment, the diplophase signals are fetched by two pieces of photodetectors. If a single-phase signal may be satisfactory, it is enough to interpose only one photodetector between the photodetectors 40a and 40b in FIG. 46A. Besides, three pieces of photodetectors may be disposed to detect 3-phase signals.

The light source usable in this embodiment is not limited to the semiconductor laser as in other embodiments but may be, e.g., a point light source LED. The costs can be further reduced by using the LED more inexpensive than the semiconductor laser.

Figure 59:
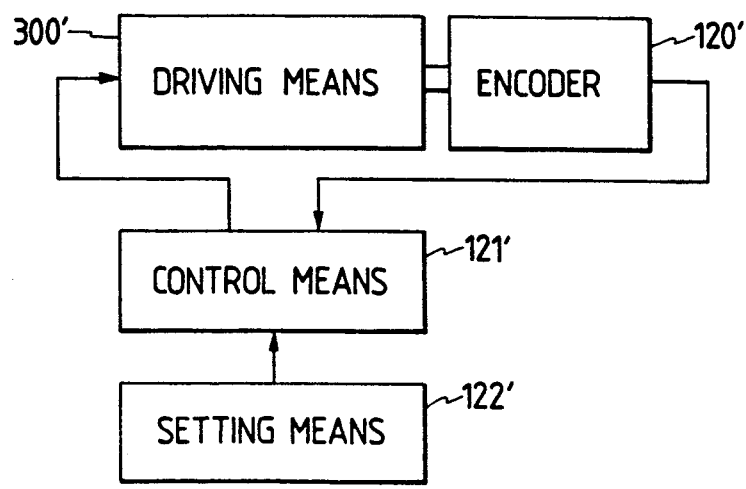
FIG. 59 is a system block diagram showing an encoder-based driving system.

FIG. 59 is a system block diagram of a driving system including the rotary encoder, showing one example of a system using the encoder given above. A driving means 300' has driving sources such as a motor, an actuator and an internal combustion engine. The encoder 120' explained above is connected to a rotation output unit of the driving means 300', thereby detecting driving conditions such as a rotation quantity and a rotating speed. A detection output of this encoder is fed back to a control means 121'. In the control means, a driving signal is transmitted to the driving means 300' to develop a condition set by a setting means 122'. This type of feedback system is thus configured, whereby the rotational status set by the setting means can be obtained. This driving system is applicable to a variety of machine tools or manufacturing machines, measuring instruments, robots, cameras, audio devices and information devices. The driving system is not limited to these devices but is applicable more widely to the whole devices incorporating the driving means.

As discussed above, the rotary encoder in this embodiment makes use of the Fourier image exhibiting a much higher contrast. For this reason, the rotary encoder yields the effect of improving both the reliability and the accuracy. Furthermore, the cylindrical scale used therein serves to miniaturize the device and decrease the inertia. Besides, the assembly can be facilitated.

In accordance with an embodiment which will hereinafter be described, a rotation detecting instrument comprises: a light irradiation means; a rotary body including a cylindrical optical scale; and a light receiving means. Gratings are formed on the side surface of the cylindrical optical scale. A first region on the scale side surface is irradiated with the beams from the light irradiation means. The beam traveling via the grating of the first region is directed to a second region different from the first region. The beam traveling via the grating of the second region is received by the light receiving means. In this manner, rotational information of the scale is detected. The rotation detecting instrument further includes a marker element, provided at a part of the rotary body, for detecting a reference position. A rotational reference position signal of the scale is obtained by detecting the beam traveling via the marker element.

Figure 67:
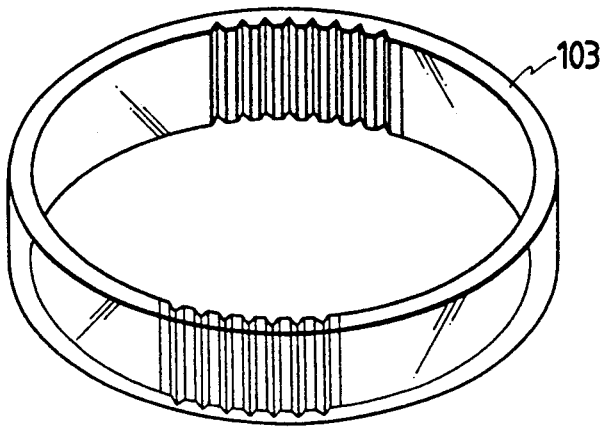
FIG. 67 is a view illustrating an optical scale in this embodiment.

A detailed description will be given in conjunction with the accompanying drawings. FIG. 60A is a view of the rotation detecting instrument viewed from above, showing a thirteenth embodiment. FIG. 61 is a view in section. Referring to these Figures, the numeral 101 designates a semiconductor laser for generating a coherent beam having a wavelength $\lambda$ (=780 nm). A collimator lens system generally indicated at 102 serves to collimate divergent beams emerging from the semiconductor laser 101 into substantially parallel beams. The semiconductor laser 101 and the collimator lens system 102 are combined to constitute a light irradiation means. A rotary optical scale 103 including a grating unit rotates in any one of arrowed directions. The scale 103 is connected at its bottom portion 107 to a rotary driving shaft 105 of a motor or the like. The scale 103 is used as an optical scale for detecting a rotation quantity of the driving shaft 105. FIG. 67 is a perspective view depicting the scale 103. The scale 103 is composed of an optical material exhibiting a transmission property; and at least the grating unit thereof has the transmission property. Furrowed in the internal side surface of the cylindrical scale 103 are a multiplicity of V-shaped grooves arranged over the entire periphery in the peripheral direction. The grating unit is thus formed. Referring back to FIG. 60A, the numeral 240 designates a half-mirror, intruded in an inside position of the cylindrical scale and obliquely fixed therein, for splitting a part of incident beam and reflecting downwards a part of the split beams. Photodetectors 104a, 104b and 104c serving as the light receiving means for detecting the rotational information of the scale are disposed in positions confronting the light irradiation means, with the scale 103 interposed therebetween. Outputs of the respective photodetectors are connected to a signal processing circuit 106. The signal processing circuit 106 includes a pulse count circuit, a circuit for discerning the rotational direction, a signal interpolation processing circuit and a reference position signal generating circuit. Referring to a side elevation of FIG. 61, the beams split downwards by a beam splitter 240 are directed to the marker element 241 for detecting the reference position. The marker element 241 is provided in predetermined one position of the lower surface of a bottom portion 107 of the scale during one revolution. A marker element 241 consists of an elongate V-groove portion extending in a direction orthogonal to the peripheral direction. The V-groove portion is equal to the V-groove for constituting the grating unit of the scale 103. There exists a merit of manufacturing the V-groove portion by the same method. The numeral 245 denotes a photodetector for obtaining the reference position signal by detecting the beam traveling via the marker element 241. An output signal of the photodetector is connected to the signal processing circuit 106 to generate the reference position signal. An original position of rotation can be obtained by this reference position signal. A count value of the count circuit is reset in response to the reference position signal. In consequence, it is feasible to acquire absolute values of a rotation quantity and a rotation angle from the original position.

FIGS. 60B and 60C are views illustrating in detail the grating unit of the scale 103. The V-shaped grooves and the flat portions are alternately arranged, thus forming gratings. (n)-pieces of V-shaped grooves are furrowed in the cylindrical internal side surface at pitches P (rad) (n×P=2 πrad) in the peripheral direction. A width of the V-shaped groove is ½ P (rad). Each of the two flat surfaces for forming the v-shaped groove has a width of ¼ P (rad). Each oblique surface is inclined at an angle greater than a critical angle—i.e., θ=45° in this embodiment—with respect to a straight line which connects the center to the bottom of the V-shaped groove.

A spacing d (an inside diameter of the scale) along the optical axis between gratings of first and second regions 131 and 132 of the scale 83 is set to satisfy the following relation:

$$d = N \cdot P^2 / \lambda \ (N=3)$$

$$P = \pi d/n \ \text{(n is the total number of slits)}$$

where P is the grating pitch, and $\lambda$ is the wavelength in this embodiment. The diameter d of the scale 103 is thus set. It is therefore possible to project an image of the grating of the first region 131 of the side surface of the scale 103 directly on the grating of the second region 132. In this case, there is no necessity for incorporating an image forming optical system into the hollow portion of the scale 103. The grating image projected thereon is, as mentioned before, referred to as the Fourier image. The grating image is formed by the self image forming action of the grating concomitantly with the light diffractive phenomenon. The scale 103 in this embodiment assumes a cylindrical configuration and therefore has a tendency in which the contrast declines due to a slight bend of the Fourier image. There is no problem in practical use, if the light irradiation means (101, 102) and the scale 103 are constructed to satisfy the following condition:

$$(N - \tfrac{1}{2}) \ P^2/\lambda < d < (N + \tfrac{1}{2}) \ P^2/\lambda \ \text{(N is the natural number)}$$

$$P = \pi d/n \ \text{(n is the total number of slits)}$$

Note that the scale 103 is formed of plastic in this embodiment. This material is suitable for mass-production by a manufacturing method such as injection molding or compression molding. It is therefore feasible to provide the encoder at lower costs than in the conventional processing method using the photolitho process.

The encoder having a construction of this embodiment is arranged in the following way. When an outside ambient temperature changes, the diameter d of the scale, the grating pitch P and the wavelength of the semiconductor laser slightly vary. As a result, there is caused a relative positional deviation between a Fourier image forming position and a grating surface position. This is probably a factor for a decrease in S/N ratio of the detecting signal. For instance, when the temperature rises, the diameter d of the scale increases. Concomitantly with this increase, a value of the grating pitch P is also incremented. Besides, the wavelength shifts to a larger wavelength side. In this case, a position L of the Fourier image changes at a ratio of $P^2/\lambda$, wherein $L = N \cdot P^2/\lambda$. A material of the scale and characteristics of the semiconductor laser are selected so that a variation quantity ($\Delta d$) of the diameter d of the scale due to changes in temperature approximates to a shift quantity ($\Delta L$) of the Fourier image to the greatest possible degree. Hence, it is feasible to reduce the relative positional deviation between the grating surface position and the Fourier image forming position. Even when causing the changes in the outside ambient temperature, a decline in the S/N ratio of the detecting signal is reduced. In the semiconductor laser having a wavelength 780 nm employed in this embodiment, a wavelength fluctuation on the order of 10 nm is caused for a temperature change of 50° C. It is preferable to adopt a scale material exhibiting a relatively large coefficient of thermal expansion. In accordance with this embodiment, the scale 103 is made of plastic (acrylic resin where n = 1.49). The coefficient of thermal expansion is greater than that of glass. Hence, there is produced such an advantage that a drop in the S/N ratio of the output signal due to the fluctuations in temperature is further reduced. The encoder can be offered at low costs. In combination with this advantage, the plastic is quite suited as a material of the encoder scale in this embodiment.

The measuring principle of this embodiment will next be described with reference to FIGS. 60A through 60C.

The beams coming from the semiconductor laser 101 are converted into a convergent beam by adjusting a position of the collimator lens system 102. The convergent beam is incident on a first region 131 of the scale 103. The reason why the convergent beam is used will be elucidated. The side surface of the scale 103 has a refractive power equivalent to that of a concave lens due to a difference in curvature between the external and internal side surfaces. The beams entering the scale 103 become substantially parallel beams owing to action of the concave lens.

The convergent beam, as illustrated in FIG. 60B reaches the grating unit of the first region. Then, the convergent beam travels into the cylinder after passing through a surface 230a. The beam reaches a surface 230b-1 of the grating unit is deflected to a surface 230b-2 after undergoing full reflection as shown in the Figure. It is because the oblique surface is inclined at more than a critical angle. The beam is also fully reflected by a surface 230b-2. The beam, which reaches the surface 230b-1, is eventually returned substantially in the incident direction without traveling into the interior of the rotary body. Similarly, the beam which reaches the surface 230b-2 is returned by repeating the full reflection. Hence, the beam, which reaches a range defined by the two oblique surfaces 230b-1 and 230b-2 which form the V-shaped groove in the first region 131, is reflected without advancing into the cylinder. Only the beam which reaches the surface 230a advances into the cylinder. That is, the V-shaped groove diffraction grating in the first region 131 has the same action as that of the transmission type amplitude grating.

The beams are diffracted by the grating unit of the first region 131, whereby the diffraction beams of 0th-order ±first-order, ±second-order, . . . are generated by action of the gratings. Two or three beams of the 0th-order and ±first-order beams interfere with other. As a result of this interference, the Fourier image of the grating of the first region 131 is formed inwardly of the scale 103. The Fourier image is repeatedly formed at a basic distance L in positions of integral multiples of L. In this embodiment, the light source wavelength, the grating pitch P and the position of the collimator lens system 102 are set so that the 3rd (N=3) Fourier image is formed on grating surface of the second region 132. A shading pitch of this Fourier image is equal to the grating pitch P of the first and second regions 131 and 132.

The beams is branched off in two directions S and T by half-mirror 240 which intervenes in the cylinder. The separated beams then travel forwards. The beam, which penetrates the half-mirror 240 and travels straight in the directions S, is incident on a surface 230a in the second region 132. As illustrated in FIG. 60C, the beam is substantially perpendicularly incident and hence penetrates on the straight. Then, the beam reaches a photodetector 104c. The beams reach the two oblique surfaces 230b-1 and 230b-2 serving as V-groove surfaces. These beams are incident on the surfaces at approximately 45° and therefore refracted largely in different directions, respectively. The refracted beams come to the photodetectors 104a and 104b. In the second region, the beams travel separately in the three directions. It is because there are provided totally three kinds of surfaces inclined in different directions—i.e., the two oblique surfaces inclined in different directions with respect to the incident beams and the flat surface between the V-shaped grooves. These beams respectively reach the photodetectors 104a, 104b and 104c disposed corresponding to the individual surfaces. Namely, the V-shaped groove gratings function as light wavefront splitting elements in the second region 132.

Figure 65A:
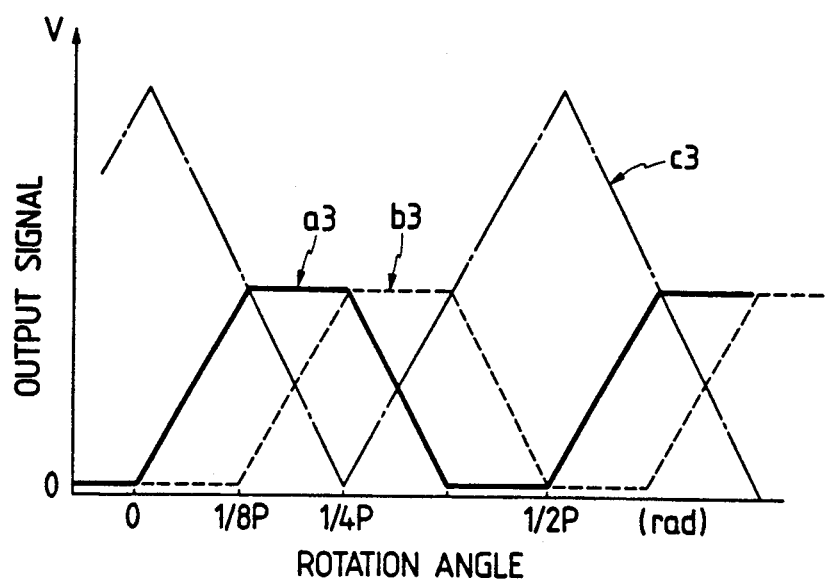
FIGS. 65A and 65B are diagrams depicting waveforms of output signals of the encoder of this embodiment.
Figure 65B:
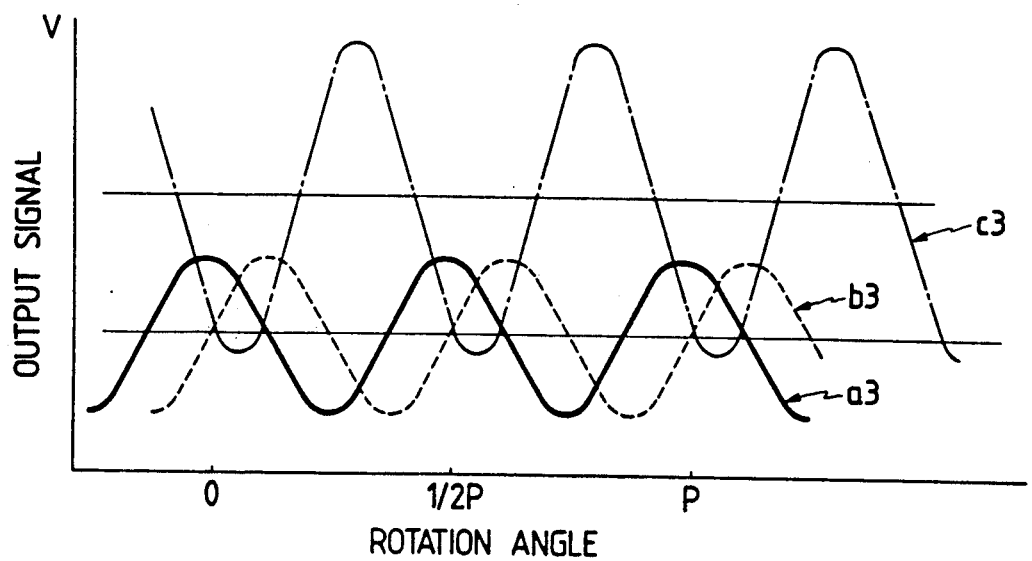

When the scale 103 rotates, it follows that the light quantities detected by the photodetectors 104a, 104b and 104c vary. A quantity balance of beams incident on the respective photodetectors changes corresponding to the relative displacement between the positions of grating and the Fourier image. As a result, the light quantity variations concomitant with the rotations of the grating are, as shown in FIG. 65A, obtained on the assumption that the scale 103 rotates counterclockwise. The axis of abscissa herein indicates a rotation quantity of the cylindrical grating, while the axis of ordinate indicates a light receiving quantity. Signals a3, b3 and c3 corresponds to the photodetectors 104a, 104b and 104c. Note that whereas in the clockwise rotations of the scale 103, the symbol a3 is an output of 104b, b3 is an output of 104a, and c3 is an output of 104c. The rotational directions can be discerned based on this difference. FIG. 65A illustrates theoretical variations in the light quantity, wherein the contrast of the Fourier image is extremely high enough to approximate to an ideal. As a matter of fact, however, the contrast of the Fourier image is rather low. Hence, each light quantity, as shown in FIG. 65B, changes in a substantially sine wave-like configuration. Based on these signals, there are obtained the rotational information such as a rotation angle and a rotation quantity, or a rotating speed and a rotating acceleration.

The following is a description of a method of detecting the reference position defined as an origin by use of the beam branched off in the direction T by the half-mirror 240 in conjunction with FIG. 62. FIG. 62 is a view fully depicting a detection optical system for detecting the reference position. FIG. 62 is the view taken substantially along the line A'—A' FIG. 61.

Figure 63:
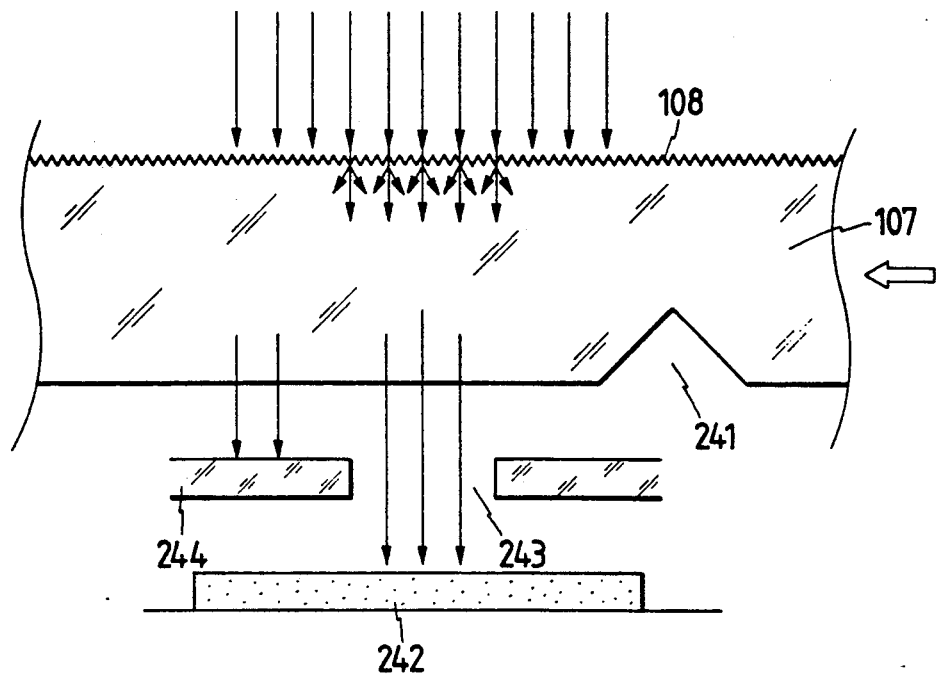
FIGS. 63 and 64 are views of assistance in explaining the action of detecting the reference position signal.
Figure 64:
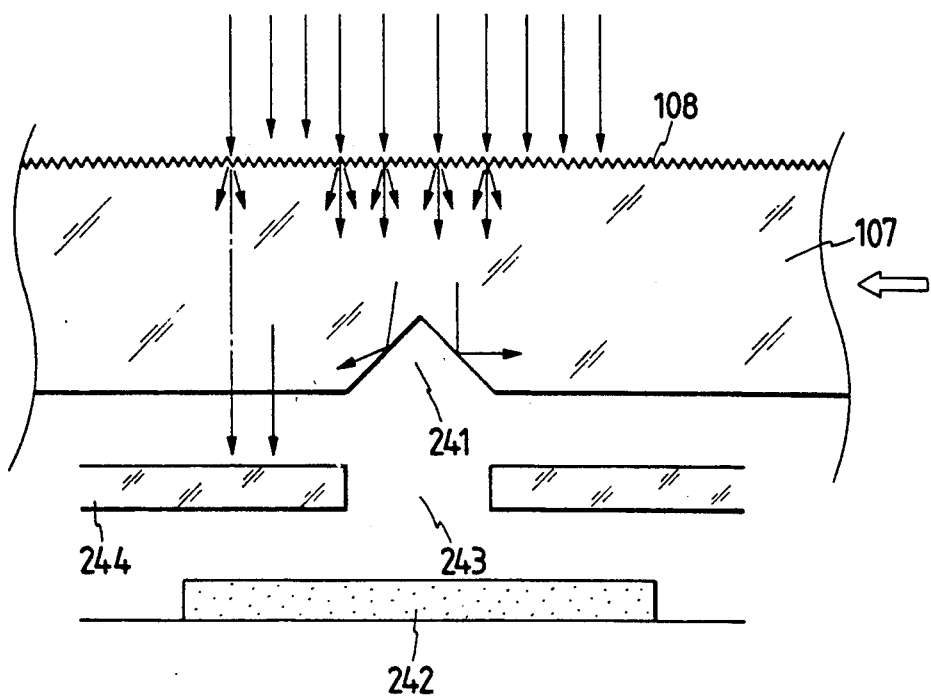

Defined as a light diffusing surface is a surface 108 of the scale bottom portion 107. A marker element 241 for generating the reference position signal is provided in one position on the periphery of a rear surface of the light diffusing surface 108. The marker element 241 consists of a V-groove portion constituted by surfaces each inclined at 45° degrees. The V-groove portion is elongated in a direction orthogonal (perpendicular to the sheet surface) to the peripheral direction of the scale. An optical detection unit is fixedly placed downwardly of the V-groove portion. This detection unit includes a fixing slit 244, an opening 243 of the fixing slit, a photodetector 245 for obtaining the reference positions signal and a light receiving surface 242 of the photodetector. Note that the surface is formed as a light diffusing surface because of obviating an adverse influence of the Fourier image on the detection of the reference position. The surface on which the marker element 241 is formed deviates from the Fourier image forming position so as not to undergo the influence of the Fourier image. With this arrangement, the foregoing surface is not necessarily formed as the light diffusing surface. FIGS. 63 and 64 are diagrams of assistance in explaining the action to detect the reference position signal on the basis of the construction given above.

FIG. 63 illustrates a state where the V-groove portion 241 deviates in position from the opening 243 of the fixing slit 244. In the state, the beams diffused by the diffusing surface 108 pass through the opening 243 and are incident on the light receiving surface 242 of the photodetector. Contrastingly, FIG. 64 illustrates a state where the scale further rotates from the state of FIG. 63, and the V-groove portion 241 coincides in position with opening 243 of the fixing slit 244. At this time, the diffused beams incident on the V-groove portion 241 are fully reflected by the oblique surfaces of the V-groove. The beams incident on the light receiving surface 242 are reduced or not incident at all.

Figure 66A:
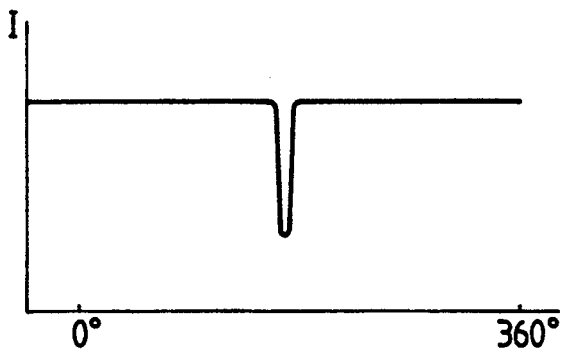
FIGS. 66A and 66B are diagrams depicting output waveforms of the reference position signals.
Figure 66B:
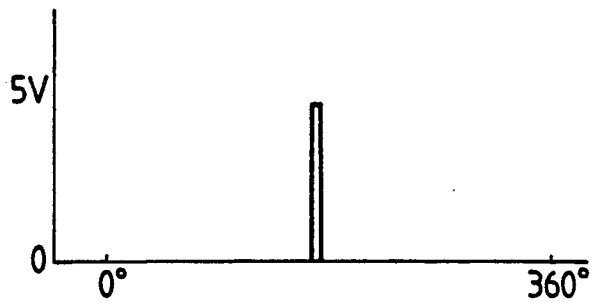

FIG. 66A shows a situation where an amount of beams incident on the light receiving surface 242 changes depending on the rotary motion of the slit. Normally, an output having a predetermined intensity is obtained. During a short period for which the reference slit passes, however, an amount of beams received by the light receiving surface 242 is reduced. FIG. 66B shows reference position signals created based on that signal. The absolute reference position signal is thus obtained at predetermined one point in one revolution through 360 degrees. It is to be noted that a plurality of slits 241 are formed along the periphery, a plurality of reference position signals can be acquired by one revolution, correspondingly.

Figure 68:
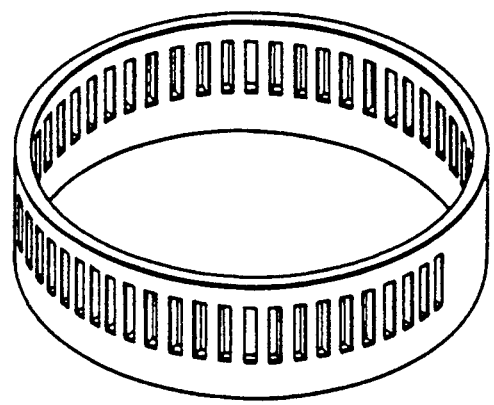
FIG. 68 is a view showing a variant form of a grating configuration.

Incidently, the thirteenth embodiment described above has dealt with an example of using the scale in which the grating unit is formed by providing rugged portions having the oblique surfaces on the transmissive scale. The present invention is not limited to this encoder but is similarly applicable to an encoder shown in the first embodiment, wherein the cylindrical scale formed with the slit-like gratings illustrated in FIG. 68 is employed.

The light source usable in this embodiment is not limited to the semiconductor laser as in other embodiment discussed above but may be, e.g., a point light source LED. The costs can be further reduced by using the LED which is more inexpensive than the semiconductor laser.

Figure 69:
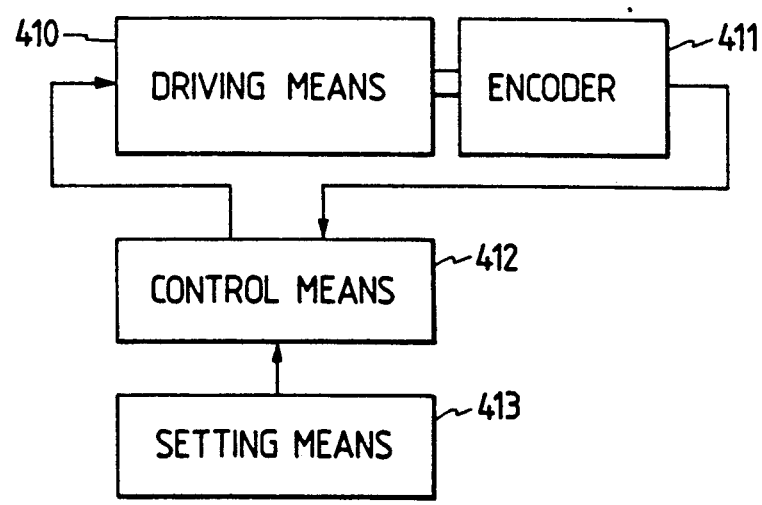
FIG. 69 is a system block diagram illustrating an encoder-based driving system.

FIG. 69 is a system block diagram of a driving system including the rotary encoder, showing one example of a system using the encoder described in the thirteenth embodiment. A driving means 410 has driving sources such as a motor, an actuator and an internal combustion engine. The encoder 411 explained above is connected to a rotation output unit of the driving means 410, thereby detecting driving conditions such as a rotation angle, a rotation quantity and a rotating speed. A detection output of this encoder is fed back to a control means 412. In the control means 412, a driving signal is transmitted to the driving means 410 to develop a condition set by a setting means 413. This type of feedback system is thus configured, whereby the rotational status set by the setting means can be obtained. This driving system is applicable to a variety of machine tools or manufacturing machines, measuring instruments, robots, cameras, video acoustic devices and information devices. The driving system is not limited to these devices but is applicable more widely to the whole devices incorporating the driving means.

The rotation detecting instrument in this embodiment exhibits the following effects. The device can be miniaturized, and the inertia can also be reduced. The assembly is facilitated. In addition, the applicability is expanded because of obtaining the reference position signal of rotation.

Although the illustrative embodiments have been described in detail with reference to the accompanying drawings, it is to be understood that the present invention is not limited to those embodiment. Various changed or modifications may be effected therein by one skilled in the art without departing from the scope or spirit of the invention.

What is claimed is:

1. A rotation detecting apparatus for detecting relative rotation of two bodies, comprising:
    a scale member provided on one of said two bodies and formed with gratings arranged in a direction of a relative rotation to extend in a direction of a rotary axis of the relative rotation;
    light irradiation means for irradiating a first region formed with the gratings of said scale member with beams to produce at least 0th-order and first-order diffraction beams, diffracted images of said first region irradiated with the beams from said light irradiation means being projected on a second region formed with the gratings of said scale member, one of said diffracted images being generated by interfering the 0th-order diffraction beam and the +first-order diffraction beam with each other, another of said diffracted images being generated by interfering the 0th-order and −first-order diffraction beams with each other, and another of said diffracted images being generated by interfering the 0th-order and ±first-order diffraction beams with each other; and
    detecting means for detecting the beams from said second region on which said diffracted images are projected, the relative rotation of said scale member with respect to said other body being detected based on a detected result of said detecting means.

2. An apparatus according to claim 1, wherein said scale member is a cylindrical body and makes relative rotations about a rotary axis parallel to the generatrix of said cylindrical body, and the gratings are formed in the direction of the relative rotation of said scale member on a cylindrical side surface thereof.

3. An apparatus according to claim 1, wherein the gratings are so formed that transmitting portions and shading portions are alternatively arranged in the direction of the relative rotation of said scale member.

4. An apparatus according to claim 3, wherein said scale member assumes a cylindrical shape, said light irradiation means effects irradiation from outside of said scale member, said diffracted images are formed by the beams penetrating said first region, and said detecting means receives the beams penetrating said second region.

5. An apparatus according to claim 1, wherein the gratings are so formed that rugged portions having surfaces inclined to incident beams are arranged in the direction of the relative rotation of said scale member.

6. An apparatus according to claim 5, wherein said scale member assumes a cylindrical shape, at least portions formed with the gratings have a transmissive property, said light irradiation means effect irradiation from outside of said scale member, said diffracted images are formed by the beams penetrating said first region, and said detecting means receives the beams penetrating said second region.

7. An apparatus according to claim 5, wherein said detecting means has at least two light receiving elements for obtaining periodic signals exhibiting different phases.

8. An apparatus according to claim 7, wherein at least said two light receiving elements obtain the periodic signals exhibiting the different phases by receiving the beams emitted in different directions from said second region.

9. An apparatus according to claim 7, further comprising at least one of a means for discerning the direction of the relative rotation of said scale member on the basis of the periodic signals exhibiting the different phases and means for effecting a signal interpolating process on the basis of the periodic signals exhibiting the difference phases.

10. An apparatus according to claim 7, wherein said scale member is composed of a transparent body, and the gratings are formed by providing sectionally V-shaped grooves on said transparent body.

11. An apparatus according to claim 1, wherein said scale member is a hollow body, said light irradiation means effects the irradiation from inside of said hollow body, said diffracted images are formed by the beams reflected by said first region, and detecting means receives the beams reflected by said second region.

12. An apparatus according to claim 11, wherein the gratings include V-shaped grooves or protrusions periodically arranged on an inner periphery of said hollow body.

13. An apparatus according to claim 11, wherein said light irradiation means includes a reflection member for directing the beams to said first region.

14. An apparatus according to claim 11, wherein said detecting means includes a reflection member for directing the beams emerging from a light receiving element and said second region to said light receiving element.

15. An apparatus according to claim 1, wherein at least a portion having a refractive index larger than air intervenes in a light path between said first and second regions.

16. An apparatus according to claim 15, wherein said scale member assumes a cylindrical shape, the gratings are formed on a cylindrical side surface, and a member having a refractive index larger than air intervenes in the light path inwardly of said cylindrical scale member.

17. An apparatus according to claim 1, wherein said scale member includes a fitting portion fitted to a body, the relative rotation of which is to be detected.

18. An apparatus according to claim 1, wherein a diameter d of said scale member satisfies the following formula:

$$(N-(\tfrac{1}{4}))P^2/\lambda < d < (N+(\tfrac{1}{4}))P^2/\lambda$$

where P is the pitch of the gratings, λ is the wavelength of the beams emerging from said light irradiation means, and N is a natural number.

19. An apparatus according to claim 16, said pitch P satisfies the following formula:

$$P = \pi d/n$$

where n is the total number of said transmitting portions of the gratings.

20. An apparatus according to claim 1, further comprising a marker element, provided at a part of said scale member, for detecting a reference position.

21. An apparatus according to claim 20, further comprising a marker element irradiation means for irradiating said marker element with the beam, and a reference position detecting means for detecting that said scale member is in a relative rotational position serving as the reference by detecting the beam emitted from said marker irradiation means.

22. An apparatus according to claim 21, wherein said marker irradiation means includes branching means for branching the beams from said light irradiation means and directing the branched beam to said marker element.

23. A rotation detecting apparatus for detecting a relative rotation with respect to a body formed with gratings in a direction of the relative rotation, comprising:

light irradiation means for irradiating, with beams, a first region formed with the gratings of the body to produce at least 0th-order and first-order diffraction beams, the gratings arranged in the direction of the relative rotation to extend in a direction of a rotary axis of the relative rotation, diffracted images of said first region irradiated with the beams from said light irradiation means being projected on a second region formed with the gratings of said body, one of said diffracted images being generated by interfering the 0th-order diffraction beam and the +first-order diffraction beams with each other, another of said diffracted images being generated by interfering the 0th-order and −first-order diffraction beams with each other, and another of said diffracted images being generated by interfering the 0th-order and ±first-order diffraction beams with each other; and detecting means for detecting the beams from said second region on which said diffracted images are projected, the relative rotation of the body being detected based on a detected result of said detecting means.

24. An apparatus according to claim 23, further comprising a frame supporting said light irradiation means and said detecting means integrally.

25. An apparatus according to claim 24, wherein said frame includes said light irradiation means disposed to effect the irradiation from outside of said body and said detecting means disposed to detect the beam emitted outwardly of said body.

26. An apparatus according to claim 24, wherein said frame includes said light irradiation means disposed to effect the irradiation from inside of a hollow body serving as said body and said detecting means disposed to detect the beams emitted inwardly of said hollow body.

27. An apparatus according to claim 23, wherein said detecting means includes a plurality of photodetectors for detecting each of the beams emitted in a plurality of directions from said second region, and said photodetectors respectively obtain periodic signals exhibiting different phases.

28. A scale irradiated with beams by a rotation detecting apparatus, a relative rotation of said scale with respect to the rotation detecting device being detected based on an emitted-beam detected result by the rotation detecting device, comprising:

a base member fitted to a body whose relative rotation to the rotation detecting device is detected; and gratings arranged on said base member in the direction of the relative rotation to extend in a direction of a rotary axis of the relative rotation, said gratings being formed by arranging rugged portions having surfaces inclined to incident beams in the direction of the relative rotation of said base member, wherein when a first region formed with the gratings is irradiated with beams to produce at least 0th-order and first-order diffraction beams, diffracted images of said first region are projected on a second region formed with said gratings, one of said diffracted images being generated by interfering the 0th-order diffraction beam and the +first-order diffraction beam with each other, another of said diffracted images being generated by interfering the 0th-order and −first-order diffraction beams with each other, and another of said diffracted images being generated by interfering the 0th-order and ±first-order diffraction beams with each other, and the relative rotation of said scale is detected based on a detected result of the beams from said second region on which said diffracted images are projected.

29. A scale according to claim 28, wherein the gratings are so formed that sectionally V-shaped grooves are arranged in a plurality of lines in the direction of the relative rotation of said base member.

30. A scale according to claim 29, wherein said plurality of grooves are so arranged that virtually non-oblique portions to the incident beams are interposed therebetween.

31. A scale according to claim 30, wherein each width of the groove and said non-oblique portion is P/2, where P is the pitch at which said grooves are arranged.

32. A scale according to claim 30, wherein the width of the groove is 2P/3, while the width of the non-oblique portion is P/3, where P is the pitch at which the grooves are arranged.

33. A driving system for causing two bodies to make relative rotations, comprising:
   driving means for relatively rotationally driving said two bodies;
   a scale member provided on said one body and formed with gratings arranged in a direction of the relative rotation to extend in a direction of a rotary axis of the relative rotation;
   light irradiation means for irradiating a first region formed with the gratings with beams to produce at least 0th-order and first-order diffraction beams, diffracted images of said first region irradiated with the beams by said light irradiation means being projected on a second region formed with said gratings of said scale member, one of said diffracted images being generated by interfering the 0th-order diffraction beam and the +first-order diffraction beam with each other, another of said diffracted images being generated by interfering the 0th-order and −first-order diffraction beams with each other, and another of said diffracted images being generated by interfering the 0th-order and ±first-order diffraction beams with each other;
   detecting means for detecting the beams from said second region on which said diffracted beams are projected; and
   control means for controlling a driving condition by said driving means on the basis of a detected result by said detecting means.

34. A driving system according to claim 33, further comprising setting means for setting a driving condition developed by said control means performing the control on the basis of the detected result by said detecting means.

35. A driving system according to claim 34, wherein the gratings are formed by providing sectionally V-shaped grooves on said scale member.

36. A driving system according to claim 35, wherein said detecting means includes a plurality of light receiving elements, for receiving the beams emitted from said second region in different directions, from which periodic signals exhibiting different phases are obtained.

37. A rotation detecting apparatus for detecting relative rotations of two bodies, comprising:
   a scale fitted to one of said two bodies and formed with gratings arranged in a direction of the relative rotation to extend in a direction of a rotary axis of the relative rotation;
   a light source for irradiating a first region formed with the gratings with beams to produce at least 0th-order and first-order diffraction beams, diffracted images of said first region irradiated with the beams by said light source being projected on a second region formed with the gratings of said scale, one of said diffracted images being generated by interfering the 0th-order diffraction beam and the +first-order diffraction beam with each other, another of said diffracted images being generated by interfering the 0th-order and −first-order diffraction beams with each other, and another of said diffracted images being generated by interfering the 0th-order and ±first-order diffraction beams with each other; and
   detectors for detecting the beams from said second region on which said diffracted images are projected, the relative rotation of said scale to said other body being detected based on a detected result by said detector.

38. An apparatus according to claim 37, wherein the gratings are formed by providing sectionally V-shaped grooves on said scale member.

39. An apparatus according to claim 38, wherein said plurality of detectors are provided to respectively receive the beams emitted from said second region in different directions, and periodic signals exhibiting different phases from said plurality of detectors are obtained.

40. A rotation detecting apparatus for detecting a relative rotation of a body formed with gratings arranged in a direction of the relative rotation, comprising:
   a light source for irradiating, with beams, a first region formed with the gratings of the body having the gratings arranged in the direction of the relative rotation to extend in a direction of a rotary axis of the relative rotation to produce at least 0th-order and first-order diffraction beams, diffracted images of said first region irradiated with the beams by said light source being projected on a second region formed with said gratings, one of said diffracted images being generated by interfering the 0th-order diffraction beam and the +first-order diffraction beam with each other, another of said diffracted images being generated by interfering the 0th-order and −first-order diffraction beams with each other, and another of said diffracted images being generated by interfering the 0th-order and ±first-order diffraction beams with each other; and detectors for detecting the beams from said second region on which said diffracted images are projected, said detectors giving a detected result from which the relative rotation to the body is detected.

41. An apparatus according to claim 40, wherein said plurality of detectors are provided to respectively receive the beams emitted from said second region in different directions, and periodic signals exhibiting different phases are obtained from said plurality of detectors.

42. A motor unit, comprising:
a motor module, including a body and a rotary shaft, for providing rotational driving;
a scale member provided on said rotary shaft and formed with gratings arranged in a direction of relative rotation to extend in a direction of a rotary axis of the relative rotation;
light irradiation means for irradiating a first region formed with the gratings with beams to produce at least 0th-order and first-order diffraction beams, diffracted images of said first region irradiated with the beams by said light irradiation means being projected on a second region formed with the gratings of said scale member, one of said diffracted images being generated by interfering the 0th-order diffraction beam and the +first-order diffraction beam with each other, another of said diffracted images being generated by interfering the 0th-order and −first-order diffraction beams with each other, and another of said diffracted images being generated by interfering the 0th-order and ±first-order diffraction beams with each other;
detecting means for detecting the beams from said second region on which said diffracted images are projected, said detecting means giving a detected result from which the rotation of said rotary shaft is detected; and
supporting means for integrally supporting said body, said irradiation means and said detecting means.

43. A motor unit according to claim 42, wherein the gratings are formed by providing sectionally V-shaped grooves on said scale member.

44. A motor unit according to claim 43, wherein said detecting means includes a plurality of light receiving elements for respectively receiving the beams emitted from said second region in different directions, and periodic signals exhibiting different phases are obtained from said plurality of light receiving elements.

45. A rotation detection apparatus for detecting relative rotation of first and second bodies, comprising:
a scale arranged on a first body and formed with gratings arranged in a direction of the relative rotation to extend in a direction of a rotary axis of the relative rotation;
a light source for irradiating a first region formed with the gratings with at least one beam to produce at least 0th-order and first-order diffraction beams, diffracted images of said first region irradiated by said light source and being produced on a second region formed with the gratings of said scale, one of said diffracted images being generated by interfering the 0th-order and +first-order diffraction beams with each other, another of said diffracted images being generated by interfering the 0th-order and −first-order diffraction beams with each other, and another of said diffracted images being generated by interfering the 0th-order and ±first-order diffraction beams with each other; and
at least one detector for detecting the light from said second region on which said diffracted images are produced, the relative rotation of said scale to a second body being detected based on the detection by said detector.

46. An apparatus according to claim 45, wherein said scale is arranged on a cylindrical body and rotates about a rotary axis parallel to the generatrix of said cylindrical body, and the gratings are formed in the direction of the relative rotation of said scale on a cylindrical side surface thereof.

47. An apparatus according to claim 46, wherein the gratings are formed on an inside cylindrical surface of said cylindrical body.

48. An apparatus according to claim 45, wherein said scale member is arranged on a transparent body.

49. An apparatus according to claim 45, wherein the gratings are formed by providing sectionally V-shaped grooves on the first body.

50. A rotation detection apparatus for detecting rotation of a first body formed with gratings arranged in a direction of rotation relative to a second body and extending in a direction of a rotary axis of the relative rotation, comprising:
a light source for irradiating a first region formed with the gratings with at least one beam to produce at least 0th-order and first-order diffraction beams, diffracted images of said first region irradiated by said light source and being produced on a second region formed with the gratings of said scale, one of said diffracted images being generated by interfering the 0th-order and +first-order diffraction beams with each other, another of said diffracted images being generated by interfering the 0th-order and −first-order diffraction beams with each other, and another of said diffracted images being generated by interfering the 0th-order and ±first-order diffraction beams with each other; and
at least one detector for detecting light from said second region on which said diffraction images are produced, the relative rotation of said scale to the second body being detected based on the detection by said detector.

51. An apparatus according to claim 50, wherein a plurality of detectors are provided to respectively receive beams emitted from said second region in different directions, and periodic signals exhibiting different phases are obtained from said plurality of detectors.

52. A scale irradiated with at least one beam by a rotation detecting apparatus, with relative rotation of the scale with respect to the rotation detecting device being detected based on at least one emitted-beams detected by the rotation detecting device, comprising:
a base member fitted to a body whose rotation relative to the rotation detecting device is detected; and
gratings arranged on said base member in the direction of the relative rotation, said gratings being formed by arranging rugged portions having a surface inclined to an incident beam in the direction of the relative rotation of said base member to extend in a direction of a rotary axis of the relative rotation, wherein when a first region formed with said gratings is irradiated with at least one beam to produce at least 0th-order and first-order diffraction beams, diffracted images of said first region are projected on a second region formed with said gratings, one of said diffracted images being generated by interfering the 0th-order and +first-order diffraction beams with each other, another of said diffracted images being generated by interfering the 0th-order and −first-order diffraction beams with each other, and another of said diffracted images being generated by interfering the 0th-order and ±first-order diffraction beams with each other, and the relative rotation of said scale is detected based on the detection of light from said second region.

53. A driving system for causing two bodies to rotate relative to each other, comprising:
   a driving mechanism relatively rotating first and second bodies;
   a scale arranged on the first body and formed with gratings arranged in a direction of the relative rotation to extend in a direction of a rotary axis of the relative rotation;
   a light source for irradiating a first region formed with the gratings with at least one beam to produce at least 0th-order and first-order diffraction beams, diffracted images of said first region irradiated by said light source and being produced on a second region formed with the gratings of said scale, one of said diffracted images being generated by interfering the 0th-order and +first-order diffraction beams with each other, another of said diffracted images being generated by interfering the 0th-order and −first-order diffraction beams with each other, and another of said diffracted images being generated by interfering the 0th-order and ±first-order diffraction beams with each other;
   at least one detector for detecting light from said second region on which said diffracted images are projected, the relative rotation of said scale to the second body being detected based on the detection by said detector; and
   a control unit for controlling a driving condition of said driving mechanism on the basis of the detection by said detector.

* * * * *

UNITED STATES PATENT AND TRADEMARK OFFICE
CERTIFICATE OF CORRECTION

PATENT NO. : 5,323,001   Page 1 of 3
DATED : June 21, 1994
INVENTOR(S) : Igaki et al.

It is certified that error appears in the above-indentified patent and that said Letters Patent is hereby corrected as shown below:

On the title page, item [56] References Cited:

U.S. PATENT DOCUMENTS, "Kabayashi et al." should read --Kobayashi et al.--.

FOREIGN PATENT DOCUMENTS, "1176914  7/1989  Japan" should read --1-176914  7/1989  Japan--.

COLUMN 5:

Line 13, "embodiment.  As" should read --embodiment, as--.

COLUMN 13:

Line 49, "configures" should read --configured--.

COLUMN 14:

Line 42, "[as" should read --[a--.

COLUMN 20:

Line 67, "6/10 P." should read --6/10P or 4/10P.--.

Figure 39B:
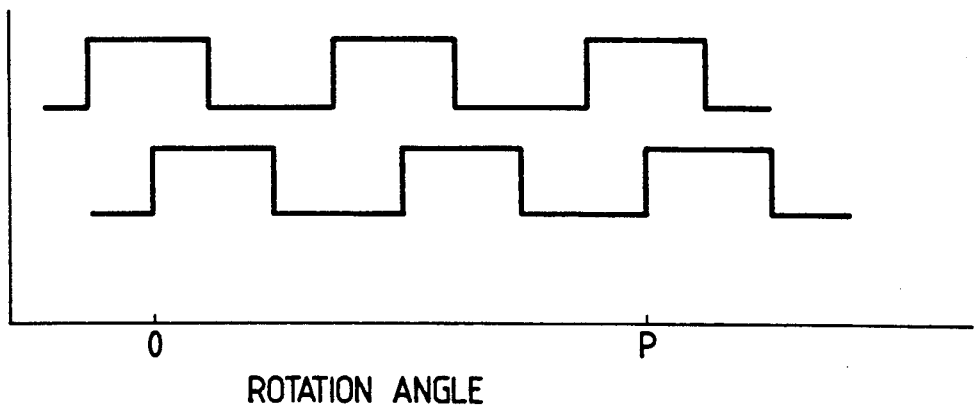
Figure 39C:
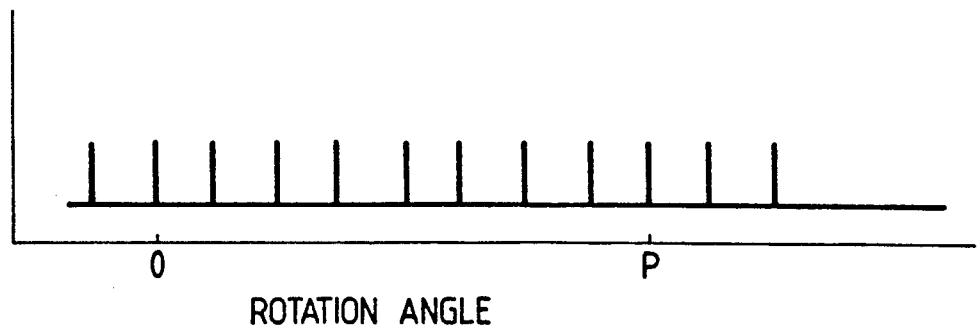

COLUMN 21:

Line 50, "FIG. 39$^B$." should read --FIG. 39B--.

COLUMN 22:

Line 1, after "unit" insert --is--.
Line 67, "rotates.  While" should read --rotates while--.

UNITED STATES PATENT AND TRADEMARK OFFICE
CERTIFICATE OF CORRECTION

PATENT NO. : 5,323,001
DATED : June 21, 1994
INVENTOR(S) : Igaki et al.

It is certified that error appears in the above-indentified patent and that said Letters Patent is hereby corrected as shown below:

COLUMN 26:

Line 10, "unit is" should read --unit and is--.
Line 45, "straight" should read --straight through--.

COLUMN 31:

Line 22, "unit is" should read --unit and is--.

COLUMN 32:

Line 6, "104band" should read --104b and--.

COLUMN 34:

Line 46, "alternatively" should read --alternately--.

UNITED STATES PATENT AND TRADEMARK OFFICE
CERTIFICATE OF CORRECTION

PATENT NO. : 5,323,001
DATED : June 21, 1994
INVENTOR(S) : Igaki, et. al.

It is certified that error appears in the above-indentified patent and that said Letters Patent is hereby corrected as shown below:

<u>Column 40:</u>

Line 4, "emitted-beams" should read --emitted-beam--.

Signed and Sealed this

Thirteenth Day of December, 1994

Attest:

BRUCE LEHMAN

*Attesting Officer*    *Commissioner of Patents and Trademarks*